(12) United States Patent
Carroll

(10) Patent No.: US 7,467,138 B2
(45) Date of Patent: Dec. 16, 2008

(54) ALGORITHM FOR SORTING BIT SEQUENCES IN LINEAR COMPLEXITY

(75) Inventor: Dennis J. Carroll, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 11/011,930

(22) Filed: Dec. 14, 2004

(65) Prior Publication Data

US 2005/0108230 A1 May 19, 2005

Related U.S. Application Data

(63) Continuation-in-part of application No. 10/696,404, filed on Oct. 28, 2003, now Pat. No. 7,370,058.

(51) Int. Cl.
G06F 17/30 (2006.01)
G06F 15/76 (2006.01)
G06F 15/00 (2006.01)

(52) U.S. Cl. .................. 707/7; 712/8; 712/300
(58) Field of Classification Search ............... 707/7; 712/8, 300
See application file for complete search history.

(56) References Cited

U.S. PATENT DOCUMENTS

| | | | | |
|---|---|---|---|---|
| 3,815,038 A | * | 6/1974 | Davis | 330/261 |
| 4,809,158 A | * | 2/1989 | McCauley | 707/7 |
| 5,440,734 A | * | 8/1995 | Wagar | 707/7 |
| 5,546,390 A | * | 8/1996 | Stone | 370/408 |
| 5,560,007 A | * | 9/1996 | Thai | 707/3 |
| 5,671,406 A | * | 9/1997 | Lubbers et al. | 707/7 |
| 5,680,607 A | * | 10/1997 | Brueckheimer | 707/7 |
| 5,799,184 A | * | 8/1998 | Fulton et al. | 707/2 |
| 5,873,078 A | * | 2/1999 | Angle et al. | 707/3 |
| 5,924,091 A | * | 7/1999 | Burkhard | 707/7 |
| 6,128,614 A | | 10/2000 | Mennemeier et al. | |
| 6,144,986 A | | 11/2000 | Silver | |
| 6,373,012 B1 | * | 4/2002 | Crutchfield et al. | 209/584 |

(Continued)

OTHER PUBLICATIONS

Arne Anderson,"Sorting in Linear Time?", Department of Computer Science, Lund University, Sweden, AMC, 1995.*

(Continued)

*Primary Examiner*—Apu Mofiz
*Assistant Examiner*—Hung D Le
(74) *Attorney, Agent, or Firm*—Schmeiser, Olsen & Watts; William E. Schiesser

(57) ABSTRACT

A method and associated algorithm for in-place sorting S sequences of binary bits stored contiguously in an array within a memory device of a computer system prior to the sorting. Each sequence includes contiguous fields of bits. The algorithm is executed by a processor of a computer system. The in-place sorting executes program code at each node of a linked execution structure. Each node includes a segment of the array. The program code is executed in a hierarchical sequence with respect to the nodes. Executing program code at each node includes: dividing the segment of the node into groups of sequences based on a mask field having a mask width, wherein each group has a unique mask value of the mask field; and in-place rearranging the sequences in the segment, wherein the rearranging results in each group including only those sequences having the unique mask value of the group.

32 Claims, 48 Drawing Sheets

U.S. PATENT DOCUMENTS

| | | | |
|---|---|---|---|
| 6,381,605 | B1 | 4/2002 | Kothuri et al. |
| 6,397,216 | B1 | 5/2002 | Cattanach et al. |
| 6,519,593 | B1 | 2/2003 | Matias et al. |
| 6,532,457 | B1* | 3/2003 | Tal et al. .................. 707/1 |
| 6,553,370 | B1 | 4/2003 | Andreev et al. |
| 6,564,211 | B1 | 5/2003 | Andreev et al. |
| 2002/0032681 | A1 | 3/2002 | Feldmeier et al. |
| 2002/0143747 | A1 | 10/2002 | Tal et al. |
| 2002/0165707 | A1* | 11/2002 | Call ........................ 704/2 |
| 2002/0174130 | A1* | 11/2002 | Wagner ................... 707/102 |
| 2003/0004938 | A1* | 1/2003 | Lawder .................... 707/3 |
| 2003/0051020 | A1 | 3/2003 | Kadam et al. |
| 2003/0093565 | A1 | 5/2003 | Berger et al. |
| 2003/0130981 | A1* | 7/2003 | Nehru et al. ............... 707/1 |
| 2004/0032681 | A1* | 2/2004 | Smith et al. ............... 360/31 |

OTHER PUBLICATIONS

Arne Anderson, "A New Efficient Radix Sort", Department of Computer Science, Lund Univisity, Sweden, AMC, 1994.*

Maus, Arne, "ARL, a faster in-place, cache friendly sorting algorithm", in NIK'2002—Norsk Informatikkonferanse, p. 85-95.*

* cited by examiner (RECURSIVE EXECUTION)

(COUNTER-CONTROLLED LOOPING)

```
#Include <stdio.h>
#include <stdlib.h>
#include <memory.h>
#include <math.h>
#include <time.h>
#define    MAX_VALS   20000000          // Maximum number of values to be sorted
 #define   MASK_WIDTH    8               // Width of the mask to use by Linear Sort
#define   MAX_CHILDREN   256             // This should be set to 2^MASK_WIDTH
#define   SEED_INCREMENT  473293813     // Used by the random number generator
define   MOD_VAL          10000         // Values to be sorted range 0 - MOD_VAL-1 typedef struct val_type
{ struct val_type *next;
  int              value;
};

struct val_type  *root, initial_data[MAX_VALS];
unsigned long int values_mask, starting_mask;
int num_vals, initial_rightmost, sortedvals[MAX_VALS], target, cycles;
clock_t before, after;

void prepare_data(void)
{ struct val_type *tval;
  int              i, seed=SEED_INCREMENT%MOD_VAL;

values_mask=0;
  starting_mask=0;
  cycles=0;
  initial_rightmost=0;
  target=0;
  // set up the values to be sorted
  root=NULL;
  values_mask=0;
  for (i=0; i<num_vals; i++)
  { tval=&(initial_data[i]);
    tval->next=root;
    tval->value=seed;
    values_mask=values_mask|seed;
    seed=(seed+SEED_INCREMENT)%MOD_VAL;
    root=tval;
  } for(i=0, starting_mask=0; i<MASK_WIDTH; i++) // Build the mask
  { starting_mask=starting_mask*2+1; } for(initial_rightmost=1; starting_mask<values_mask; ) // find masking start
  { initial_rightmost++;
    starting_mask*=2;
  }
}
```

*FIG. 7A*

```
void linear_sort(struct val_type *curr, int count, unsigned long int
         mask, int shift, int rightmost)
```
```
{ int i, c, t, children_count[MAX_CHILDREN];                             /―51
  struct val_type *tval, *children[MAX_CHILDREN];

if ((count<=1) || (mask<=0))
  { for (i=0; i<count; i++)
    { sortedvals[target]=curr->value;
      target++;
    }
    return;     ―52
  }
```
```
  memset(&(children), 0, sizeof(children));                              /―53
  memset(&(children_count), 0, sizeof(children_count));
```
```
  for (c=0; c<count; c++)
  { i=(curr->value & mask) >> (rightmost-1);
    tval=curr;
    curr=tval->next;                                                     /―54
    tval->next=children[i];
    children[i]=tval;
    children_count[i]++;
  }
```
```
  mask=mask>>shift;                                                      /―55
```
  rightmost-=shift;
```
  for (c=0; c<MAX_CHILDREN; c++)                                         /―56
  { if (children[c])
    { linear_sort(children[c], children_count[c], mask, shift, rightmost); }
  }
```
}

*FIG. 7B*

```
void quicksort(int lo0, int hi0)
{ int lo = lo0;
  int hi = hi0;
  int pivot, t;

if (lo >= hi) { return; }
  else if( lo == hi - 1 )
  { if (sortedvals[lo] > sortedvals[hi])
      { t = sortedvals[lo];
        sortedvals[lo] = sortedvals[hi];
        sortedvals[hi] = t;
      }
    return;
  } pivot = sortedvals[(lo + hi) / 2];
  sortedvals[(lo + hi) / 2] = sortedvals[hi];
  sortedvals[hi] = pivot;

while( lo < hi )
  { while ((sortedvals[lo] <= pivot) && (lo < hi))
      { lo++; } while ((pivot <= sortedvals[hi]) && (lo < hi ))
      { hi--; } if (lo < hi)
    { t                = sortedvals[lo];
      sortedvals[lo] = sortedvals[hi];
      sortedvals[hi] = t;
    }
  } sortedvals[hi0] = sortedvals[hi];
  sortedvals[hi] = pivot;
  quicksort(lo0, lo-1);
  quicksort(hi+1, hi0);
}
```

*FIG. 7C*

```
void main(void)
{
  printf("#_Values\t\tLinear\t\t\tQuicksort\n");

for (num_vals=1000000; num_vals<=MAX_VALS; num_vals+=1000000)
  { prepare_data();
    before=clock();
    linear_sort(root, num_vals, starting_mask, MASK_WIDTH, initial_rightmost);
    after=clock();
    printf("%10d\t%10d\t%10d\t", num_vals, cycles, after-before);

build_dataset();
    before=clock();
    quicksort(0, num_vals);
    after=clock();
    printf("%10l\t%10d", cycles, after-before);
    printf("\n");
  }
} void build_dataset(void)
{ int i, high, low, avg, counts[MOD_VAL];

cycles=0;
  sortedvals[0]=SEED_INCREMENT%MOD_VAL;

for (i=1; i<num_vals; i++)
  { sortedvals[i] = (sortedvals[i-1]+SEED_INCREMENT)%MOD_VAL; }
}
```

*FIG. 7D*

The following source code sample contains both the Linear Sort and the Quicksort Algorithms.
```c
#include <stdio.h>
#include <stdlib.h>
#include <string.h>
#include <memory.h>
#include <time.h>
#define   MAX_VALS 1000000          // Maximum number of values to be sorted
#define   TEST_INCREMENT 10000      // Maximum number of values to be sorted
#define   MAX_STR_LEN    20         // Maximum length of strings to be sorted
define   MAX_CHILDREN 256          // 256 because the Mask Width here is 8bits typedef struct val_type
{ struct val_type *next;
  char           *value;
};
struct val_type *root, initial_data[MAX_VALS];
long num_vals, target, cycles, moves, compares;
char *sortedvals[MAX_VALS], raw_data[MAX_VALS][MAX_STR_LEN];
clock_t before, after;
FILE *infile;

void prepare_data(void)
{ struct val_type *tval;
  int              i;

target=0;
  // set up the values to be sorted
  root=NULL;
  for (i=0; i<num_vals; i++)
  { tval=&(initial_data[i]);
    tval->next=root;
    tval->value=&(raw_data[i][0]);
    root=tval;
  }
}
```

*FIG. 8A*

```
void linear_sort(struct val_type *curr, int count, int level)
{ int i, c, t, children_count[MAX_CHILDREN];
  struct val_type *tval, *children[MAX_CHILDREN];

if (count==1)
  { sortedvals[target]=curr->value;
    target++;
    return;
  }
  memset(&(children), 0, sizeof(children));
  memset(&(children_count), 0, sizeof(children_count));

for (c=0; c<count; c++)
  { i=curr->value[level];
    cycles++;
    if (i==0)
    { sortedvals[target]=curr->value;
      target++;
    }
    else
    { tval=curr;
      curr=curr->next;
      tval->next=children[i];
      children[i]=tval;
      children_count[i]++;
    }
  } for (c=1; c<MAX_CHILDREN; c++)
  { if (children[c])
    { linear_sort(children[c], children_count[c], level+1); }
  }
} void validate_sort(void)
{ int i;

for (i=1; i<num_vals; i++)
  { if (strcmp(sortedvals[i-1],sortedvals[i])>0)
    { printf("sort error=> %d:[%s][%s]\n", i, sortedvals[i-1],sortedvals[i]);
      return;
    }
  }
  printf(" OK ");
}
```

*FIG. 8B*

```
void quicksort(int lo0, int hi0)
{ int lo = lo0;
  int hi = hi0;
  char *pivot, *t;

if (lo >= hi) { return; }
  else if( lo == hi - 1 )
  { if (strcmp(sortedvals[lo], sortedvals[hi])>0)
    { t = sortedvals[lo];
      sortedvals[lo] = sortedvals[hi];
      sortedvals[hi] = t;
    }
    compares++;
    return;
  } pivot = sortedvals[(lo + hi) / 2];
  sortedvals[(lo + hi) / 2] = sortedvals[hi];
  sortedvals[hi] = pivot;

while( lo < hi )
  { while ((strcmp(sortedvals[lo],pivot)<=0) && (lo < hi))
    { lo++;
      compares++;
    }
    compares++;

while ((strcmp(pivot,sortedvals[hi])<=0) && (lo < hi ))
    { hi--;
      compares++;
    }
    compares++;

if (lo < hi)
    { t              = sortedvals[lo];
      sortedvals[lo] = sortedvals[hi];
      sortedvals[hi] = t;
      moves++;
    }
  }
  sortedvals[hi0] = sortedvals[hi];
  sortedvals[hi] = pivot;
  quicksort(lo0, lo-1);
  quicksort(hi+1, hi0);
}
```

*FIG. 8C*

```
void build_dataset(void)
{ int i, c=0, m=0, p=0;

infile=fopen("strings.dat", "r");
  for (i=0; i<MAX_VALS; i++)
  { fscanf(infile, "%s\n", &(raw_data[i]));
    if (strlen(raw_data[i])>m)
    { m=strlen(raw_data[i]);
      p=i;
    }
  }
  fclose(infile);
  printf("max string length=%d at %d\n", m, p);
} void reset_dataset(void)
{ int i;

for (i=0; i<num_vals; i++)
  { sortedvals[i]=&(raw_data[i][0]); }
} void dump_dataset(void)
{ int i;

for (i=0; i<MAX_VALS; i++)
  { printf("%d: %s\n", i, raw_data[i]); }
  for (i=0; i<MAX_VALS; i++)
  { printf("%d: %s\n", i, sortedvals[i]); }
} void main(void)
{
  build_dataset();
  printf("\t\tQuicksort\t\t\tLinear\n");
  printf("#_Values    compares      moves     clock        cycles     clock\n");

for (num_vals=TEST_INCREMENT; num_vals<=MAX_VALS; num_vals+=TEST_INCREMENT)
  { reset_dataset();
    compares=0;
    moves=0;
    printf("%10d ", num_vals);
    before=clock();
    quicksort(0, num_vals-1);
    after=clock();
    printf("%10d %10d %6d", compares, moves, after-before);

cycles=0;
    prepare_data();
    reset_dataset();
    before=clock();
    linear_sort(root, num_vals, 0);
    after=clock();
    printf("   %10d %6d", cycles, after-before);
    printf("\n");
  }
}
```

*FIG. 8D*

(RECURSIVE EXECUTION)

(COUNTER-CONTROLLED LOOPING)

Ambersort (START, COUNT, LEFTMOST)

*43* — Where: START is the segment's first array position at this recursion level
COUNT is the number of values to be in the segment
LEFTMOST is the MSB of the bit MASK used at this recursion level
max_children is expressed as the 2 ^ (# bits in mask)

*44* —
- Count the number of the COUNT values belonging to each of the max_children groups based on the LEFTMOST bit position and the MASK

- Compute the max_children starting positions of each group in the segment based on the counts and START and set the position pointers (pos) to the resulting starting positions

- pos_ptr=0

*45* —
- While values are still to be placed
  o While not in a domino chain (empty_flag == -1)
    ▪ If pos[pos_ptr] exceeds the bounds for pos_ptr group
      • Increment pos_ptr to point to the next group ▪ Else if pos[pos_ptr] points to a value that is already in the correct group position
      • Consider the value to be properly placed
      • Increment pos[pos_ptr]

▪ Else this is a new chain
      • curr_val = the value at pos[pos_ptr] in the array segment
      • Mark the empty holder to point to pos_ptr indicating that the chain started in group pos_ptr
  o Endwhile o If curr_val belongs at the empty position
    ▪ Store curr_val in the empty position
    ▪ Mark the empty_flag=-1 indicating the end of the domino chain o Else a value should be displaced from the group i where curr_val belongs ▪ While the value in the array at pos[i] is in the correct group
      • Consider the value to be properly placed
      • Increment pos[i]
    ▪ Endwhile ▪ Trade the contents of curr_val with the value at array[pos[i]]
    ▪ Consider the value to be properly placed
    ▪ Increment pos[i]
- Endwhile

*46* —
- For each group indicated by i=0 to max_children
  o If group i has elements in the array
    ▪ Call the Ambersort(starts[i], counts[i], leftmost - mask_width)
- Endfor Ambersort Pseudo-Code

FIG. 32

Source Code for Ambersort.

```
unsigned int vals[MAX_VALS], test_num, cal_mask, move_counts;
void (*linear_sort_array[17])(int, int, int);
#define LINEAR_SORT_CODE(WIDTH,MAX_CHILDREN,MASK_VAL)                        \
void linear_sort##WIDTH(int start, int count, int leftmost)                  \
{ int empty, counts[MAX_CHILDREN], starts[MAX_CHILDREN], pos[MAX_CHILDREN];  \
  unsigned long i,i2,t,c,nd, posptr, currval, tempval, finish=start+count-1; \
                                                                             \
  if (leftmost<WIDTH)                                                        \
  { t=0;                                                                     \
    nd=0;                                                                    \
  }                                                                          \
  else                                                                       \
  { t=leftmost-WIDTH;                                                        \
    nd=min(t,WIDTH);                                                         \
  }                                                                          \
                                                                             \
// Outer Loop #1 (Implicit): Looping structure with no embedded loops        \
  memset(&counts, 0, sizeof(counts));                                        \
                                                                             \
// Outer Loop #2: Looping structure with no embedded loops                   \
  for (i=start; i<=finish; i++)                                              \
  { counts[(vals[i] >> t) & MASK_VAL]++; }                                   \
                                                                             \
// Outer Loop #3: Looping structure with no embedded loops                   \
  for (starts[0]=start, c=0; c<MAX_CHILDREN-1; c++)                          \
  { starts[c+1]=starts[c]+counts[c]; }                                       \
                                                                             \
// Outer Loop #4 (Implicit): Looping structure with no embedded loops        \
  memcpy(&pos, &starts, sizeof(pos));                                        \
                                                                             \
// Outer Loop #5: Looping structure with embedded loops                      \
  for (empty=-1, posptr=0, c=start; c<=finish; )                             \
  {                                                                          \
    // Inner Loop #5.1: Looping structure with no embedded loops             \
    while((empty == -1) && (c<=finish))                                      \
    { if ((pos[posptr]<starts[posptr+1]) || (posptr==MAX_CHILDREN-1))        \
      { currval=vals[pos[posptr]];                                           \
        i = (currval >> t) & MASK_VAL;                                       \
        if (i==posptr)                                                       \
        { pos[i]++;                                                          \
          c++;                                                               \
        }                                                                    \
        else                                                                 \
        { empty=posptr; }                                                    \
      }                                                                      \
      else                                                                   \
      { posptr++; }                                                          \
    }                                                                        \
```

FIG. 34A

```
                    if (c<=finish)                                              \
                    { if (i==empty)                                             \
                      { empty=-1;                                               \
                        vals[pos[i]]=currval;                                   \
                        move_counts++;                                          \
                        pos[i]++;                                               \
                        c++;                                                    \
                      }                                                         \
                      else                                                      \
                      { tempval=vals[pos[i]];                                   \
                      { tempval=vals[pos[i]];                                   \
                        // Inner Loop #5.2: Looping structure with no embedded loops \
                        for (i2=(tempval >> t) & MASK_VAL; i2==i; )             \
                        { pos[i]++;                                             \
                          tempval=vals[pos[i]];                                 \
                          i2=(tempval >> t) & MASK_VAL;                         \
                          c++;                                                  \
                        }                                                       \
                        vals[pos[i]]=currval;                                   \
                        move_counts++;                                          \
                        pos[i]++;                                               \
                        i=i2;                                                   \
                        currval=tempval;                                        \
              c++;                                                              \
            }                                                                   \
          }                                                                     \
        }                                                                       \
                                                                                \
    if (nd)                                                                     \
    {                                                                           \
      // Outer Loop #6: Looping structure with no embedded loops                \
      for (c=0; c<MAX_CHILDREN; c++)                                            \
      { if (counts[c]>1)                                                        \
        { linear_sort_array[nd](starts[c],counts[c],t); }                       \
      }                                                                         \
    }                                                                           \
  }                                                                             \

LINEAR_SORT_CODE(1,2,0x00000001)
LINEAR_SORT_CODE(2,4,0x00000003)
LINEAR_SORT_CODE(3,8,0x00000007)
LINEAR_SORT_CODE(4,16,0x0000000F)
LINEAR_SORT_CODE(5,32,0x0000001F)
LINEAR_SORT_CODE(6,64,0x0000003F)
LINEAR_SORT_CODE(7,128,0x0000007F)
LINEAR_SORT_CODE(8,256,0x000000FF)
LINEAR_SORT_CODE(9,512,0x000001FF)
LINEAR_SORT_CODE(10,1024,0x000003FF)
LINEAR_SORT_CODE(11,2048,0x000007FF)
LINEAR_SORT_CODE(12,4096,0x00000FFF)
LINEAR_SORT_CODE(13,8192,0x00001FFF)
LINEAR_SORT_CODE(14,16384,0x00003FFF)
LINEAR_SORT_CODE(15,32768,0x00007FFF)
LINEAR_SORT_CODE(16,65536,0x0000FFFF)

void sort_initializer(void)
{
  linear_sort_array[0]  = linear_sort1;
  linear_sort_array[1]  = linear_sort1;
  linear_sort_array[2]  = linear_sort2;
  linear_sort_array[3]  = linear_sort3;
  linear_sort_array[4]  = linear_sort4;
  linear_sort_array[5]  = linear_sort5;
  linear_sort_array[6]  = linear_sort6;
  linear_sort_array[7]  = linear_sort7;
  linear_sort_array[8]  = linear_sort8;
  linear_sort_array[9]  = linear_sort9;
  linear_sort_array[10] = linear_sort10;
  linear_sort_array[11] = linear_sort11;
  linear_sort_array[12] = linear_sort12;
  linear_sort_array[13] = linear_sort13;
  linear_sort_array[14] = linear_sort14;
  linear_sort_array[15] = linear_sort15;
  linear_sort_array[16] = linear_sort16;
}
```

*FIG. 34B*

Comparative Clock Performance for Values of Magnitude Between 0 and 0x000000FF

☐ QUICKSORT
☐ NON-OPTIMAL AMBERSORT OUTPERFORMING QUICKSORT
☐ OPTIMAL AMBERSORT OUTPERFORMING QUICKSORT
■ AMBERSORT NOT OUTPERFORMING QUICKSORT

| # Values (S) | Mask Width (W) | | | | | | | | | | | | QS |
|---|---|---|---|---|---|---|---|---|---|---|---|---|---|
| | 1 | 2 | 3 | 4 | 5 | 6 | 7 | 8 | 9 | 10 | 11 | 12 | |
| 1000000 | 561 | 281 | 200 | 140 | 130 | 110 | 101 | 70 | 80 | 80 | 60 | 60 | 3014 |
| 2000000 | 1121 | 561 | 381 | 270 | 271 | 230 | 180 | 151 | 150 | 160 | 110 | 120 | 12098 |
| 3000000 | 1682 | 851 | 581 | 410 | 401 | 350 | 281 | 230 | 241 | 260 | 180 | 181 | 27419 |
| 4000000 | 2103 | 1141 | 781 | 571 | 531 | 451 | 370 | 311 | 320 | 341 | 240 | 241 | 46717 |
| 5000000 | 2814 | 1422 | 982 | 701 | 681 | 571 | 460 | 380 | 401 | 420 | 301 | 300 | 75589 |
| 6000000 | 3355 | 1703 | 1172 | 821 | 811 | 691 | 551 | 461 | 481 | 511 | 370 | 371 | 107805 |
| 7000000 | 3936 | 2003 | 1372 | 961 | 952 | 801 | 621 | 531 | 561 | 591 | 440 | 421 | 146531 |
| 8000000 | 4506 | 2283 | 1552 | 1112 | 1091 | 912 | 731 | 611 | 641 | 651 | 491 | 501 | 193408 |
| 9000000 | 5087 | 2564 | 1753 | 1252 | 1211 | 1031 | 811 | 690 | 721 | 751 | 561 | 561 | 252072 |
| 10000000 | 5629 | 2864 | 1943 | 1402 | 1352 | 1152 | 931 | 772 | 811 | 841 | 611 | 611 | 301774 |
| 11000000 | 6199 | 3145 | 2153 | 1532 | 1482 | 1271 | 1021 | 842 | 881 | 921 | 681 | 681 | 366487 |
| 12000000 | 6339 | 3335 | 2313 | 1742 | 1593 | 1352 | 1162 | 951 | 952 | 971 | 751 | 761 | 434194 |
| 13000000 | 7211 | 3685 | 2524 | 1813 | 1773 | 1512 | 1202 | 991 | 1041 | 1112 | 801 | 802 | 521079 |
| 14000000 | 7881 | 3996 | 2724 | 1913 | 1903 | 1613 | 1252 | 1071 | 1131 | 1162 | 862 | 851 | 601996 |
| 15000000 | 8432 | 4276 | 2914 | 2093 | 2013 | 1722 | 1382 | 1151 | 1211 | 1251 | 921 | 922 | 675972 |
| 16000000 | 8973 | 4536 | 3105 | 2183 | 2164 | 1792 | 1432 | 1212 | 1292 | 1272 | 962 | 951 | 757850 |
| 17000000 | 9534 | 4837 | 3295 | 2343 | 2283 | 1963 | 1532 | 1292 | 1362 | 1412 | 1042 | 1052 | 876450 |
| 18000000 | 10144 | 5127 | 3515 | 2534 | 2434 | 2093 | 1713 | 1392 | 1443 | 1512 | 1112 | 1112 | 980400 |
| 19000000 | 10615 | 5388 | 3695 | 2624 | 2523 | 2183 | 1713 | 1452 | 1523 | 1562 | 1162 | 1162 | 1084249 |
| 20000000 | 10565 | 5638 | 3905 | 2854 | 2654 | 2283 | 1912 | 1542 | 1573 | 1652 | 1221 | 1221 | 1199835 |
| 21000000 | 11877 | 5988 | 4086 | 2874 | 2844 | 2423 | 1882 | 1602 | 1683 | 1763 | 1231 | 1282 | 1321951 |
| 22000000 | 12448 | 6259 | 4286 | 3055 | 2974 | 2543 | 2012 | 1682 | 1752 | 1833 | 1292 | 1342 | 1490984 |
| 23000000 | 12978 | 6569 | 4476 | 3245 | 3095 | 2664 | 2143 | 1782 | 1842 | 1912 | 1362 | 1422 | 1571569 |
| 24000000 | 13529 | 6830 | 4676 | 3324 | 3244 | 2744 | 2193 | 1852 | 1922 | 2003 | 1432 | 1482 | 1763075 |
| 25000000 | 14080 | 7130 | 4867 | 3465 | 3385 | 2875 | 2283 | 1912 | 2003 | 2083 | 1543 | 1542 | 1864811 |

FIG. 35

Comparative Clock Performance for Values of Magnitude Between 0 and 0x0000FFFF

☐ QUICKSORT
☐ NON-OPTIMAL AMBERSORT OUTPERFORMING QUICKSORT
☐ OPTIMAL AMBERSORT OUTPERFORMING QUICKSORT
■ AMBERSORT NOT OUTPERFORMING QUICKSORT

Mask Width (W)

| # Values (S) | 1 | 2 | 3 | 4 | 5 | 6 | 7 | 8 | 9 | 10 | 11 | 12 | QS |
|---|---|---|---|---|---|---|---|---|---|---|---|---|---|
| 1000000 | 621 | 321 | 220 | 140 | 131 | 130 | 100 | 80 | 80 | 90 | 60 | 71 | 21 |
| 2000000 | 1252 | 641 | 430 | 291 | 270 | 251 | 200 | 160 | 180 | 181 | 130 | 130 | 43 |
| 3000000 | 1873 | 961 | 641 | 441 | 411 | 380 | 301 | 240 | 270 | 260 | 200 | 201 | 67 |
| 4000000 | 2484 | 1271 | 851 | 581 | 540 | 510 | 391 | 320 | 370 | 371 | 270 | 261 | 95 |
| 5000000 | 3115 | 1602 | 1072 | 731 | 691 | 641 | 511 | 410 | 461 | 461 | 340 | 331 | 128 |
| 6000000 | 3765 | 1913 | 1292 | 871 | 821 | 771 | 601 | 491 | 541 | 560 | 410 | 401 | 158 |
| 7000000 | 4366 | 2234 | 1492 | 1011 | 972 | 901 | 711 | 571 | 641 | 651 | 471 | 461 | 191 |
| 8000000 | 4987 | 2554 | 1712 | 1181 | 1122 | 1022 | 811 | 651 | 731 | 761 | 551 | 531 | 228 |
| 9000000 | 5639 | 2864 | 1933 | 1322 | 1272 | 1142 | 911 | 731 | 831 | 871 | 621 | 601 | 270 |
| 10000000 | 6238 | 3194 | 2143 | 1482 | 1422 | 1282 | 1032 | 821 | 931 | 971 | 681 | 671 | 310 |
| 11000000 | 6840 | 3495 | 2354 | 1622 | 1562 | 1402 | 1162 | 901 | 1022 | 1051 | 762 | 721 | 353 |
| 12000000 | 7461 | 3826 | 2574 | 1762 | 1692 | 1542 | 1261 | 981 | 1112 | 1152 | 831 | 801 | 398 |
| 13000000 | 8122 | 4146 | 2794 | 1912 | 1833 | 1673 | 1362 | 1072 | 1212 | 1252 | 921 | 861 | 451 |
| 14000000 | 8682 | 4446 | 3005 | 2053 | 1963 | 1793 | 1492 | 1142 | 1302 | 1342 | 982 | 931 | 503 |
| 15000000 | 9303 | 4766 | 3224 | 2204 | 2093 | 1913 | 1572 | 1231 | 1392 | 1432 | 1052 | 1001 | 557 |
| 16000000 | 9985 | 5097 | 3445 | 2333 | 2274 | 2053 | 1692 | 1312 | 1502 | 1552 | 1121 | 1061 | 607 |
| 17000000 | 10596 | 5398 | 3655 | 2514 | 2384 | 2183 | 1813 | 1422 | 1603 | 1642 | 1191 | 1131 | 666 |
| 18000000 | 11226 | 5739 | 3875 | 2664 | 2544 | 2293 | 1933 | 1473 | 1702 | 1762 | 1312 | 1201 | 728 |
| 19000000 | 11837 | 6059 | 4086 | 2784 | 2684 | 2433 | 2033 | 1572 | 1783 | 1843 | 1392 | 1282 | 788 |
| 20000000 | 12508 | 6390 | 4296 | 2965 | 2824 | 2564 | 2133 | 1662 | 1893 | 1943 | 1442 | 1352 | 855 |
| 21000000 | 13109 | 6700 | 4547 | 3095 | 2984 | 2714 | 2253 | 1733 | 1983 | 2033 | 1512 | 1412 | 923 |
| 22000000 | 13760 | 7030 | 4747 | 3225 | 3094 | 2804 | 2353 | 1812 | 2073 | 2123 | 1613 | 1482 | 980 |
| 23000000 | 14380 | 7360 | 4957 | 3405 | 3275 | 2955 | 2464 | 1903 | 2203 | 2254 | 1692 | 1552 | 1072 |
| 24000000 | 14971 | 7671 | 5167 | 3525 | 3385 | 3065 | 2574 | 1983 | 2284 | 2323 | 1782 | 1612 | 1137 |
| 25000000 | 15533 | 7971 | 5388 | 3695 | 3545 | 3205 | 2674 | 2053 | 2363 | 2434 | 1823 | 1673 | 1211 |

Comparative Clock Performance for Values of Magnitude Between 0 and 0x00FFFFFF

Legend:
- ☐ QUICKSORT
- ☐ NON-OPTIMAL AMBERSORT OUTPERFORMING QUICKSORT
- ☐ OPTIMAL AMBERSORT OUTPERFORMING QUICKSORT
- ■ AMBERSORT NOT OUTPERFORMING QUICKSORT

| # Values (S) | 1 | 2 | 3 | 4 | 5 | 6 | 7 | 8 | 9 | 10 | 11 | 12 | QS |
|---|---|---|---|---|---|---|---|---|---|---|---|---|---|
| 1000000 | 651 | 360 | 271 | 180 | 170 | 141 | 120 | 220 | 200 | 141 | 270 | 220 | 211 |
| 2000000 | 1352 | 751 | 501 | 460 | 301 | 250 | 331 | 310 | 331 | 220 | 350 | 280 | 421 |
| 3000000 | 2073 | 1131 | 721 | 681 | 441 | 361 | 500 | 391 | 431 | 300 | 421 | 360 | 661 |
| 4000000 | 2804 | 1482 | 962 | 841 | 601 | 471 | 621 | 480 | 531 | 411 | 511 | 440 | 902 |
| 5000000 | 3555 | 1913 | 1252 | 1021 | 802 | 671 | 731 | 551 | 621 | 570 | 590 | 531 | 1142 |
| 6000000 | 4266 | 2314 | 1512 | 1182 | 991 | 832 | 841 | 641 | 711 | 701 | 671 | 601 | 1382 |
| 7000000 | 5017 | 2724 | 1773 | 1332 | 1192 | 1001 | 952 | 721 | 811 | 861 | 752 | 681 | 1622 |
| 8000000 | 5768 | 3125 | 2033 | 1472 | 1402 | 1172 | 1041 | 811 | 911 | 1012 | 831 | 761 | 1873 |
| 9000000 | 6549 | 3525 | 2303 | 1653 | 1582 | 1362 | 1142 | 901 | 1002 | 1152 | 911 | 852 | 2083 |
| 10000000 | 7280 | 3865 | 2554 | 1793 | 1742 | 1503 | 1252 | 971 | 1112 | 1282 | 981 | 921 | 2343 |
| 11000000 | 8042 | 4256 | 2784 | 1953 | 1913 | 1653 | 1352 | 1071 | 1181 | 1402 | 1071 | 1012 | 2644 |
| 12000000 | 8793 | 4627 | 3014 | 2103 | 2073 | 1773 | 1462 | 1162 | 1302 | 1512 | 1142 | 1082 | 2854 |
| 13000000 | 9554 | 4977 | 3254 | 2274 | 2223 | 1903 | 1573 | 1232 | 1402 | 1622 | 1222 | 1162 | 3215 |
| 14000000 | 10325 | 5348 | 3485 | 2403 | 2383 | 2043 | 1673 | 1312 | 1492 | 1742 | 1312 | 1232 | 3425 |
| 15000000 | 11026 | 5678 | 3716 | 2593 | 2543 | 2223 | 1773 | 1392 | 1592 | 1842 | 1382 | 1362 | 3695 |
| 16000000 | 11767 | 5989 | 3936 | 2724 | 2664 | 2294 | 1873 | 1492 | 1683 | 1933 | 1472 | 1412 | 4045 |
| 17000000 | 12488 | 6349 | 4116 | 2884 | 2804 | 2423 | 1972 | 1572 | 1783 | 2033 | 1542 | 1502 | 4276 |
| 18000000 | 13199 | 6720 | 4397 | 3014 | 2964 | 2554 | 2123 | 1663 | 1893 | 2153 | 1622 | 1572 | 4496 |
| 19000000 | 13990 | 7100 | 4646 | 3264 | 3154 | 2784 | 2233 | 1743 | 1983 | 2294 | 1722 | 1762 | 4847 |
| 20000000 | 14651 | 7451 | 4857 | 3325 | 3315 | 2824 | 2333 | 1832 | 2063 | 2403 | 1802 | 1723 | 5118 |
| 21000000 | 15442 | 7822 | 5107 | 3515 | 3475 | 3005 | 2474 | 1903 | 2173 | 2514 | 1873 | 1823 | 5188 |
| 22000000 | 16113 | 8172 | 5348 | 3665 | 3645 | 3114 | 2594 | 2002 | 2273 | 2624 | 1963 | 1902 | 5588 |
| 23000000 | 16834 | 8503 | 5558 | 3796 | 3786 | 3235 | 2714 | 2103 | 2363 | 2764 | 2043 | 1963 | 5748 |
| 24000000 | 17425 | 8883 | 5799 | 3956 | 3966 | 3375 | 2844 | 2173 | 2464 | 2865 | 2133 | 2063 | 5988 |
| 25000000 | 18146 | 9234 | 6049 | 4116 | 4126 | 3495 | 2914 | 2243 | 2554 | 2985 | 2203 | 2143 | 6229 |

Mask Width (W)

Comparative Clock Performance for Values of Magnitude Between 0 and 0xFFFFFFFF

☐ QUICKSORT
☐ NON-OPTIMAL AMBERSORT OUTPERFORMING QUICKSORT
☐ OPTIMAL AMBERSORT OUTPERFORMING QUICKSORT
☐ AMBERSORT NOT OUTPERFORMING QUICKSORT

| # Values (S) | Mask Width (W) | | | | | | | | | | | | QS |
|---|---|---|---|---|---|---|---|---|---|---|---|---|---|
| | 1 | 2 | 3 | 4 | 5 | 6 | 7 | 8 | 9 | 10 | 11 | 12 | |
| 1000000 | 550 | 311 | 200 | 211 | 220 | 270 | 90 | 251 | 1482 | 4767 | 110 | 300 | 201 |
| 2000000 | 1091 | 641 | 381 | 460 | 511 | 361 | 360 | 331 | 1542 | 12568 | 1192 | 350 | 431 |
| 3000000 | 1763 | 1011 | 691 | 631 | 681 | 441 | 1602 | 390 | 1612 | 15172 | 7942 | 420 | 651 |
| 4000000 | 2373 | 1372 | 972 | 771 | 821 | 541 | 2644 | 460 | 1693 | 16113 | 14391 | 471 | 891 |
| 5000000 | 2994 | 1703 | 1202 | 911 | 941 | 621 | 3205 | 531 | 1773 | 16203 | 20059 | 541 | 1161 |
| 6000000 | 3585 | 2042 | 1392 | 1031 | 1052 | 711 | 3445 | 601 | 1843 | 16293 | 26068 | 611 | 1422 |
| 7000000 | 4146 | 2364 | 1572 | 1142 | 1151 | 811 | 3545 | 671 | 1923 | 16374 | 32226 | 671 | 1622 |
| 8000000 | 4737 | 2724 | 1753 | 1292 | 1272 | 881 | 3635 | 731 | 1992 | 16463 | 41961 | 731 | 1873 |
| 9000000 | 5357 | 3074 | 1923 | 1402 | 1402 | 972 | 3715 | 812 | 2083 | 16534 | 52255 | 811 | 2113 |
| 10000000 | 6168 | 3565 | 2303 | 1823 | 1803 | 1632 | 3836 | 2574 | 2163 | 16624 | 52375 | 2563 | 2354 |
| 11000000 | 6980 | 4006 | 2654 | 2183 | 2214 | 2273 | 3916 | 4336 | 2224 | 16724 | 52475 | 4326 | 2584 |
| 12000000 | 7751 | 4467 | 2994 | 2513 | 2534 | 2914 | 4015 | 6099 | 2294 | 16814 | 52576 | 6079 | 2864 |
| 13000000 | 8592 | 4897 | 3325 | 2854 | 2894 | 3576 | 4106 | 7861 | 2394 | 16894 | 52695 | 7831 | 3135 |
| 14000000 | 9334 | 5348 | 3645 | 3215 | 3255 | 4206 | 4196 | 9603 | 2443 | 16995 | 52776 | 9594 | 3445 |
| 15000000 | 10065 | 5748 | 3965 | 3556 | 3595 | 4847 | 4277 | 11386 | 2524 | 17065 | 52896 | 11357 | 3765 |
| 16000000 | 10865 | 6188 | 4286 | 3896 | 3956 | 5488 | 4376 | 13108 | 2603 | 17154 | 52996 | 13069 | 3886 |
| 17000000 | 11567 | 6580 | 4597 | 4196 | 4286 | 6138 | 4466 | 14862 | 2664 | 17235 | 53097 | 14801 | 4256 |
| 18000000 | 12388 | 7010 | 4887 | 4507 | 4657 | 6810 | 4566 | 16574 | 2734 | 17315 | 53197 | 16524 | 4436 |
| 19000000 | 13159 | 7390 | 5137 | 4767 | 4927 | 7110 | 4647 | 17075 | 2824 | 17415 | 53297 | 17024 | 4767 |
| 20000000 | 13770 | 7781 | 5408 | 4938 | 5227 | 7330 | 4737 | 17595 | 2904 | 17515 | 53387 | 17535 | 5107 |
| 21000000 | 14521 | 8172 | 5638 | 5167 | 5498 | 7621 | 4837 | 18106 | 2964 | 17575 | 53487 | 18056 | 5288 |
| 22000000 | 15182 | 8542 | 5908 | 5387 | 5778 | 7892 | 4927 | 18617 | 3044 | 17666 | 53587 | 18577 | 5588 |
| 23000000 | 15802 | 8912 | 6139 | 5558 | 6069 | 8132 | 5008 | 19147 | 3134 | 17735 | 53687 | 19108 | 5808 |
| 24000000 | 16494 | 9283 | 6369 | 5768 | 6340 | 8422 | 5118 | 19648 | 3194 | 17825 | 53777 | 19599 | 6179 |
| 25000000 | 17165 | 9634 | 6629 | 5949 | 6610 | 8653 | 5178 | 20159 | 3265 | 17906 | 53868 | 20099 | 6439 |

FIG. 38

☐ QUICKSORT  ☐ NON-OPTIMAL AMBERSORT OUTPERFORMING QUICKSORT  ☐ OPTIMAL AMBERSORT OUTPERFORMING QUICKSORT  ☐ AMBERSORT NOT OUTPERFORMING QUICKSORT

Comparative Clock Performance For Uniformly Distributed (ZIP+4) 9-Digit Integer Values

| # Values (S) | \multicolumn{12}{c}{Mask Width (W)} | QS |
| | 1 | 2 | 3 | 4 | 5 | 6 | 7 | 8 | 9 | 10 | 11 | 12 | |
|---|---|---|---|---|---|---|---|---|---|---|---|---|---|
| 1000000 | 601 | 340 | 231 | 200 | 210 | 181 | 510 | 171 | 721 | 4226 | 3124 | 161 | 2 |
| 2000000 | 1252 | 711 | 521 | 421 | 390 | 351 | 1272 | 471 | 791 | 7501 | 8492 | 481 | 4 |
| 3000000 | 1892 | 1061 | 781 | 630 | 500 | 631 | 1563 | 1101 | 861 | 7591 | 11206 | 1102 | 6 |
| 4000000 | 2534 | 1412 | 1022 | 851 | 611 | 892 | 1712 | 1742 | 932 | 7671 | 13880 | 1723 | 9 |
| 5000000 | 3165 | 1763 | 1262 | 1052 | 721 | 1172 | 1823 | 2373 | 1001 | 7771 | 16764 | 2353 | 11 |
| 6000000 | 3786 | 2103 | 1492 | 1242 | 831 | 1452 | 1913 | 2994 | 1061 | 7851 | 20219 | 2974 | 14 |
| 7000000 | 4407 | 2454 | 1722 | 1442 | 942 | 1722 | 2003 | 3625 | 1131 | 7921 | 24075 | 3605 | 16 |
| 8000000 | 5238 | 2814 | 1973 | 1662 | 1051 | 2063 | 2083 | 4436 | 1202 | 8002 | 24706 | 4407 | 18 |
| 9000000 | 5688 | 3134 | 2213 | 1903 | 1152 | 2463 | 2163 | 5428 | 1282 | 8091 | 24796 | 5398 | 21 |
| 10000000 | 6419 | 3565 | 2524 | 2213 | 1542 | 3005 | 2264 | 6800 | 1352 | 8162 | 24876 | 6750 | 23 |
| 11000000 | 7151 | 3976 | 2815 | 2484 | 1913 | 3485 | 2354 | 7931 | 1422 | 8231 | 24976 | 7921 | 26 |
| 12000000 | 7861 | 4356 | 3085 | 2743 | 2323 | 3866 | 2444 | 8833 | 1492 | 8322 | 25086 | 8802 | 29 |
| 13000000 | 8592 | 4756 | 3345 | 2994 | 2743 | 4256 | 2544 | 9754 | 1552 | 8402 | 25176 | 9714 | 31 |
| 14000000 | 9313 | 5128 | 3615 | 3235 | 3154 | 4636 | 2634 | 10655 | 1622 | 8492 | 25246 | 10605 | 34 |
| 15000000 | 10055 | 5528 | 3886 | 3475 | 3565 | 4997 | 2714 | 11536 | 1692 | 8553 | 25377 | 11506 | 36 |
| 16000000 | 10705 | 5878 | 4166 | 3725 | 3986 | 5417 | 2804 | 12418 | 1762 | 8633 | 25437 | 12418 | 39 |
| 17000000 | 11466 | 6269 | 4406 | 3956 | 4396 | 5768 | 2914 | 13329 | 1833 | 8702 | 25517 | 13299 | 42 |
| 18000000 | 12148 | 6629 | 4657 | 4186 | 4827 | 6138 | 3015 | 14160 | 1903 | 8782 | 25617 | 14110 | 43 |
| 19000000 | 12818 | 6990 | 4877 | 4367 | 5177 | 6349 | 3125 | 14490 | 1973 | 8863 | 25697 | 14461 | 46 |
| 20000000 | 13540 | 7350 | 5108 | 4556 | 5498 | 6569 | 3195 | 14871 | 2053 | 8953 | 25797 | 14812 | 50 |
| 21000000 | 14230 | 7751 | 5338 | 4737 | 5738 | 6780 | 3315 | 15202 | 2113 | 9013 | 25897 | 15152 | 51 |
| 22000000 | 14911 | 8132 | 5548 | 4927 | 5999 | 6980 | 3405 | 15552 | 2203 | 9093 | 25997 | 15502 | 54 |
| 23000000 | 15602 | 8533 | 5778 | 5098 | 6219 | 7190 | 3505 | 15912 | 2253 | 9203 | 26058 | 15863 | 58 |
| 24000000 | 16304 | 8913 | 5999 | 5288 | 6459 | 7391 | 3605 | 16283 | 2323 | 9243 | 26138 | 16213 | 60 |
| 25000000 | 16955 | 9303 | 6218 | 5458 | 6730 | 7591 | 3695 | 16613 | 2413 | 9344 | 26258 | 16554 | 62 |
| 26000000 | 17646 | 9694 | 6429 | 5638 | 6940 | 7802 | 3795 | 16994 | 2503 | 9404 | 26318 | 16894 | 65 |
| 27000000 | 18327 | 10085 | 6660 | 5808 | 7150 | 8012 | 3886 | 17305 | 2564 | 9483 | 26428 | 17235 | 68 |
| 28000000 | 19027 | 10505 | 6860 | 5998 | 7400 | 8181 | 3996 | 17625 | 2614 | 9564 | 26498 | 17545 | 70 |
| 29000000 | 19649 | 10836 | 7100 | 6149 | 7621 | 8352 | 4086 | 17865 | 2724 | 9634 | 26589 | 17776 | 74 |
| 30000000 | 20449 | 11256 | 7370 | 6319 | 7801 | 8522 | 4186 | 18116 | 2874 | 9724 | 26678 | 18026 | 78 |
| 31000000 | 21100 | 11616 | 7651 | 6469 | 7992 | 8713 | 4276 | 18407 | 3015 | 9784 | 26778 | 18306 | 79 |
| 32000000 | 21842 | 12048 | 7922 | 6650 | 8201 | 8873 | 4377 | 18647 | 3164 | 9884 | 26848 | 18537 | 83 |
| 33000000 | 22502 | 12407 | 8182 | 6819 | 8412 | 9043 | 4457 | 18907 | 3295 | 9954 | 26949 | 18787 | 83 |
| 34000000 | 23244 | 12809 | 8452 | 6980 | 8613 | 9214 | 4567 | 19167 | 3455 | 10024 | 27039 | 19038 | 86 |
| 35000000 | 23894 | 13199 | 8743 | 7171 | 8783 | 9393 | 4687 | 19428 | 3616 | 10115 | 27129 | 19287 | 92 |
| 36000000 | 24665 | 13589 | 9013 | 7341 | 8993 | 9544 | 4757 | 19689 | 3765 | 10194 | 27209 | 19538 | 92 |
| 37000000 | 25336 | 13950 | 9283 | 7501 | 9173 | 9684 | 4867 | 19918 | 3946 | 10274 | 27270 | 19678 | 95 |
| 38000000 | 26007 | 14371 | 9553 | 7701 | 9344 | 9804 | 4967 | 19938 | 4096 | 10355 | 27369 | 19769 | 97 |
| 39000000 | 26749 | 14741 | 9824 | 7831 | 9544 | 9924 | 5057 | 20059 | 4256 | 10415 | 27460 | 19868 | 100 |
| 40000000 | 27440 | 15131 | 10085 | 7991 | 9734 | 10045 | 5167 | 20159 | 4427 | 10505 | 27550 | 19948 | 105 |
| 41000000 | 28170 | 15502 | 10365 | 8162 | 9934 | 10195 | 5267 | 20269 | 4576 | 10576 | 27650 | 20068 | 108 |
| 42000000 | 28851 | 15873 | 10625 | 8352 | 10134 | 10294 | 5358 | 20390 | 4777 | 10655 | 27720 | 20179 | 108 |
| 43000000 | 29563 | 16274 | 10875 | 8492 | 10295 | 10475 | 5548 | 20520 | 4917 | 10726 | 27820 | 20259 | 113 |
| 44000000 | 30264 | 16664 | 11136 | 8653 | 10495 | 10515 | 5578 | 20570 | 5077 | 10825 | 27880 | 20349 | 117 |
| 45000000 | 30954 | 17025 | 11397 | 8792 | 10675 | 10626 | 5658 | 20690 | 5258 | 10896 | 27980 | 20439 | 117 |
| 46000000 | 31665 | 17425 | 11657 | 8963 | 10916 | 10755 | 5769 | 20790 | 5438 | 10956 | 28061 | 20550 | 121 |
| 47000000 | 32417 | 17816 | 11917 | 9103 | 11126 | 10895 | 5868 | 20890 | 5568 | 11046 | 28140 | 20630 | 126 |
| 48000000 | 33048 | 18116 | 12187 | 9273 | 11366 | 11006 | 5958 | 21040 | 5739 | 11116 | 28211 | 20729 | 125 |
| 49000000 | 33848 | 18566 | 12428 | 9444 | 11597 | 11116 | 6059 | 21060 | 5918 | 11196 | 28310 | 20830 | 128 |
| 50000000 | 34500 | 18917 | 12699 | 9594 | 11817 | 11246 | 6169 | 21171 | 6079 | 11277 | 28401 | 20920 | 130 |

ALGORITHM FOR SORTING BIT SEQUENCES IN LINEAR COMPLEXITY

The present patent application is a continuation-in-part of U.S. Pat. application Ser. No. 10/696,404, filed Oct. 28, 2003 now U.S. Pat. No. 7,370,058 and entitled "Algorithm For Sorting Bit Sequences in Linear Complexity."

BACKGROUND OF THE INVENTION

1. Technical Field

The present invention generally relates to an algorithm for sorting bit sequences, and in particular to an algorithm for sorting bit sequences in linear complexity.

2. Related Art

In the current state of the art with respect to sorting words (i.e., integers, strings, etc.), the fastest known algorithms have an execution speed proportional to $N_W \log N_W$ (i.e., of order $N_W \log N_W$), wherein $N_W$ denotes the number of words to be sorted. The well-known Quicksort algorithm is an in-place sort algorithm (i.e., the sorted items occupy the same storage as the original items) that uses a divide and conquer methodology. To solve a problem by divide and conquer on an original instance of a given size, the original instance is divided into two or more smaller instances; each of these smaller instances is recursively solved (i.e., similarly divided), and the resultant solutions are combined to produce a solution for the original instance. To implement divide and conquer, Quicksort picks an element from the array (the pivot), partitions the remaining elements into those greater than and less than this pivot, and recursively sorts the partitions. The execution speed of Quicksort is a function of the sort ordering that is present in the array of words to be sorted. For a totally random distribution of words to be sorted, Quicksort's execution speed is proportional to $N_W \log N_W$. In some cases in which the words to be sorted deviate from perfect randomness, the execution speed may deteriorate relative to $N_W \log N_W$ and is proportional to $(N_W)^2$ in the worst case.

Given, the enormous execution time devoted to sorting a large number of integers, strings, etc. for extensively used applications such as spreadsheets, database applications, etc., there is a need for a sort algorithm having an execution speed of order less than $N_W \log N_W$.

SUMMARY OF THE INVENTION

The present invention provides a method, comprising executing an algorithm by a processor of a computer system, said executing said algorithm comprising in-place sorting S sequences of binary bits in ascending or descending order of a value associated with each sequence and in a time period denoted as a sorting execution time, said S sequences being stored contiguously in an array within a memory device of the computer system prior to said sorting, S being at least 2, each sequence of the S sequences comprising contiguous fields of bits, said in-place sorting comprising executing program code at each node of a linked execution structure, each node comprising a segment of the array, said executing program code being performed in a hierarchical sequence with respect to said nodes, said executing program code at each node including:

dividing the segment of the node into G groups of sequences based on a mask field having a mask width, each group of the G groups having a unique mask value of the mask field; and in-place rearranging the sequences in the segment, said rearranging resulting in each group of the G groups comprising only those sequences having the unique mask value of the group.

The present invention provides a computer program product, comprising:

a computer usable medium having a computer readable program embodied therein, said computer readable program comprising an algorithm for in-place sorting S sequences of binary bits in ascending or descending order of a value associated with each sequence and in a time period denoted as a sorting execution time, said S sequences being stored contiguously in an array within a memory device of a computer system prior to said sorting, S being at least 2, each sequence of the S sequences comprising contiguous fields of bits, said algorithm adapted to perform said in-place sorting by executing program code at each node of a linked execution structure, each node comprising a segment of the array, said executing program code adapted to be performed by a processor of the computer system, said executing program code adapted to be performed in a hierarchical sequence with respect to said nodes, said executing program code at each node including:

dividing the segment of the node into G groups of sequences based on a mask field having a mask width, each group of the G groups having a unique mask value of the mask field; and in-place rearranging the sequences in the segment, said rearranging resulting in each group of the G groups comprising only those sequences having the unique mask value of the group.

The present invention provides a method for deploying computing infrastructure, said method comprising integrating a computer readable program into a computer system, wherein the computer-readable program in combination with the computing system is adapted to execute an algorithm by a processor of the computer system, said executing said algorithm comprising in-place sorting S sequences of binary bits in ascending or descending order of a value associated with each sequence and in a time period denoted as a sorting execution time, said S sequences being stored contiguously in an array within a memory device of the computer system prior to said sorting, S being at least 2, each sequence of the S sequences comprising contiguous fields of bits, said in-place sorting comprising executing program code at each node of a linked execution structure, each node comprising a segment of the array, said executing program code being performed in a hierarchical sequence with respect to said nodes, said executing program code at each node including:

dividing the segment of the node into G groups of sequences based on a mask field having a mask width, each group of the G groups having a unique mask value of the mask field; and in-place rearranging the sequences in the segment, said rearranging resulting in each group of the G groups comprising only those sequences having the unique mask value of the group.

The present invention advantageously provides a sort algorithm having an execution speed of order less than $N_W \log N_W$.

BRIEF DESCRIPTION OF THE DRAWINGS

FIGS. 7A-7D comprise source code for linear sorting of integers under recursive execution, in accordance with embodiments of the present invention.

FIGS. 8A-8D comprise source code for linear sorting of strings under recursive execution, in accordance with embodiments of the present invention.

FIGS. 32 and 33 depict pseudo-code and actual code, respectively, for the recursive calling embodiment of the in-place linear sort of the present invention.

FIG. 34A-34B depicts an example in which 8-bit sequences are broken into groups and arranged into contiguous segments based on a 2-bit mask, in conjunction with the in-place linear sort of the present invention.

FIGS. 35-41 depicts performance test results pertaining to the in-place sort algorithm of the present invention in comparison with Quicksort.

DETAILED DESCRIPTION OF THE INVENTION

The detailed description is presented infra in six sections. The first section (Section 1), in conjunction with FIG. 1, comprises an introduction to the present invention, including assumptions, terminology, features, etc. of the present invention. The second section (Section 2), in conjunction with FIGS. 2-9 comprises a sort algorithm detailed description in accordance with the present invention. The third section (Section 3), in conjunction with FIGS. 10-24, relates to Timing Tests, including a description and analysis of execution timing test data for the sort algorithm of the present invention as described in Section 2, in comparison with Quicksort. The fourth Section (Section 4), in conjunction with FIGS. 25-32, describes the application of in-place sorting to the sort algorithm of Section 2. The fifth section (Section 5), in conjunction with FIGS. 33-34, describes the algorithmic complexity of the in-place sort algorithm of the present invention. The sixth section (Section 6), in conjunction with FIGS. 35-41, describes performance test results pertaining to the in-place sort algorithm of the present invention in comparison with Quicksort.

1. Introduction

Figure 1:
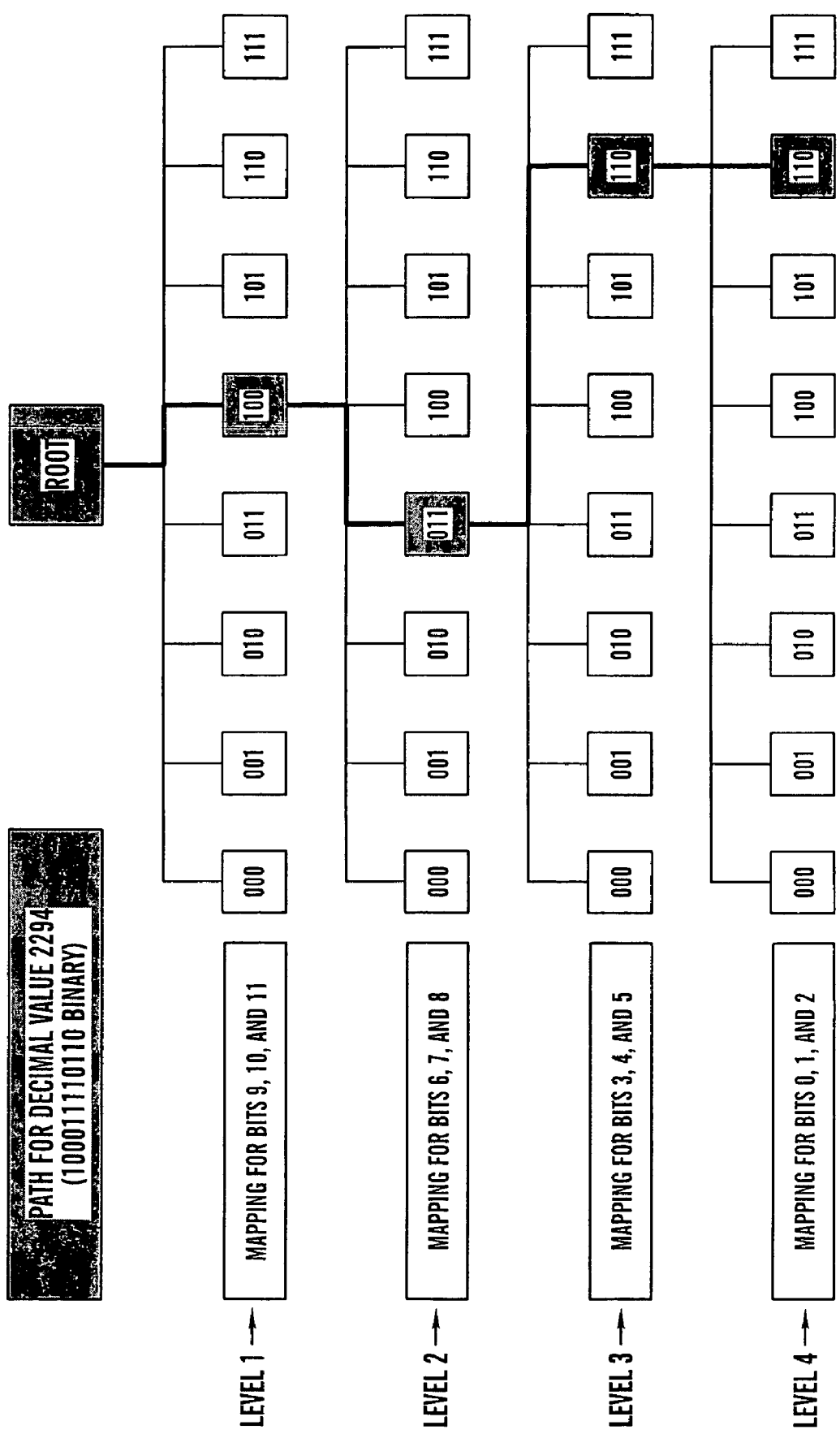
FIG. 1 depicts a path through a linked execution structure, in accordance with embodiments of the present invention.

FIG. 1 depicts a path through linked execution structure, in accordance with embodiments of the present invention. The linked execution structure of FIG. 1 is specific to 12-bit words divided into 4 contiguous fields of 3 bits per field. For example, the example word 100011110110 shown in FIG. 1 is divided into the following 4 fields (from left to right): 100, 011, 110, 110. Each field has 3 bits and therefore has a "width" of 3 bits. The sort algorithm of the present invention will utilize a logical mask whose significant bits (for masking purposes) encompass W bits. Masking a sequence of bits is defined herein as extracting (or pointing to) a subset of the bits of the sequence. Thus, the mask may include a contiguous group of ones (i.e., 11 . . . 1) and the remaining bits of the mask are each 0; the significant bits of the mask consist of the contiguous group of ones, and the width W of the mask is defined as the number of the significant bits in the mask. Thus, W is referred to as a "mask width", and the mask width W determines the division into contiguous fields of each word to be sorted. Generally, if the word to be sorted has N bits and if the mask width is W, then each word to be sorted is divided into L fields (or "levels") such that L=N/W if N is an integral multiple of W, under the assumption that the mask width W is constant. If N is not an integral multiple of W, then the mask width cannot be constant. For example if N=12 and W=5, then the words to be sorted may be divided into, inter alia, 3 fields, wherein going from left to right the three fields have 5 bits, 5 bits, and 2 bits. In this example, L may be calculated via L=ceiling (N/W), wherein ceiling (x) is defined as the smallest integer greater than or equal to x. Thus, the scope of present invention includes an embodiment in which W is a constant width with respect to the contiguous fields of each word to be sorted. Alternatively, the scope of present invention also includes an embodiment in which W is a variable width with respect to the contiguous fields of each word to be sorted. Each word to be sorted may be characterized by the same mask and associated mask width W, regardless of whether W is constant or variable with respect to the contiguous fields.

Figure 2:
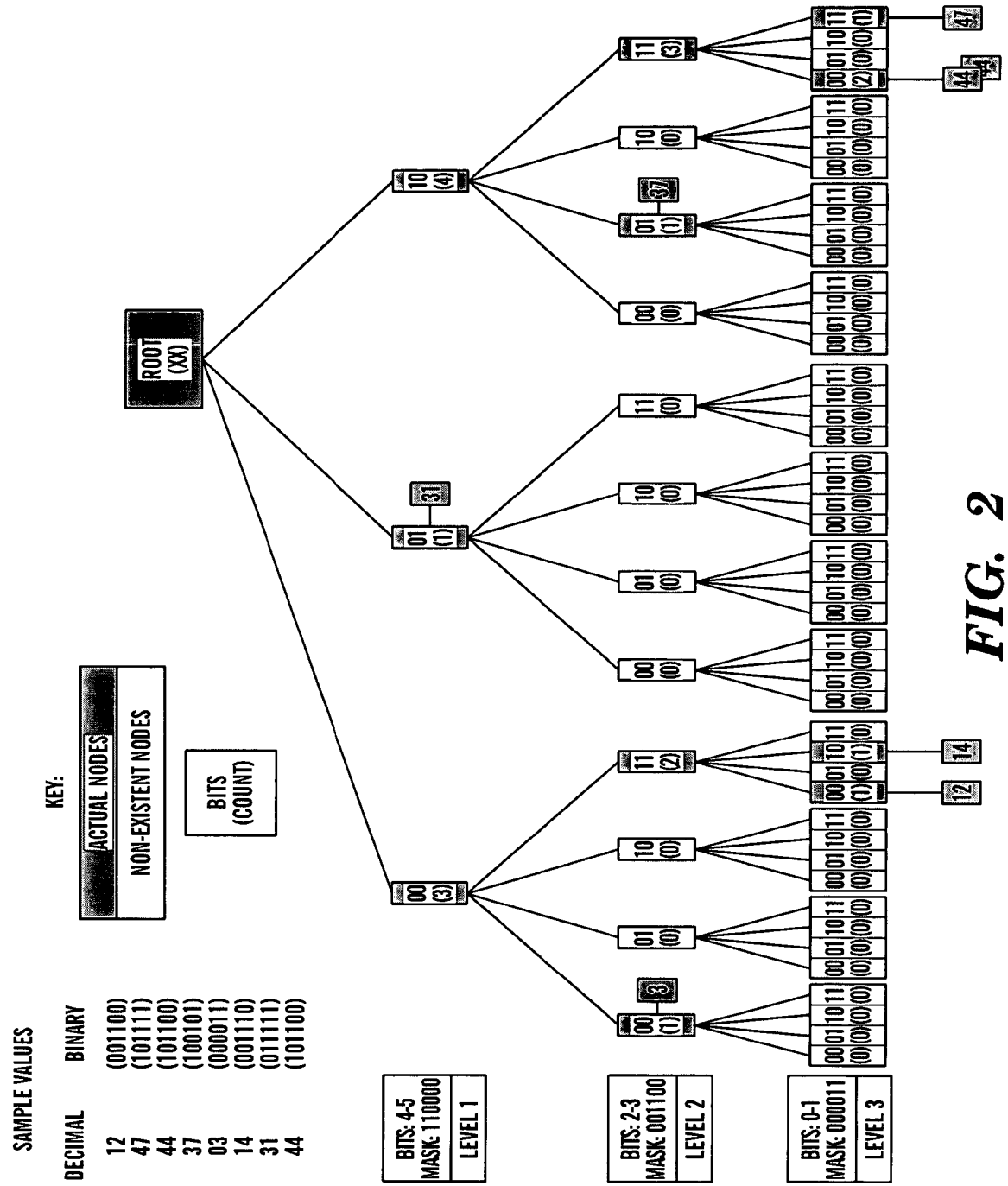
FIG. 2 depicts paths through a linked execution structure for sorting integers, in accordance with embodiments of the present invention.
Figure 3:
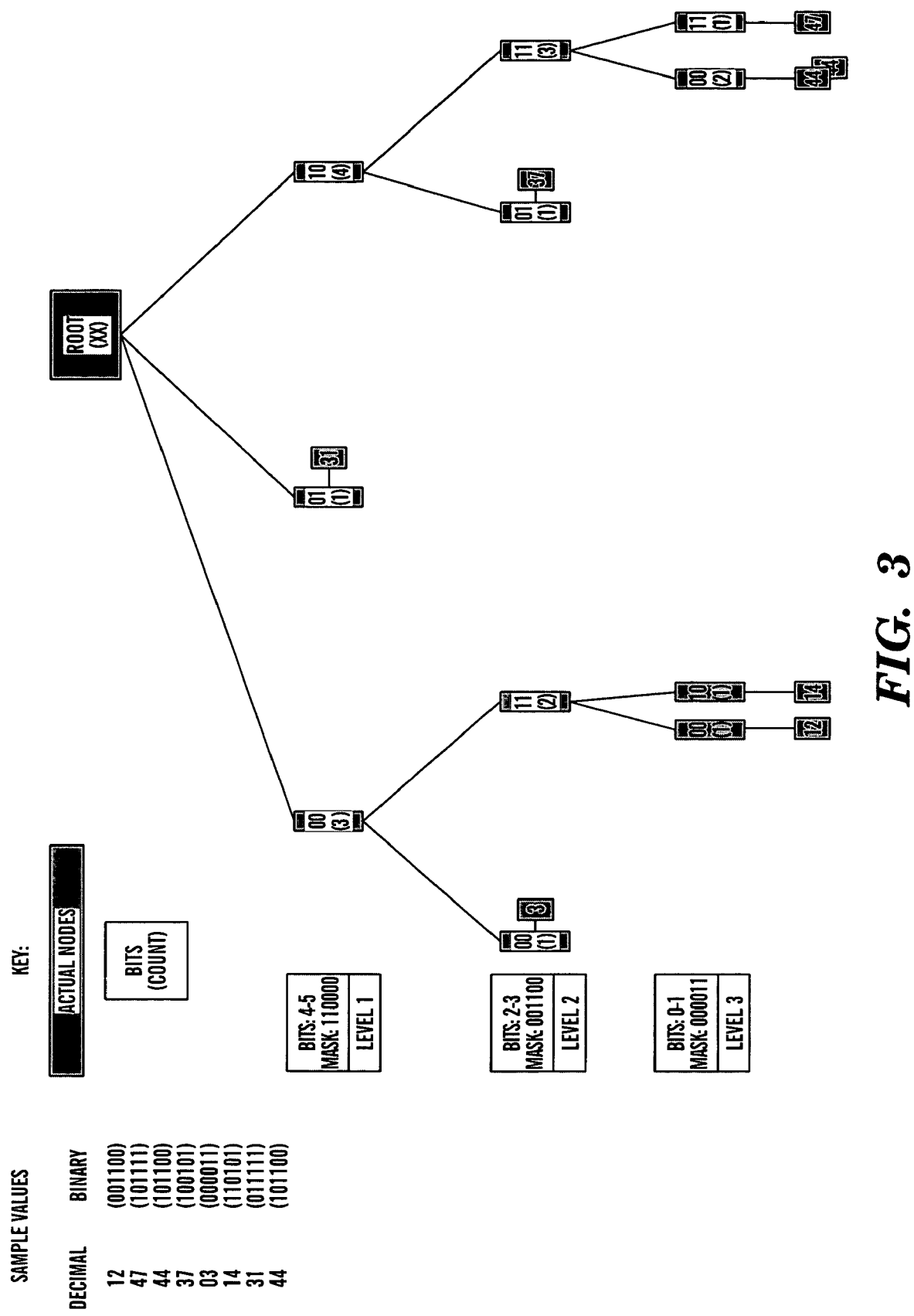
FIG. 3 depicts FIG. 2 with the non-existent nodes deleted, in accordance with embodiments of the present invention.
Figure 4:
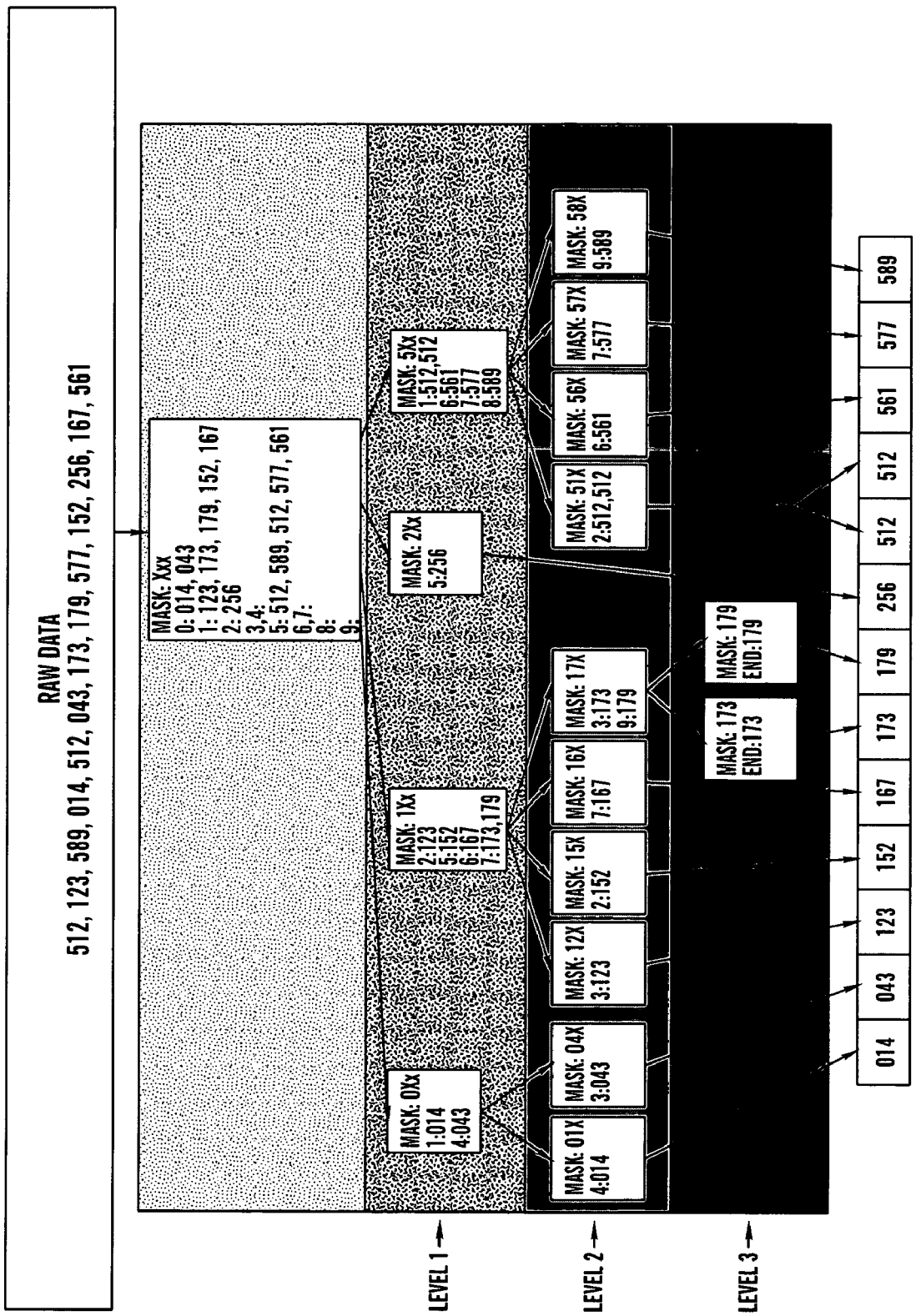
FIG. 4 depicts paths through a linked execution structure for sorting strings with each path terminated at a leaf node, in accordance with embodiments of the present invention.

Although the scope of the present invention permits a variable mask width W as in the preceding example, the example of FIG. 1 as well as the examples of FIGS. 2-4 discussed infra use a constant mask width for simplicity. For the example of FIG. 1, N=12, W=3, and L=4. It should be noted that the maximum numerical value that the N bits could have is $2^N-1$. Thus, the maximum value that a 12-bit word could have is 4095.

In FIG. 1, the linked execution structure has a root, levels, and nodes. Assuming a constant mask of width W, the root in FIG. 1 is represented as a generic field of W bits having the form xxx where x is 0 or 1. Thus, the width W of the mask used for sorting is the number of bits (3) in the root. The generic nodes corresponding to the root encompass all possible values derived from the root. Hence the generic nodes shown in FIG. 1 are 000, 001, 010, 011, 011, 100, 101, 110, and 111. The number of such generic nodes is $2^w$, or 8 if W=3 as in FIG. 1. There are L levels (or "depths") such that each field of a word corresponds to a level of the linked execution structure. In FIG. 1, the 4 levels (i.e., L=4) are denoted as Level 1, Level 2, Level 3, and Level 4.

Consider the example word 100011110110 shown in FIG. 1. Below the root are 8 generic nodes of Level 1, called "child nodes" of the root. The first field of the example word is 100 corresponding to the 100 node in Level 1. Below the 100 node of Level 1 are the 8 generic nodes of Level 2, namely the child nodes of the 100 node of Level 1. The second field of the example word is 011 corresponding to the 011 node in Level 2. Below the 011 node of Level 2 are its 8 child nodes in Level 3. The third field of the example word is 110 corresponding to the 110 node in Level 3. Below the 110 node of Level 3 are its 8 child nodes in Level 4. The fourth field of the example word is 110 corresponding to the 110 node in Level 4. Thus, the path through the linked execution structure for the example word 100011110110 consists of the 100 node of level 1, the 011 child node of Level 2, the 110 child node of Level 3, and the 110 child node of Level 4.

Although not shown in FIG. 1, each node of the linked execution structure at level I potentially has the $2^w$ child nodes below it at level I+1. For example the 000 node at Level 1 has 8 child nodes below it, and each such child nodes has 8 child nodes, etc. Thus the maximum number of nodes of the linked execution structure is $2^w+2^{2W}+2^{3W}++2^{LW}$, or $(2^{(L+1)W}-2^W)/(2^W-1)$. In FIG. 1, the total number of nodes is 4680 for W=3 and L=4. Since it is not practical to show all nodes of the linked execution structure, FIG. 1 shows only those nodes and their children which illustrate the path of the example word.

The actual nodes of a linked execution structure relative to a group of words to be sorted comprise actual nodes and non-existent nodes. The paths of the words to be sorted define the actual nodes, and the remaining nodes define the non-existent nodes. Thus in FIG. 1, the actual nodes include 100 node of level 1, the 011 child node of Level 2, the 110 child node of Level 3, and the 110 child node of Level 4. Any other word having a path through the linked execution structure of FIG. 1 defines additional actual nodes.

Another concept of importance is a "leaf node" of the linked execution structure, which is an actual node that is also a terminal node of a path through the linked execution structure. A leaf node has no children. In FIG. 1, 110 node in Level 4 is a leaf node. In the context of the sort algorithm of the present invention, it is also possible to have a leaf node at a level other than the deepest Level L. Multiple numbers to be sorted may give rise to a given node having more than one child (i.e., the paths of different numbers to be sorted may intersect in one or more nodes). If a given node of the linked execution structure holds more than one unique word to be sorted, then the algorithm must process the child nodes of the given node. If, however, the given node of the linked execution structure holds no more than one unique word to be sorted, then the given node is a leaf node and the sort algorithm terminates the path at the given node without need to consider the child (if any) of the given node. In this situation, the given node is considered to be a leaf node and is considered to effectively have no children. Thus, it is possible for a leaf node to exist at a level $L_1$ wherein $L_1<L$. The concept of such leaf nodes will be illustrated by the examples depicted in FIGS. 2-4, discussed infra.

The sort algorithm of the present invention has an execution time that is proportional to N*Z, wherein Z is a positive real number such that $1 \leq Z \leq L$. As stated supra, N is defined as the number of bits in each word to be sorted, assuming that N is a constant and characterizes each word to be sorted, wherein said assumption holds for the case of an integer sort, a floating point sort, or a string sort such that the string length is constant. Z is a function of the distribution of leaf nodes in the linked execution structure. The best case of Z=1 occurs if all leaf nodes are at level 1. The worst case of Z=L occurs if all leaf nodes occur at Level L. Thus, the execution time for the worst case is proportional to N*L, and is thus linear in N with L being a constant that is controlled by a choice of mask width W. Therefore, the sort algorithm of the present invention is designated herein as a "linear sort". The term "linear sort" is used herein to refer to the sorting algorithm of the present invention.

If the words to be sorted are strings characterized by a variable string length, then the execution time is proportional to $\Sigma_j W_j N_j$, where $N_j$ is a string length in bits or bytes (assuming that the number of bits per byte is a constant), wherein $W_j$ is a weighting factor that is proportional to the number of strings to be sorted having a string length $N_j$. The summation $\Sigma_j$ is from j=1 to j=J such that J is the number of unique string lengths in the strings to be sorted. For example consider 60 strings to be sorted such that 30 strings have 3 bytes each, 18 strings have 4 bytes each, and 12 strings have 5 bytes each. For this example, J=3, $N_1$=3 bytes, $W_1 \propto 30$, $N_2$=4 bytes, $W_2 \propto 18$, $N_3$=5 bytes, $W_3 \propto 12$ bytes, wherein the symbol "$\propto$" stands for "proportional to". Thus, the sort execution time is a linear combination of the string lengths $N_j$ (expressed in bits or bytes) of the variable-length strings to be sorted. Accordingly, the sort algorithm of the present invention is properly designated herein as a "linear sort" for the case of sorting variable-length strings.

In light of the preceding discussion, the sort algorithm of the present invention is designated herein as having a sorting execution time for sorting words (or sequences of bits), wherein said sorting execution time is a linear function of the word length (or sequence length) of the words (or sequences) to be sorted. The word length (or sequence length) may be a constant length expressed as a number of bits or bytes (e.g., for integer sorts, floating point sorts, or string sorts such that the string length is constant). Thus for the constant word length (or sequence length) case, an assertion herein and in the claims that the sorting execution time function is a linear function of the word length (or sequence length) of the words (or sequences) to be sorted means that the sorting execution time is linearly proportional to the constant word length (or sequence length).

Alternatively, the word length (or sequence length) may be a variable length expressed as numbers of bits or bytes (e.g., for string sorts such that the string length is variable). Thus for the constant word length (or sequence length) case, an assertion herein and in the claims that the sorting execution time function is a linear function of the word length (or sequence length) of the words (or sequences) to be sorted means that the sorting execution time is proportional to a linear combination of the unique non-zero values of string length (i.e., $N_j \neq 0$) which characterize the strings to be sorted.

Note that the sorting execution time of the present invention is also a linear (or less than linear) function of S wherein S is the number of sequences to be sorted, as will be discussed infra.

Also note that an analysis of the efficiency of the sorting algorithm of the present invention may be expressed in terms of an "algorithmic complexity" instead of in terms of a sorting execution time, inasmuch as the efficiency can be analyzed in terms of parameters which the sorting execution time depends on such as number of moves, number of compares, etc. This will be illustrated infra in conjunction with FIGS. 10-13.

As stated supra, L=N/W (if W is constant) and the upper-limiting value $V_{UPPER}$ that may potentially be sorted is $2^N-1$. Consequently, $L=(\log_2 V_{UPPER}+1)/W$. Interestingly, L is thus dependent upon both W and $V_{UPPER}$ and does not depend on the number of values to be sorted, which additionally reduces the sort execution time. Inspection of the sort algorithm shows that a larger mask width W indicates a less efficient use of memory but provides a faster sort except at the very highest values of W (see FIGS. 19-24 and description thereof). Since the sort execution time depends on W through the dependence of L or Z on W, one can increase the sort execution speed by adjusting W upward in recognition of the fact that a practical upper limit to W may be dictated by memory storage constraints, as will be discussed infra.

The sort algorithm of the present invention assumes that: 1) for any two adjacent bits in the value to be sorted, the bit to the left represents a larger magnitude effect on the value than the bit to the right; or 2) for any two adjacent bits in the value to be sorted, the bit to the right represents a larger magnitude effect on the value than the bit to the left. The preceding assumptions permit the sort algorithm of the present invention to be generally applicable to integer sorts and string sorts. The sort algorithm is also applicable to floating point sorts in which the floating point representation conforms to the commonly used format having a sign bit denoting the sign of the floating point number, an exponent field (wherein positive and negative exponents may be differentiated by addition of a bias for negative exponents as will be illustrated infra), and a mantissa field, ordered contiguously from left to right in each word to be sorted. The sort algorithm is also applicable to other data types such as: other floating point representations consistent with 1) and 2) above; string storage such that leftmost bytes represent the length of the string; little endian storage; etc.

The sort algorithm of the present invention includes the following characteristics: 1) the sort execution time varies linearly with N as discussed supra; 2) the sort execution time varies linearly (or less than linearly) with S as discussed supra; 3) the values to be sorted are not compared with one another as to their relative values or magnitudes; 4) the sort execution speed is essentially independent of the data ordering characteristics (with respect to data value or magnitude) in the array of data to be sorted; 5) the sort efficiency (i.e., with respect to execution speed) varies with mask width and the sort efficiency can be optimized through an appropriate choice of mask width; 6) for a given mask width, sort efficiency improves as the data density increases, wherein the data density is measured by $S/(V_{MAX}-V_{MIN})$, wherein S denotes the number of values to be sorted, and wherein $V_{MAX}$ and $V_{MIN}$ are, respectively, the maximum and minimum values within the data to be sorted, so that the sort execution time may vary less that linearly with S (i.e., the sort execution time may vary as $S^Y$ such that Y<1); and 7) although the linked execution structure of FIG. 1 underlies the methodology of the sort algorithm, the linked execution structure is not stored in memory during execution of the sort (i.e., only small portions of the linked execution structure are stored in memory at any point during execution of the sort).

The linked execution structure of the present invention includes nodes which are linked together in a manner that dictates a sequential order of execution of program code with respect to the nodes. Thus, the linked execution structure of the present invention may be viewed a program code execution space, and the nodes of the linked execution structure may be viewed as points in the program code execution space. As will be seen in the examples of FIGS. 2-4 and the flow charts of FIGS. 5-6, described infra, the sequential order of execution of the program code with respect to the nodes is a function of an ordering of masking results derived from a masking of the fields of the words (i.e., sequences of bits) to be sorted.

2. The Sort Algorithm

FIG. 2 depicts paths through a linked execution structure for sorting integers, in accordance with embodiments of the present invention. FIG. 2 illustrates a sorting method, using a 2-bit mask, for the eight integers (i.e., S=8) initially sequenced in decimal as 12, 47, 44, 37, 03, 14, 31, and 44. The binary equivalents of the words to be sorted are shown. Each word to be sorted has 6 bits identified from right to left as bit positions 0, 1, 2, 3, 4, and 5. For this example: S=8, N=6, W=2, and L=3. The root is represented as a generic field of W=2 bits having the form xx where x is 0 or 1. The generic nodes corresponding to the root are 00, 01, 10, and 11. The number of such generic nodes is $2^W$, or 4 for W=2 as in FIG. 2. There are 3 levels such that each field of a word to be sorted corresponds to a level of the linked execution structure. In FIG. 2, the 3 levels (i.e., L=3) are denoted as Level 1, Level 2, and Level 3. A mask of 110000 is used for Level 1, a mask of 001100 is used for Level 2, and a mask of 000011 is used for Level 3.

The Key indicates that a count of the number of values in each node is indicated with a left and right parenthesis ( ), with the exception of the root which indicates the form xx of the root. For example, the 00 node of level one has three values having the 00 bits in bit positions 4 and 5, namely the values 12 (001100 ), 03 (000011 ), and 14 (001110 ). The Key also differentiates between actual nodes and non-existent nodes. For example, the actual 01 node in Level 1 is a leaf node containing the value 31, so that the nodes in Levels 2 and 3 that are linked to the leaf node 01 in Level 1 are non-existent nodes which are present in FIG. 2 but could have been omitted from FIG. 2. Note that non-existent nodes not linked to any path are omitted entirely from FIG. 2. For example, the non-existent 11 node in Level 1 has been omitted, since none of the words to be sorted has 11 in bit positions 4 and 5. FIG. 3 depicts FIG. 2 with all non-existent nodes deleted.

The integer sort algorithm, which has been coded in the C-programming language as shown in FIG. 7, is applied to the example of FIG. 2 as follows. An output array A(1), A(2), . . . , A(S) has been reserved to hold the outputted sorted values. For simplicity of illustration, the discussion infra describes the sort process as distributing the values to be sorted in the various nodes. However, the scope of the present invention includes the alternative of placing pointers to values to be sorted (e.g., in the form of linked lists), instead of the values themselves, in the various nodes. Similarly, the output array A(1), A(2), . . . , A(S) may hold the sorted values or pointers to the sorted values.

The mask at each level is applied to a node in the previous level, wherein the root may be viewed as a root level which precedes Level 1, and wherein the root or root level may be viewed as holding the S values to be sorted. In FIG. 2 and viewing the root as holding all eight values to be sorted, the Level 1 mask of 110000 is applied to all eight values to be sorted to distribute the values in the 4 nodes (00, 01, 11 ) in Level 1 (i.e., based on the bit positions 4 and 5 in the words to be sorted). The generic nodes 00, 01, 11 are ordered in ascending value (i.e., 0, 1, 2, 3) from left to right at each of Levels 1, 2 and 3, which is necessary for having the sorted values automatically appear outputted sequentially in ascending order of value. It is also necessary to have the 11 bits in the mask shifted from left to right as the processing moves down in level from Level 1 to Level 2 to Level 3, which is why the 11 bits are in bit positions 4-5 in Level 1, in bit positions 2-3 in Level 2, and in bit positions 0-1 in Level 3. Applying the mask (denoted as "MASK") to a word ("WORD") means performing the logical operation MASK AND WORD to isolate all words having bits corresponding to "11" in MASK. As shown for Level 1, the 00 node has 3 values (12, 03, 14), the 01 node has 1 value (31), the 10 node has 4 values (47, 44, 37, 44), and the 11 node has zero values as indicated by the absence of the 11 node at Level 1 in FIG. 2. Note that the 10 node in Level 1 has duplicate values of 44. Next, the actual nodes 00, 01, and 10 in Level 1 are processed from left to right.

Processing the 00 node of Level 1 comprises distributing the values 12, 03, and 14 from the 00 node of Level 1 into its child nodes 00, 01, 11 in Level 2, based on applying the Level 2 mask of 001100 to each of the values 12, 03, and 14. Note that the order in which the values 12, 03, and 14 are masked is arbitrary. However, it is important to track the left-to-right ordering of the generic 00, 01, 10, and 11 nodes as explained supra. FIG. 2 shows that the 00 node of Level 2(*as* linked to the 00 node of Level 1) is a leaf node, since the 00 node of Level 2 has only 1 value, namely 03. Thus, the value 03 is the first sorted value and is placed in the output array element A(1). Accordingly, the 00, 01, 10, and 11 nodes of Level 3 (which are linked to the 00 node of Level 2 which is linked to the 00 node of Level 1) are non-existent nodes. FIG. 2 also shows that the 11 node of level 2 (as linked to the 00 node of Level 1) has the two values of 12 and 14. Therefore, the values 12 and 14 in the 11 node of level 2 (as linked to the 00 node of Level 1) are to be next distributed into its child nodes 00, 01, 11 of Level 3, applying the Level 3 mask 000011 to the values 12 and 14. As a result, the values 12 and 14 are distributed into the leaf nodes 00 and 10, respectively, in Level 3. Processing in the order 00, 01, 10, 11 from left to right, the value 12 is outputted to A(2) and the value 14 is outputted to A(3).

FIG. 2 shows that the 01 node of Level 1 is a leaf node, since 31 is the only value contained in the 01 node of Level 1. Thus, the value of 31 is outputted to A(4). Accordingly, all nodes in Level 2 and 3 which are linked to the 01 node of Level 1 are non-existent nodes.

Processing the 10 node of Level 1 comprises distributing the four values 47, 44, 37, and 44 from the 10 node of Level 1 into its child nodes 00, 01, 11 in Level 2, based on applying the Level 2 mask of 001100 to each of the values 47, 44, 37, and 44. FIG. 2 shows that the 01 node of Level 2(*as* linked to the 10 node of Level 1) is a leaf node, since the 01 node of Level 2 has only 1 value, namely 37. Thus, the value 37 is placed in the output array element A(5). Accordingly, the 00, 01, 10, and 11 nodes of Level 3 which are linked to the 01 node of Level 2 which is linked to the 10 node of Level 1 are non-existent nodes. FIG. 2 also shows that the 11 node of level 2 (as linked to the 10 node of Level 1) has the three values of 47, 44, and 44. Therefore, the values 47, 44, and 44 in the 11 node of level 2 (as linked to the 10 node of Level 1) are to be next distributed into its child nodes 00, 01, 11 of Level 3(from left to right), applying the Level 3 mask 000011 to the values 47, 44, and 44. As a result, the duplicate values of 44 and 44 are distributed into the leaf nodes 00 in Level 3, and the value of 47 is distributed into the leaf nodes 11 in level 3. Processing in the order 00, 01, 10, 11 from left to right, the value 44 is outputted to A(6), the duplicate value 44 is outputted to A(7), and the value 47 is outputted to A(8). Thus, the output array now contains the sorted values in ascending order or pointers to the sorted values in ascending order, and the sorting has been completed.

While the preceding discussion of the example of FIG. 2 considered the words to be sorted to be integers, each of the words to be sorted could be more generally interpreted as a contiguous sequence of binary bits. The sequence of bits could be interpreted as an integer as was done in the discussion of FIG. 2 supra. The sequence of bits could alternatively be interpreted as a character string, and an example of such a character string interpretation will be discussed infra in conjunction with FIG. 4. Additionally, the sequence could have been interpreted as a floating point number if the sequence had more bits (i.e., if N were large enough to encompass a sign bit denoting the sign of the floating point number, an exponent field, and a mantissa field). Thus, the sorting algorithm is generally an algorithm for sorting sequences of bits whose interpretation conforms to the assumptions stated supra. It should be noted, however, that if the sequences are interpreted as numbers (i.e., as integers or floating point numbers) then the word length (in bits) N must be constant. If the sequences are interpreted as character strings, however, then the word length N is not required to be constant and the character strings to be sorted may have a variable length.

An important aspect of the preceding sort process is that no comparisons were made between the values to be sorted, which has the consequence of saving an enormous amount of processing time that would otherwise have been expended had such comparisons been made. The sort algorithm of the present invention accomplishes the sorting in the absence of such comparisons by the masking process characterized by the shifting of the 11 bits as the processing moves down in level from Level 1 to Level 2 to Level 3, together with the left to right ordering of the processing of the generic 00, 01, 10, 11 nodes at each level. The fact that the output array A(1), A(2), . . . , A(8) contains sorted values in ascending order is a consequence of the first assumption that for any two adjacent bits in the value to be sorted, the bit to the left represents a larger magnitude effect on the value than the bit to the right. If the alternative assumption had been operative (i.e., for any two adjacent bits in the value to be sorted, the bit to the right represents a larger magnitude effect on the value than the bit to the left), then the output array A(1), A(2), . . . , A(8) would contain the same values as under the first assumption; however the sorted values in A(1), A(2), . . . , A(8) would be in descending order.

The preceding processes could be inverted and the sorted results would not change except possibly the ascending/descending aspect of the sorted values in A(1), A(2), . . . , (8). Under the inversion, the generic bits would processed from right to left in the ordered sequence: 00, 01, 10, 11 (which is equivalent to processing the ordered sequence 11, 10, 01, 00 from left to right). As a result, the output array A(1), A(2), . . . , A(8) would contain sorted values in descending order as a consequence of the first assumption that for any two adjacent bits in the value to be sorted, the bit to the left represents a larger magnitude effect on the value than the bit to the right. However under the inversion and if the alternative assumption had been operative (i.e., for any two adjacent bits in the value to be sorted, the bit to the right represents a larger magnitude effect on the value than the bit to the left), then the output array A(1), A(2), . . . , A(8) would contain the sorted values in ascending order.

The preceding process assumed that the mask width W is constant. For example, W=2 for the example of FIG. 2. However, the mask width could be variable (i.e., as a function of level or depth). For example consider a sort of 16 bit words having mask widths of 3, 5, 4, 4 at levels 1, 2, 3, 4, respectively. That is, the mask at levels 1, 2, 3, and 4 may be, inter alia, 1110000000000000, 0001111100000000, 0000000011110000, and 0000000000001111, respectively. Generally, for N-bit words to be sorted and L levels of depth, the mask widths $W_1, W_2, \ldots, W_L$ corresponding to levels 1, 2, . . . , L, respectively, must satisfy: $W_1+W_2, + \ldots +W_L \leq N$. It is always possible have masks such that $W_1+W_2, + \ldots + W_L=N$. However, an improvement in efficiency may be achieved for the special case in which all numbers to be sorted have 0 in one or more contiguous leftmost bits, as will be illustrated infra. In said special case, said leftmost bits having 0 in all words to be sorted would not be masked and consequently $W_1+W_2, + \ldots +W_L<N$.

There are several reasons for having a variable mask width. A first reason for having a variable mask width W is that it may not be logically possible to have a constant mask width if L>1, such as for the case of N being a prime number. For example, if N=13, then there does not exist an integer L of at least 2 such that N/L is an integer. In theory, it is potentially possible to choose W=N even if N is a prime number. However, memory constraints may render the choice of W=N unrealistic as will be discussed next.

A second reason for having a variable mask width W, even if it logically possible for W to be constant with L>1, is that having a variable W may reduce the sort execution time inasmuch as the sort execution time is a function of W as stated supra. As W is increased, the number of levels may decrease and the number of nodes to be processed may likewise decrease, resulting in a reduction of processing time. However, the case of sufficiently large W may be characterized by a smallest sort execution time, but may also be characterized by prohibitive memory storage requirements and may be impracticable (see infra FIG. 16 and discussion thereof). Thus in practice, it is likely that W can be increased up to a maximum value above which memory constraints become controlling. Thus the case of L>1 is highly likely, and two or more mask widths will exist corresponding to two or more levels. As will be seen from the analysis of timing test data discussed in conjunction with FIGS. 19-24 discussed infra, the sort efficiency with respect to execution speed is a function not only of mask width but also of the data density as measured by $S/(V_{MAX}-V_{MIN})$. Moreover, the mask width and the data density do not independently impact the sort execution speed. Instead the mask width and the data density are coupled in the manner in which they impact the sort execution speed. Therefore, it may be possible to fine tune the mask width as a function of level in accordance with the characteristics (e.g., the data density) of the data to be sorted.

Another improvement in sort execution timing may result from finding the highest or maximum value $V_{MAX}$ to be sorted and then determine if $V_{MAX}$ is of such a magnitude that N can be effectively reduced. For example, if 8-bit words are to be sorted and $V_{MAX}$ is determined to have the value 00110101, then bits 7-8 of all words to be sorted have 00 in the leftmost bits 6-7. Therefore, bits 7-8 do not have to be processed in the sorting procedure. To accomplish this, a mask could be employed in a three-level sorting scheme having N=8, L=3, $W_1$=2, $W_2$=2 and $W_3$=2. The masks for this sorting scheme are 00110000 for level 1, 00001100 for level 2, and 00000011 for level 3. Although N=8 technically prevails, the actual sort time will be reflective of N=6 rather than N=8, because the masks prevent bits 6-7 from being processed.

Similarly, one could find a lowest or minimum value $V_{MIN}$ to be sorted and then determine if $V_{MIN}$ is of such a magnitude that N can be effectively reduced. For example, if 8-bit words are to be sorted and $V_{MIN}$ is determined to have the value 10110100, then bits 0-1 of all words to be sorted have 00 in the rightmost bits 0-1. Therefore, bits 0-1 do not have to be processed in the sorting procedure. To accomplish this, a variable width mask could be employed in a three-level sorting scheme having N=8, L=3, $W_1$=2 $W_2$=2 and $W_3$=2. The masks for this sorting scheme are 11000000 for level 1, 00110000 for level 2, and 00001100 for level 3. Although N=8 technically in this scheme, the actual sort time will be reflective of N=6 rather than N=8, because the masks prevent bits 0-1 from being processed at all.

Of course, it may be possible to utilize both $V_{MAX}$ and $V_{MIN}$ in the sorting to reduce the effective value of N. For example, if 8-bit words are to be sorted and $V_{MAX}$ is determined to have the value 00110100 and $V_{MIN}$ is determined to have the value 00000100, then bits 7-8 of all words to be sorted have 00 in the leftmost bits 6-7 and bits 0-1 of all words to be sorted have 00 in the rightmost bits 0-1. Therefore, bits 7-8 and 0-1 do not have to be processed in the sorting procedure. To accomplish this, a constant width mask could be employed in a two-level sorting scheme having N=8, L=2, and W=2. The masks for this sorting scheme are 00110000 for level 1 and 00001100 for level 2. Although N=8 technically in this scheme, the actual sort time will be reflective of N=4 rather than N=8, because the masks prevent bits 6-7 and 0-1 from being processed at all.

The integer sorting algorithm described supra in terms of the example of FIG. 2 applies generally to integers. If the integers to be sorted are all non-negative, or are all negative, then the output array A(1), A(2), . . . , will store the sorted values (or pointers thereto) as previously described. However, if the values to be sorted are in a standard signed integer format with the negative integers being represented as a two's complement of the corresponding positive integer, and if the integers to be sorted include both negative and non-negative values, then output array A(1), A(2), . . . stores the negative sorted integers to the right of the non-negative sorted integers. For example the sorted results in the array A(1), A(2), . . . may appear as: 0, 2, 5, 8, 9, −6, −4, −2, and the algorithm could test for this possibility and reorder the sorted results as: −6, −4, −2, 0, 2, 5, 8, 9.

The sorting algorithm described supra will correctly sort a set of floating point numbers in which the floating point representation conforms to the commonly used format having a sign bit, an exponent field, and a mantissa field ordered contiguously from left to right in each word to be sorted. The standard IEEE 754 format represents a single-precision real number in the following 32-bit floating point format:

| Sign Bit (1 bit) | Exponent Field (8 bits) | Mantissa Field (23 bits) |
|---|---|---|

IEEE 754 requires the exponent field to have a +127 (i.e., 01111111) bias for positive exponents and no bias for negative exponents. The exponent field bits satisfy the previously stated assumption that for any two adjacent bits in the value to be sorted, the bit to the left represents a larger magnitude effect on the value than the bit to the right, as may be seen in the following table for the exponents of −2, −1, 0, +1, and +2.

| Exponent Value | Exponent Field Bits |
|---|---|
| −2 | 01111101 |
| −1 | 01111110 |
| 0 | 01111111 |
| 1 | 10000000 |
| 2 | 10000001 |

The number of bits in the exponent and mantissa fields in the above example is merely illustrative. For example, the IEEE 754 representation of a double-precision floating point number has 64 bits (a sign bit, an 11-bit exponent, and a 52-bit mantissa) subject to an exponent bias of +1023. Generally, the exponent and mantissa fields may each have any finite number of bits compatible with the computer/processor hardware being used and consistent with the degree of precision desired. Although the sign bit is conventionally 1 bit, the sort algorithm of the present invention will work correctly even if more than one bit is used to describe the sign. It is assumed herein that the position of the decimal point is in a fixed position with respect to the bits of the mantissa field and the magnitude of the word is modulated by the exponent value in the exponent field, relative to the fixed position of the decimal point. As illustrated supra, the exponent value may be positive or negative which has the effect of shifting the decimal point to the left or to the right, respectively.

Due to the manner in which the sign bit and exponent field affect the value of the floating-point word, a mask may used to define field that include any contiguous sequence of bits. For example, the mask may include the sign bit and a portion of the exponent field, or a portion of the exponent field and a portion of the mantissa field, etc. In the 32-bit example supra, for example, the sorting configuration could have 4 levels with a constant mask width of 8 bits: N=32, L=4, and W=8. The mask for level 1 is $11111110_{24}$, wherein $0_{24}$ represents 24 consecutive zeroes. The mask for level 2 is 0000000011111111016, wherein $0_{16}$ represents 16 consecutive zeroes. The mask for level 3 is $0_{16}$ 1111111100000000. The mask for level 2 is $0_{24}$ 11111111. Thus the mask for level 1 includes the sign bit and the 7 leftmost bits of the exponent field, the mask at level 2 includes the rightmost bit of the exponent field and the 7 leftmost bits of the mantissa field, an the mask for levels 3 and 4 each include 8 bits of the mantissa field.

If the floating point numbers to be sorted include a mixture of positive and negative values, then the sorted array of values will have the negative sorted values to the right of the positive sorted values in the same hierarchical arrangement as occurs for sorting a mixture of positive and negative integers described supra.

FIG. 4 depicts paths through a linked execution structure for sorting strings with each path terminated at a leaf node, in accordance with embodiments of the present invention. In FIG. 4, thirteen strings of 3 bytes each are sorted. The 13 strings to be sorted are: 512, 123, 589, 014, 512, 043, 173, 179, 577, 152, 256, 167, and 561. Each string comprises 3 characters selected from the following list of characters: 0, 1, 2, 3, 4, 5, 6, 7, 8, and 9. Each character consists of a byte, namely 8 bits. Although in the example of FIG. 4 a byte consists of 8 bits, a byte may generally consist of any specified number of bits. The number of potential children (i.e., child nodes) at each node is $2^b$ where b is the number of bits per byte. Thus in FIG. 4, each node potentially has 256 (i.e., 28) children. The sequence 014, 043, 123, . . . at the bottom of FIG. 4 denoted the strings in their sorted order.

In FIG. 4, the string length is constant, namely 3 characters or 24 bits. Generally, however, the string length may be variable. The character string defines a number of levels of the linked execution structure that is equal to the string length as measured in bytes. There is a one-to-one correspondence between byte number and level number. For example, counting left to right, the first byte corresponds to level 1, the second byte corresponds to level 2, etc. Thus, if the string length is variable then the maximum number of levels L of the linked execution structure is equal to the length of the longest string to be sorted, and the processing of any string to be sorted having a length less than the maximum level L will reach a leaf node at a level less than L.

The mask width is a constant that includes one byte, and the boundary between masks of successive levels coincide with byte boundaries. Although the sorting algorithm described in conjunction with the integer example of FIG. 2 could be used to sort the character strings of FIG. 4, the sorting algorithm to sort strings could be simplified to take advantage of the fact that mask boundaries coincide with byte boundaries. Rather than using an explicit masking strategy, each individual byte may be mapped into a linked list at the byte's respective level within the linked execution structure. Under this scheme, when the processing of a string reaches a node corresponding to the rightmost byte of the string, the string has reached a leaf node and can then be outputted into the sorted list of strings. For example, a programming language with uses length/value pairs internally for string storage can compare the level reached with the string's length (in bytes) to determine when that the string has reached a leaf node. The preceding scheme is an implicit masking scheme in which the mask width is equal to the number of bits in a character byte. Alternatively, the algorithm could use an explicit masking scheme in which any desired masking configuration could be used (e.g., a mask could encompass bits of two or more bytes). Thus, a masking strategy is always being used, either explicitly or implicitly.

In FIG. 4, the sorting of the thirteen strings 3-byte strings are characterized by S=13, N=24 (i.e. 3 bytes×8 bits/byte), W=8 (i.e., 1 byte), and L=3. Shown in each node is a mask associated with the node, and the strings whose path passes through the node. The mask in each node is represented as a sequence of bytes and each byte might may be one of the following three unique symbols: X, x, and h where h represents one of the characters 0, 1, 2, 3, 4, 5, 6, 7, 8, 9. The position within the mask of the symbol X is indicative of the location (and associated level) of child nodes next processed. The X is used to mask various strings, as will be described infra, by setting X equal to the mask character; thus if X is being used to isolate strings having "5" in the masked position of the strings then X="5" will characterize the mask. The symbol "h" and its position in the mask indicates that the strings in the node each have the character represented by "h"

in the associated position. The position within the mask of the symbol "x" indicates the location (and associated level) of the mask representative of other child nodes (e.g., "grandchildren") to be subsequently processed.

The strings shown in each node in FIG. 4 each have the form H: s(1), s(2), . . . , wherein H represents a character of the string in the byte position occupied by X, and wherein s(1), s(2), are strings having the character represented by H in the byte position occupied by X. For example, in the node whose mask is 0Xx, the string denoted by 1:014 has "0" in byte position 1 and "1" in byte position 2, and the string denoted by 4:043 has "0" in byte position 1 and "4" in byte position 2. As another example, in the node whose mask is 17X, the string denoted by 3:173 has "1" in byte position 1, "7" in byte position 2, and "3" in byte position 3, whereas the string denoted by 9:179 has "1" in byte position 1, "7" in byte position 2, and "9" in byte position 3.

The method of sorting the strings of FIG. 4 follows substantially the same procedure as was described supra for sorting the integers of FIG. 2. The string sort algorithm, which has been coded in the C-programming language as shown in FIG. 8, is applied to the example of FIG. 4 as follows. Similar to FIG. 2, an output array A(1), A(2), . . . , A(S) has been reserved to hold the outputted sorted values. For simplicity of illustration, the discussion infra describes the sort process as distributing the values to be sorted in the various nodes. However, the scope of the present invention includes the alternative of placing pointers to values to be sorted (e.g., in the form of linked lists), instead of the values themselves, in the various nodes. Similarly, the output array A(1), A(2), . . . , A(S) may hold the sorted values or pointers to the sorted values.

First, the root node mask of Xxx is applied to all thirteen strings to be sorted to distribute the strings in the 10 nodes 0Xx, 1Xx, . . . , 9Xx, resulting of the extraction and storage of the strings to be sorted and their identification with the first byte of 0, 1, 2, 3, 4, 5, 6, 7, 8, or 9. Applying the mask a string may be accomplished by ANDing the mask with the string to isolate the strings having a byte corresponding to the byte position of X in the mask to identify the child nodes. As another approach, the character bytes of a string could be pointed to or extracted from the string by use of a string array subscript, wherein the string array subscript serves as the mask by providing the functionality of the mask. Masking a sequence of bits is defined herein as extracting (or pointing to) a subset of the bits of the sequence. Thus, masking with X=0 isolates the strings 014 and 043 which define child node 0Xx, masking with X=1 isolates the strings 123, 173, 179, 152, 167 which defines the child node 1Xx, etc. Processing the Xxx root node comprises distributing the thirteen strings into the child nodes 0Xx, 1Xx, etc. The child nodes 0Xx, 1Xx, etc. at Level 1 are next processed on the order 0Xx, 1Xx, etc. since 0<1<. . . in character value. Note that the characters are generally processed in the order 0, 1, 2, . . . , 9 since 0 <1<2<. . . in character value.

For the 0Xx node at level 1, the 0Xx mask is applied to the strings 014 and 043 to define the next child nodes 01X and 04X, respectively, at Level 2. The 01X and 04X nodes are processed in the sequential order of 01X and 04X since 0 is less than 4 in character value. Note that the characters are always processed in the order 0, 1, 2, . . . , 9. The 01X node at Level 2 is processed, and since the 01X node contains only one string, the 01X node is a leaf node and the string 014 is outputted to A(1). The 04X node at Level 2 is next processed and, since the 04X node contains only one string, the 04X node is a leaf node and the string Q43 is outputted to A(2).

For the 1Xx node at level 1, the 1Xx mask is applied to the strings 123, 152, 167, (173, 179) to define the next child nodes 12X, 15X, 16X, and 17X, respectively, at Level 2. The 12X, 15X, 16X, and 17X nodes are processed in the order 12X, 15X, 16X, and 17X, since the characters are always processed in the order 0, 1, 2, . . . , 9 as explained supra. The 12X node at Level 2 is processed, and since the 12X node contains only one string, the 12X node is a leaf node and the string 123 is outputted to A(3). The 15X node at Level 2 is next processed and, since the 15X node contains only one string, the 15X node is a leaf node and the string 152 is outputted to A(4). The 16X node at Level 2 is next processed and, since the 16X node contains only one string, the 16X node is a leaf node and the string 167 is outputted to A(5). The 17X node at Level 2 is next processed such that the 17X mask is applied to the strings 173 and 179 to define the next child nodes 173 and 179 at Level 3, which are processed in the order of 173 and 179 since 3 is less than 9 in character value. The 173 node at Level 3 is next processed and, since the 173 node contains only one string, the 173 node is a leaf node and the string 173 is outputted to A(6). The 179 node at Level 3 is next processed and, since the 179 node contains only one string, the 179 node is a leaf node and the string 179 is outputted to A(7).

For the 2Xx node at level 1, since the 2Xx node contains only one string, the 2Xx node is a leaf node and the string 256 is outputted to A(8).

For the 5Xx node at level 1, the 5Xx mask is applied to the strings (512, 512), 561, 577, and 589 to define the next child nodes 51X, 56X, 57X, and 58X, respectively, at Level 2. The 51X, 56X, 57X, and 58X nodes are processed in the order 51X, 56X, 57X, and 58X, since the characters are always processed in the order 0, 1, 2, . . . , 9 as explained supra. The 512X node at Level 2 is processed; since the node 51X does not include more than one unique string (i.e., 512 appears twice as duplicate strings), the 51X node at Level 2 is a leaf node and the duplicate strings 512 and 512 are respectively outputted to A(9) and (10). The 56X node at Level 2 is next processed and, since the 56X node contains only one string, the 56X node is a leaf node and the string 561 is outputted to A(11). The 57X node at Level 2 is next processed and, since the 57X node contains only one string, the 57X node is a leaf node and the string 577 is outputted to A(12). The 58X node at Level 2 is next processed and, since the 58X node contains only one string, the 58X node is a leafnode and the string 589 is outputted to A(13). Thus, the output array now contains the sorted strings in ascending order of value or pointers to the sorted values in ascending order of value, and the sorting has been completed.

Similar to the integer sort of FIG. 2, sorting the strings is essentially sorting the binary bits comprised by the strings subject to each character or byte of the string defining a unit of mask. Thus, the sorting algorithm is generally an algorithm for sorting sequences of bits whose interpretation conforms to the assumptions stated supra. No comparisons were made between the values of the strings to be sorted, which has the consequence of saving an enormous amount of processing time that would otherwise have been expended had such comparisons been made. The output array A(1), A(2), . . . , A(13) contains sorted strings in ascending order of value as a consequence of the first assumption that for any two adjacent bits (or bytes) in the string to be sorted, the bit (or byte) to the left represents a larger magnitude effect on the value than the bit (or byte) to the right. If the alternative assumption had been operative (i.e., for any two adjacent bits (or bytes) in the string to be sorted, the bit (or byte) to the right represents a larger magnitude effect on the value than the bit (or byte) to the left), then the output array A(1), A(2), . . . , A(8) would contain the same strings as under the first assumption; however the sorted values in A(1), A(2), ..., A(8) would be in descending order of value.

Similar to the integer sort of FIG. 2, the preceding processes could be inverted and the sorted results would not change except possibly the ascending/descending aspect of the sorted strings in A(1), A(2), ..., (13). Under the inversion, the bytes 0, 1, 2, ..., 8, 9 would processed from right to left in the ordered sequence: 0, 1, 2, ..., 8, 9 (which is equivalent to processing the ordered sequence 9, 8, ..., 2, 1, 0 from left to right). As a result, the output array A(1), A(2), ..., A(8) would contain sorted strings in descending order of value is a consequence of the first assumption that for any two adjacent bits (or bytes) in the string to be sorted, the bit (or byte) to the left represents a larger magnitude effect on the value than the bit (or byte) to the right. However under the inversion and if the alternative assumption had been operative (i.e., for any two adjacent bits (or bytes) in the value to be sorted, the bit (or byte) to the right represents a larger magnitude effect on the value than the bit (or byte) to the left), then the output array A(1), A(2), ..., A(8) would contain the sorted strings in ascending order of value.

As seen from the examples of FIGS. 2-4, the linked execution structure of the present invention includes nodes which are linked together in a manner that dictates a sequential order of execution of program code with respect to the nodes. Thus, the linked execution structure of the present invention may be viewed a program code execution space, and the nodes of the linked execution structure may be viewed as points in the program code execution space. Moreover, the sequential order of execution of the program code with respect to the nodes is in a hierarchical sequence that is a function of an ordering of masking results derived from a masking of the fields of the words to be sorted.

Figure 5:
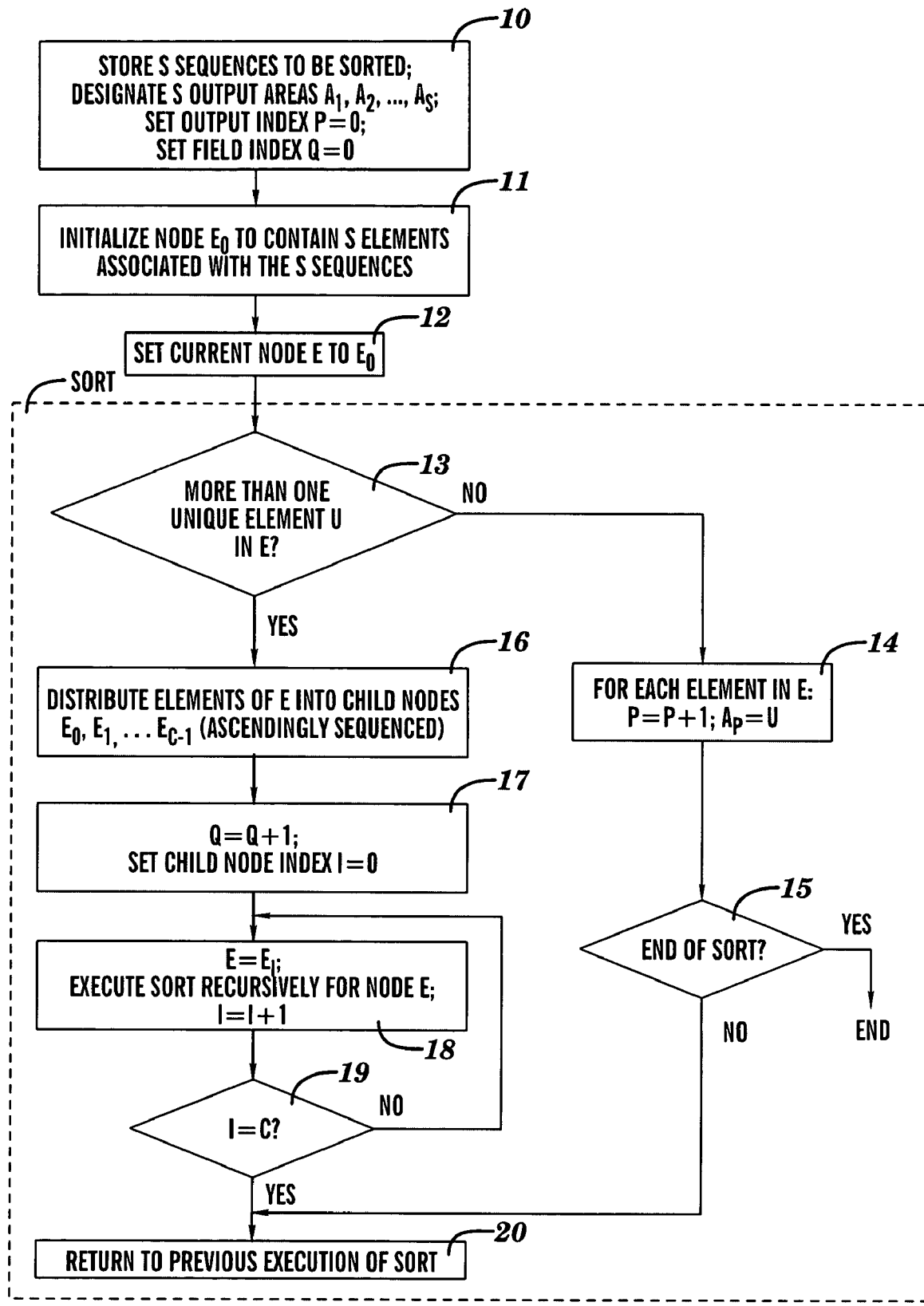
FIG. 5 is a flow chart for linear sorting under recursive execution, in accordance with embodiments of the present invention.

FIG. 5 is a flow chart for linear sorting under recursive execution, in accordance with embodiments of the present invention. The flow chart of FIG. 5 depicts the processes described supra in conjunction with FIGS. 2 and 4, and generally applies to sorting S sequences of binary bits irrespective of whether the sequences are interpreted as integers, floats, or strings. Steps 10-12 constitute initialization, and steps 13-20 are incorporated within a SORT module, routine, function, etc. which calls itself recursively in step 18 each time a new node is processed.

In step 10 of the initialization, the S sequences are stored in memory, S output areas $A_1, A_2 ..., A_s$ are set aside for storing the sorted sequences. S may be set to a minimum value such as, inter alia, 2, 3, etc. The upper limit to S is a function of memory usage requirements (e.g., see FIG. 16 and accompanying description) in conjunction with available memory in the computer system being utilized). The output areas $A_1, A_2, ..., A_s$ correspond to the output areas A(1), A(2), ..., A(S) described supra in conjunction with FIGS. 2 and 4. In addition an output index P and a field index Q are each initialized to zero. The output index P indexes the output array $A_1, A_2, ..., A_s$. The field index Q indexes field of a sequence to be sorted, the field corresponding to the bits of the sequences that are masked and also corresponds to the levels of the linked execution structure.

In step 11 of the initialization, the root node $E_0$ is initialized to contain S elements associated with the S sequences. An element of a sequence is the sequence itself or a pointer to the sequence inasmuch as the nodes may contain sequences or pointers to sequences (e.g, linked lists) as explained supra.

In step 12 of the initialization, a current node E is set equal to the root node $E_0$. The current node E is the node that is currently being processed. Initially, the current node E is the root node $E_0$ that is first processed.

SORT begins at step 13, which determines whether more than one unique element is in the current node E being processed, is determining whether E is a leaf node. No more than one unique element is in E if E contains 1 or a plurality of identical elements, in which case E is a leaf node. If step 13 determines that there is no more than one unique element in E, then E is a leaf node and steps 14 and 15 are next executed. If step 13 determines that there is more than one unique element in E, then node E is not a leaf node and step 16 is next executed.

Step 14 outputs the elements of E in the A array; i.e., for each element in E, the output pointer P is incremented by 1 and the element is stored in $A_p$.

Step 15 determines whether the sort is complete by determining whether all nodes of the linked execution structure have been processed. Noting that SORT calls itself recursively in step 18 each time a new node is processed and that the recursed call of SORT processes only the values assigned to the new node, it is clear that all nodes have been processed when a normal exit from the first node processed by SORT (i.e., the root node) has occurred. Thus step 15 effectuates a normal exit from SORT. If said normal exit from SORT is an exit from processing the root node by SORT, then the sorting has ended. Otherwise, step 20 effectuates a return to execution of the previous copy of SORT that had been recursively executing. It should be noted that step 20 is not implemented by explicit program code, but instead by the automatic backward recursion to the previously executing version of SORT.

Step 16 is executed if E is not a leaf node. In step 16, the elements of E are distributed into C child nodes: $E_0, E_1, ... E_{C-1}$, ascendingly sequenced for processing purposes. An example of this is in FIG. 4, wherein if E represents the root node Xxx then the elements of E (i.e., the strings 014, 043, ..., 577, 561) are distributed into the 4 child nodes (i.e., C=4) of 0Xx, 1Xx, 2Xx, and 5Xx. The child nodes are ascendingly sequenced for processing, which means that the child nodes are processed in the sequence 0Xx, 1Xx, 2Xx, and 5Xx as explained supra in the discussion of FIG. 4.

Step 17 is next executed in which the field index Q (which is also the level index) is incremented by 1 to move the processing forward to the level containing the child nodes $E_0, E_1, ... E_{C-1}$. Step 15 also initializes a child index 1 to 0. The child index points to the child node $E_I$ (I=1, 2, ..., L).

Steps 18-19 define a loop through the child nodes $E_1, E_2, ... E_C$. Step 18 sets the node E to $E_1$ and executes the SORT routine recursively for node E. Thus the child node $E_1$ of the linked execution structure is a recursive instance of a point in the program code (i.e., SORT) execution space. When control returns (from the recursive call), the child index I in incremented by 1, followed in step 19 by a determination of whether the current child node $E_I$ being processed is the last child to be processed (i.e., if I=C). If it is determined that I≠C then execution return to the beginning of the loop at step 18 for execution of the next child node. If it is determined that I=C then all child nodes have been processed and step 20 is next executed. Step 20 effectuates a return to execution of the previous copy of SORT that had been recursively executing.

Figure 6:
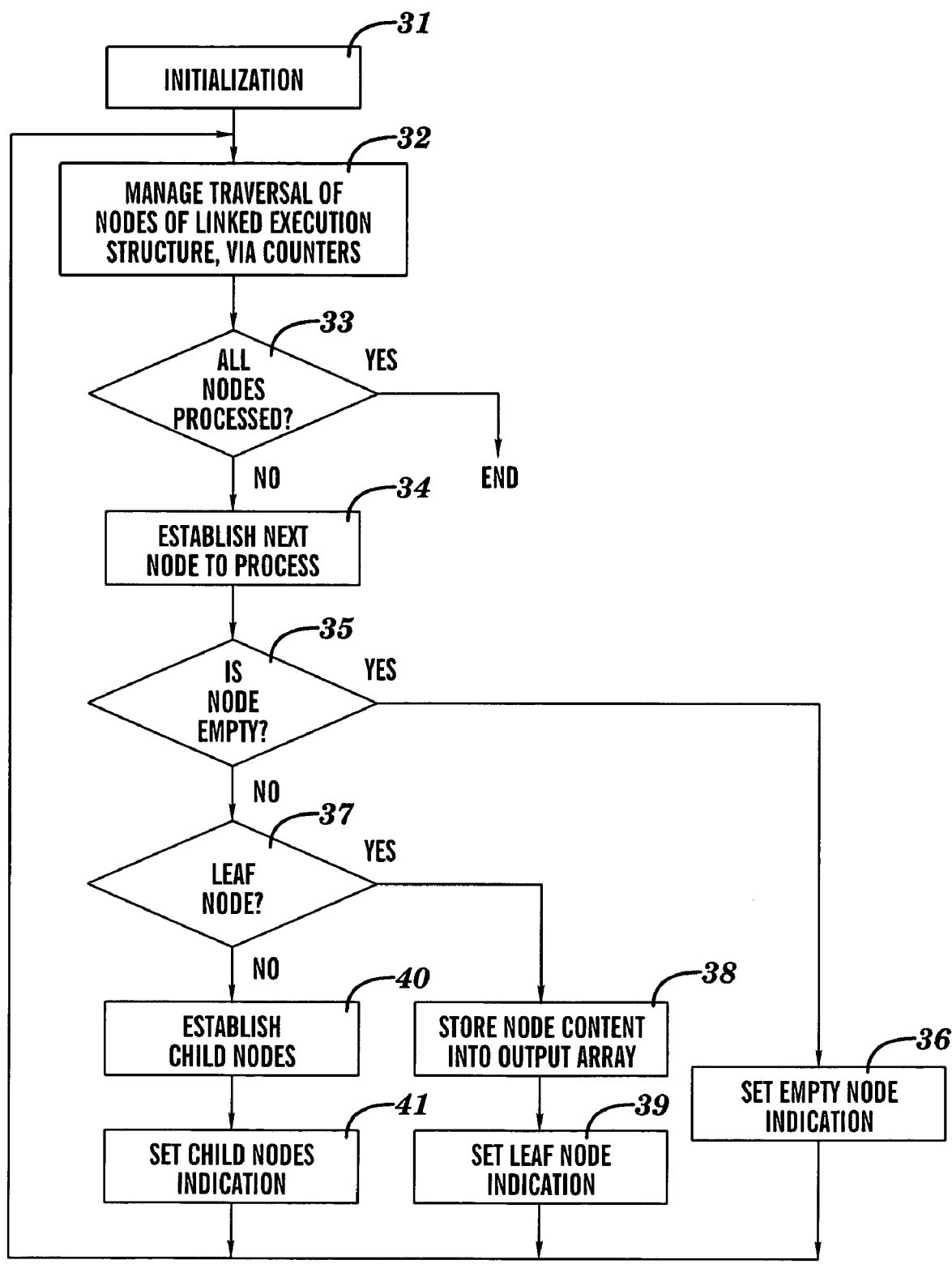
FIG. 6 is a flow chart for linear sorting under counter-controlled looping, in accordance with embodiments of the present invention.

FIG. 6 is a flow chart for linear sorting under counter-controlled looping, in accordance with embodiments of the present invention. FIG. 6 effectuates the same sorting algorithm as FIG. 5, except that the procedure of FIG. 5 executes the nodes recursively, while the procedure of FIG. 6 executes the nodes iteratively through counter-controlled looping.

Step 31 provides initialization which may include substantially some or all of the processes executed in steps 10-12 if FIG. 5. The initializations in step 31 include storing the S sequences to be sorted, designating an output area for storing a sorted output array, initializing counters, etc. The number of sequences to be sorted (S) may be set to a minimum value such as, inter alia, 2, 3, etc. The upper limit to S is a function of memory usage requirements in conjunction with available memory in the computer system being utilized.

Step 32 manages traversal of the nodes of a linked execution structure, via counter-controlled looping. The order of traversal of the nodes are determined by the masking procedure described supra. The counter-controlled looping includes iterative execution of program code within nested loops. Step 32 controls the counters and the looping so as to process the nodes in the correct order; i.e., the order dictated by the sorting algorithm depicted in FIG. 5 and illustrated in the examples of 2 and 4. The counters track the nodes by tracking the paths through the linked execution structure, including tracking the level or depth where each node on each path is located. Each loop through the children of a level I node is an inner loop through nodes having a common ancestry at a level closer to the root. In FIG. 4, for example, an inner loop through the children 173 and 179 of node 17X at level 2 is inner with respect to an outer loop through nodes 12X, 15X, 16X, and 16X having the common ancestor of node 1Xx at level 1. Thus, the inner and outer loops of the preceding example form a subset of the nested loops referred to supra.

Since the paths are complex and each path is unique, the node counters and associated child node counters may be dynamically generated as the processing occurs. Note that the recursive approach of FIG. 5 also accomplishes this tracking of nodes without the complex counter-controlled coding required in FIG. 6, because the tracking in FIG. 5 is accomplished automatically by the compiler through compilation of the recursive coding. Thus from a programming effort point of view, the node traversal bookkeeping is performed in FIG. 5 by program code generated by the compiler's implementation of recursive calling, whereas the node traversal bookkeeping is performed in FIG. 6 by program code employing counter-controlled looping explicitly written by a programmer. Using FIGS. 2, 4, and 5 as a guide, however, one of ordinary skill in the art of computer programming can readily develop the required program code (through counter-controlled looping) that processes the nodes in the same order as depicted in FIGS. 2, 4, and 5 so as to accomplish the sorting according to the same fundamental method depicted in FIGS. 2, 4, and 5.

Step 33 determines whether all nodes have been processed, by determining whether all counters have attained their terminal values. Step 33 of FIG. 6 corresponds to step 15 of FIG. 5. If all nodes have been processed then the procedure ends. If all nodes have not been processed then step 34 is next executed.

Step 34 establishes the next node to process, which is a function of the traversal sequence through the linked execution structure as described supra, and associated bookkeeping using counters, of step 32.

Step 35 determines whether the node being processed is empty (i.e., devoid of sequences to be sorted or pointers thereto). If the node is determined to be empty then an empty-node indication is set in step 36 and the procedure loops back to step 32 where the node traversal management will resume, taking into account the fact that the empty node indication was set. If the node is not determined to be empty then step 37 is next executed. Note that steps 35 and 36 may be omitted if the coding is structured to process only non-empty nodes.

Step 37 determines whether the node being processed is a leaf node (i.e., whether the node being processed has no more than one unique sequence). Step 37 of FIG. 6 corresponds to step 13 of FIG. 5. If the node is determined to be a leaf node then step 38 stores the sequences (or pointers thereto) in the node in the next available positions in the sorted output array, and a leaf-node indication is set in step 39 followed by a return to step 32 where the node traversal management will resume, taking into account the fact that a leaf node indication was set. If the node is not determined to be a leaf node then step 40 is next executed.

Step 40 establishes the child nodes of the node being processed. Step 40 of FIG. 6 corresponds to step 16 of FIG. 5.

Step 41 sets a child nodes indication, followed by a return to step 32 where the node traversal management will resume, taking into account the fact that a child nodes indication was set.

Note that the counter-controlled looping is embodied in steps 32-41 through generating and managing the counters (step 32), establishing the next node to process (step 34), and implementing program logic resulting from the decision blocks 33, 35, and 37.

Also note that although FIG. 6 expresses program logic natural to counter-controlled looping through the program code, while FIG. 5 expresses logic natural to recursive execution of the program code, the fundamental method of sorting of the present invention and the associated key steps thereof are essentially the same in FIGS. 5 and 6. Thus, the logic depicted in FIG. 6 is merely illustrative, and the counter-controlled looping embodiment may be implemented in any manner that would be apparent to an ordinary person in the art of computer programming who is familiar with the fundamental sorting algorithm described herein. As an example, the counter-controlled looping embodiment may be implemented in a manner that parallels the logic of FIG. 5 with the exceptions of: 1) the counter-controlled looping through the program code replaces the recursive execution of the program code; and 2) counters associated with the counter-controlled looping need to be programmatically tracked, updated, and tested.

FIGS. 7A, 7B, 7C, and 7D. (collectively "FIG. 7") comprise source code for linear sorting of integers under recursive execution and also for testing the execution time of the linear sort in comparison with Quicksort, in accordance with embodiments of the present invention. The source code of FIG. 7 includes a main program (i.e., void main), a function 'build' for randomly generating a starting array of integers to be sorted), a function 'linear sort' for performing the linear sort algorithm according to the present invention, and a function 'quicksort' for performing the Quicksort algorithm. The 'linear_sort' function in FIG. 7B will be next related to the flow chart of FIG. 5.

Code block 51 in 'linear_sort' corresponds to steps 13-15 and 20 in FIG. 5. Coding 52 within the code block 51 corresponds to step 20 of FIG. 5.

Code block 53 initializes the child array, and the count of the number of children in the elements of the child array, to zero. Code block 53 is not explicitly represented in FIG. 5, but is important for understanding the sort time data shown in FIGS. 19-24 described infra.

Code block 54 corresponds to step 16 in FIG. 5.

Coding 55 corresponds to I=I+1 in step 18 of FIG. 5, which shifts the mask rightward and has the effect of moving to the next lower level on the linked execution structure.

Coding block 56 corresponds to the loop of steps 18-19 in FIG. 5. Note that linear_sort is recursively called in block 56 as is done instep 18 of FIG. 5.

FIGS. 8A, 8B, 8C, and 8D (collectively "FIG. 8") comprise source code for linear sorting of strings under recursive execution and also for testing the execution time of the linear sort, in comparison with Quicksort, in accordance with embodiments of the present invention. The coding in FIG. 8 is similar to the coding in FIG. 7. A distinction to be noted is that the coding block 60 in FIG. 8 is analogous to, but different from, the coding block 54 in FIG. 7. In particular, block 60 of FIG. 8 reflects that: a mask is not explicitly used but is implicitly simulated by processing a string to be sorted one byte at a time; and the string to be sorted may have a variable number of characters.

Figure 9:
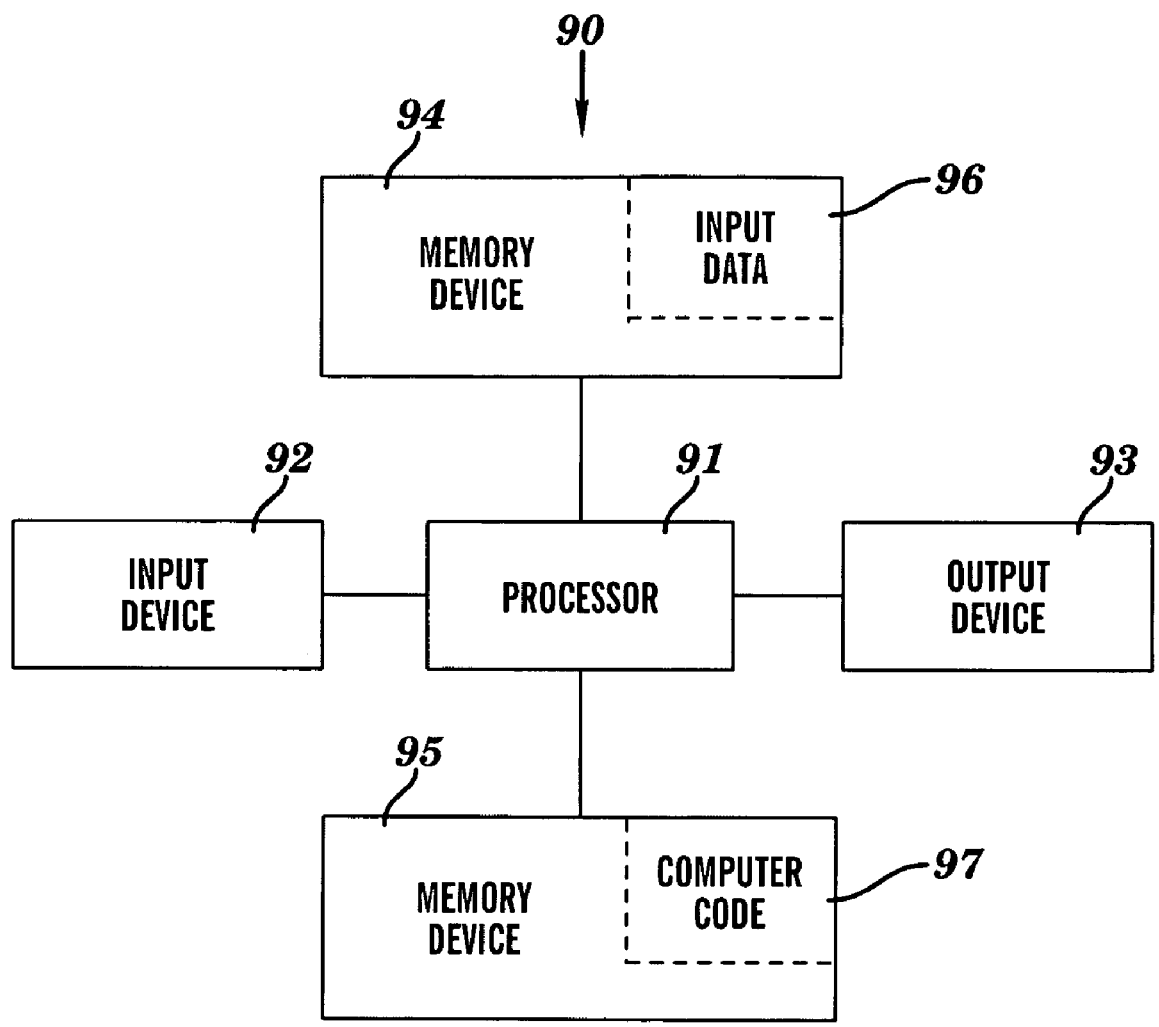
FIG. 9 illustrates a computer system for sorting sequences of bits, in accordance with embodiments of the present invention.

FIG. 9 illustrates a computer system 90 for sorting sequences of bits, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes a computer code 97. The computer code 97 includes an algorithm for sorting sequences of bits in accordance with embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium having a computer readable program code embodied therein, wherein the computer readable program code comprises the computer code 97.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

3. Timing Tests For the Sort Algorithm

FIGS. 10-24, comprise timing tests for the sort algorithm of the present invention as described in Section 2, including a comparison with Quicksort execution timing data. FIGS. 10-15 relate to the sorting of integers, FIG. 16 relates to memory requirement for storage of data, FIGS. 17-18 relate to the sorting of strings, and FIGS. 19-24 relate to sorting integers as a function of mask width and maximum value that can be sorted. The integers to be sorted in conjunction with FIGS. 10-15 and 19-24 were randomly generated from a uniform distribution. The timing tests associated with FIGS. 10-23 were performed using an Intel Pentium® III processor at 1133 MHz, and 512M RAM.

Figure 10:
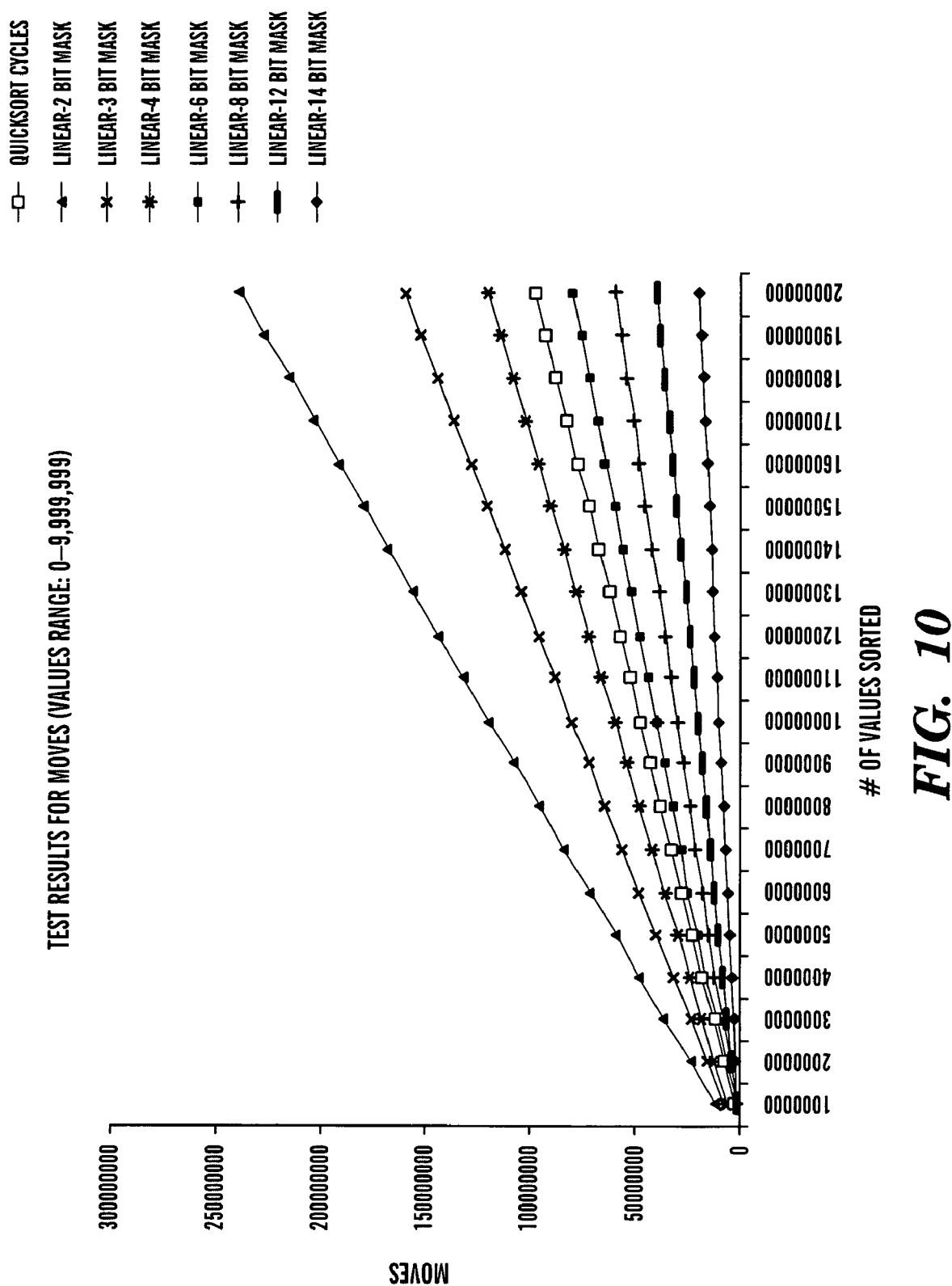
FIG. 10 is a graph depicting the number of moves used in sorting integers for a values range of 0-9,999,999, using Quicksort and also using the linear sort of the present invention.

FIG. 10 is a graph depicting the number of moves versus number of values sorted using a linear sort in contrast with Quicksort for sorting integers for a values range of 0-9,999, 999. The linear sort was in accordance with embodiments of the present invention using the recursive sort of FIG. 5 as described supra. For counting the moves, a counter was placed in the linear algorithm and in Quicksort at each point where a number is moved. Noting that 9,999,999 requires 24 bits to be stored, the linear sort was performed using mask widths W=2, 3, 4, 6, 8, 12, and 14 with a corresponding number of levels L=12, 8, 6, 4, 3, 2, and 2, respectively. For cases in which 24 is not an integral multiple of W, the mask width was truncated in the rightmost field corresponding to level L (i.e., at the level furthest from the root). For example at W=14, the mask widths at levels 1 and 2 were 14 and 10, respectively, for a total of 24 bits. FIG. 10 shows that, with respect to moves for a values range of 0-9,999,999, Quicksort is more efficient than the linear algorithm for W=2, 3, and 4, whereas the linear algorithm is more efficient than Quicksort for W=6, 8, 12, and 14.

Figure 11:
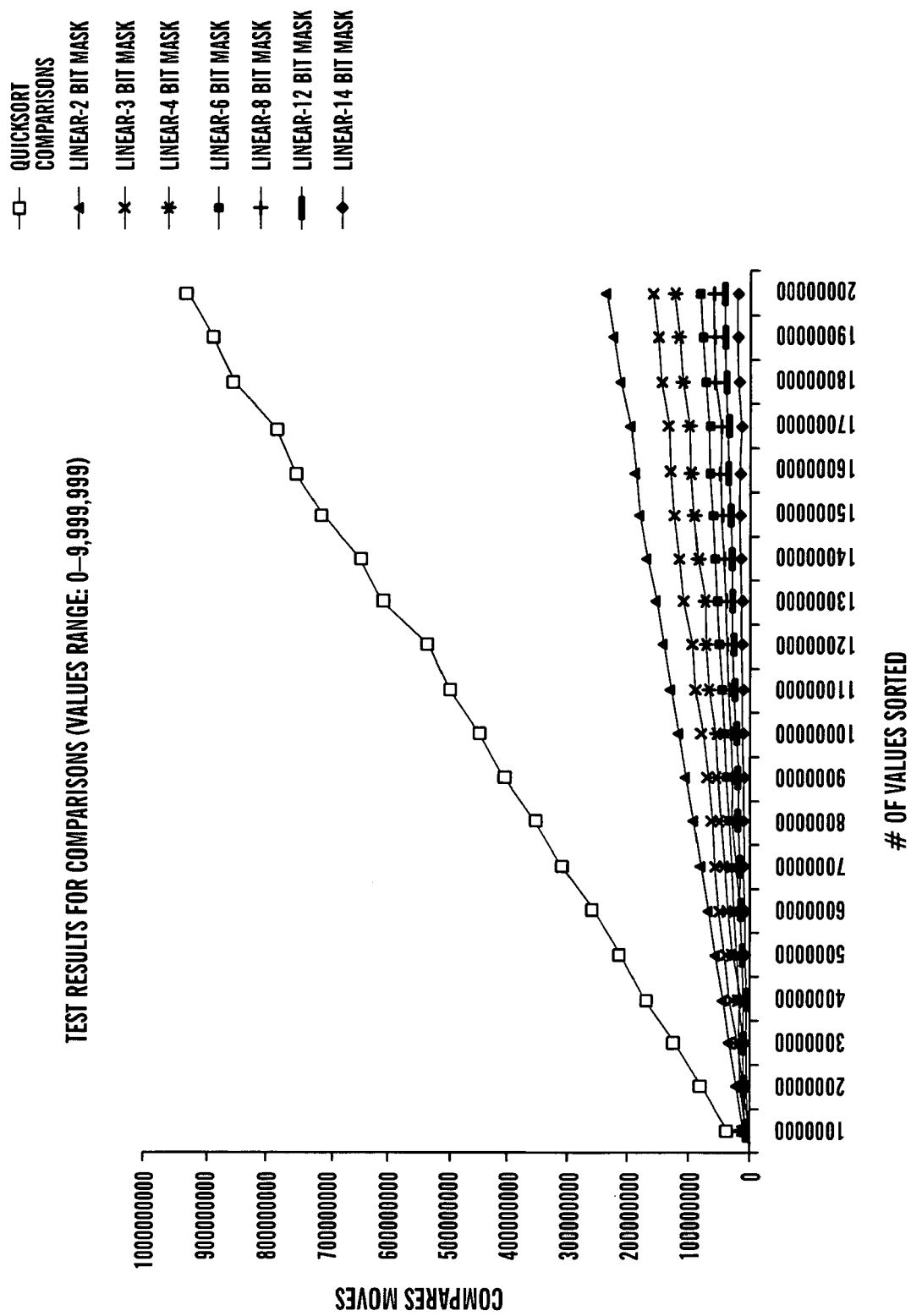
FIG. 11 is a graph depicting the number of compares used in sorting integers for a values range of 0-9,999,999, using Quicksort and also using the linear sort of the present invention.

FIG. 11 is a graph depicting the number of compares/moves versus number of values sorted using a linear sort in contrast with Quicksort for sorting integers for a values range of 0-9,999,999. For the linear sort, the number of compares/moves is the same as the number of moves depicted in FIG. 10 inasmuch as the linear sort does not "compare" to effectuate sorting. For Quicksort, the number of compares/moves is a number of compares in addition to the number of moves depicted in FIG. 10. The linear sort was in accordance with embodiments of the present invention using the recursive sort of FIG. 5 as described supra. For counting the compares, a counter was placed in the linear algorithm and in Quicksort at each point where a number is compared or moved. Noting that 9,999,999 requires 24 bits to be stored, the linear sort was performed using mask widths W=2, 3, 4, 6, 8, 12, and 14 with a corresponding number of levels L=12, 8, 6, 4, 3, 2, and 2, respectively. For cases in which 24 is not an integral multiple of W, the mask width is truncated in the rightmost field corresponding to level L. For example at W=14, the mask widths at levels 1 and 2 were 14 and 10, respectively, for a total of 24 bits. FIG. 11 shows that, with respect to compares/moves for a values range of 0-9,999,999, the linear algorithm is more efficient than Quicksort for all values of W tested.

Figure 12:
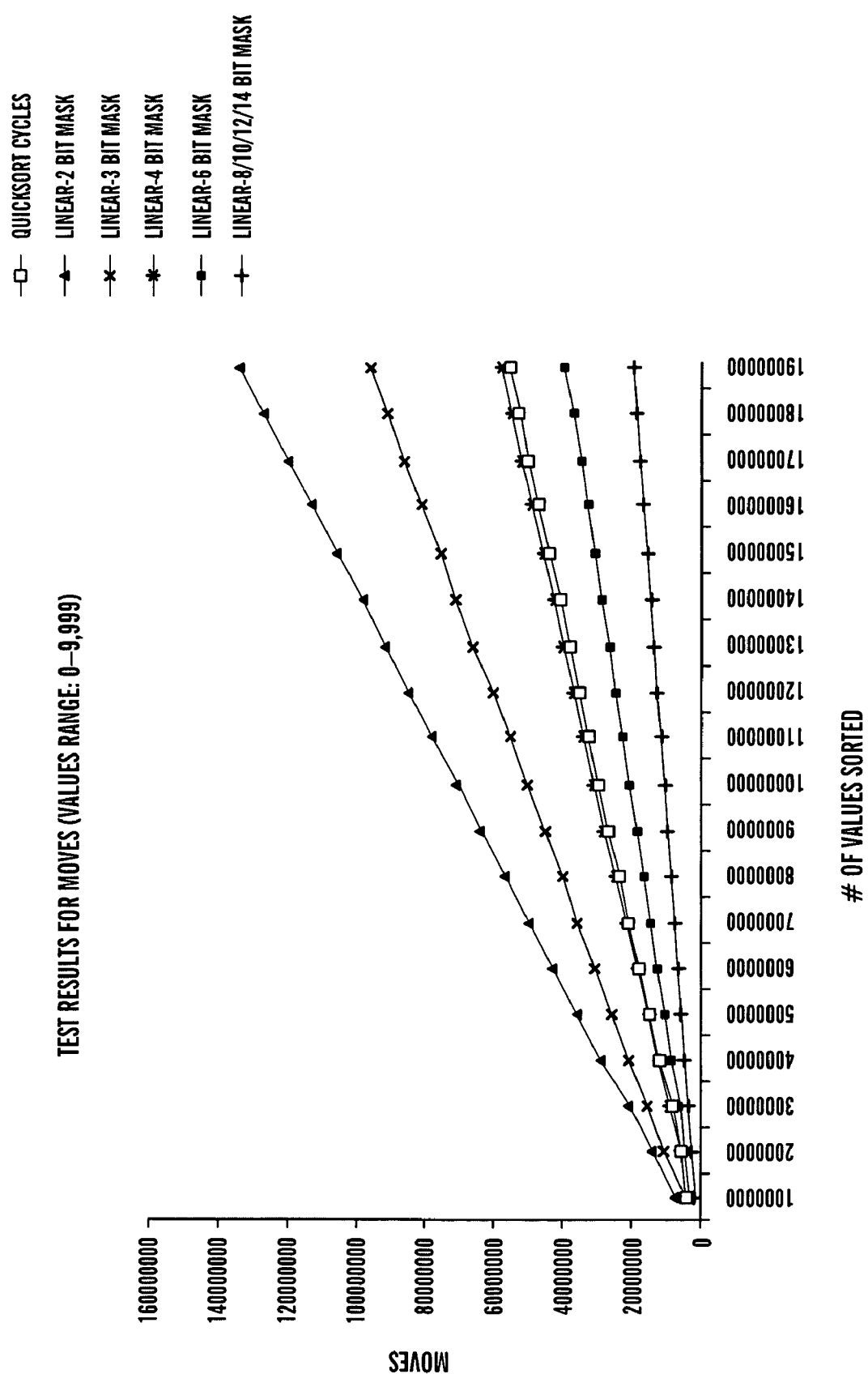
FIG. 12 is a graph depicting the number of moves used in sorting integers for a values range of 0-9,999, using Quicksort and also using the linear sort of the present invention.

FIG. 12 is a graph depicting the number of moves versus number of values sorted using a linear sort in contrast with Quicksort for sorting integers for a values range of 0-9,999. The linear sort was in accordance with embodiments of the present invention using the recursive sort of FIG. 5 as described supra. For counting the moves, a counter was placed in the linear algorithm and in Quicksort at each point where a number is moved. Noting that 9,999 requires 14 bits to be stored, the linear sort was performed using mask widths W=2, 3, 4, 6, 8, 10, 12, 14 with a corresponding number of levels L=7, 5, 4, 3, 2, 2, 2, and 1, respectively. For cases in which 14 is not an integral multiple of W, the mask width is truncated in the rightmost field corresponding to level L (i.e., in the cases of W=3, 4, 6, 8, 10, 12). FIG. 12 shows that, with respect to moves for a values range of 0-9,999, Quicksort is more efficient than the linear algorithm for W=2, 3, and 4, whereas the linear algorithm is more efficient than Quicksort for W 6, 8, 10, 12, and 14.

Figure 13:
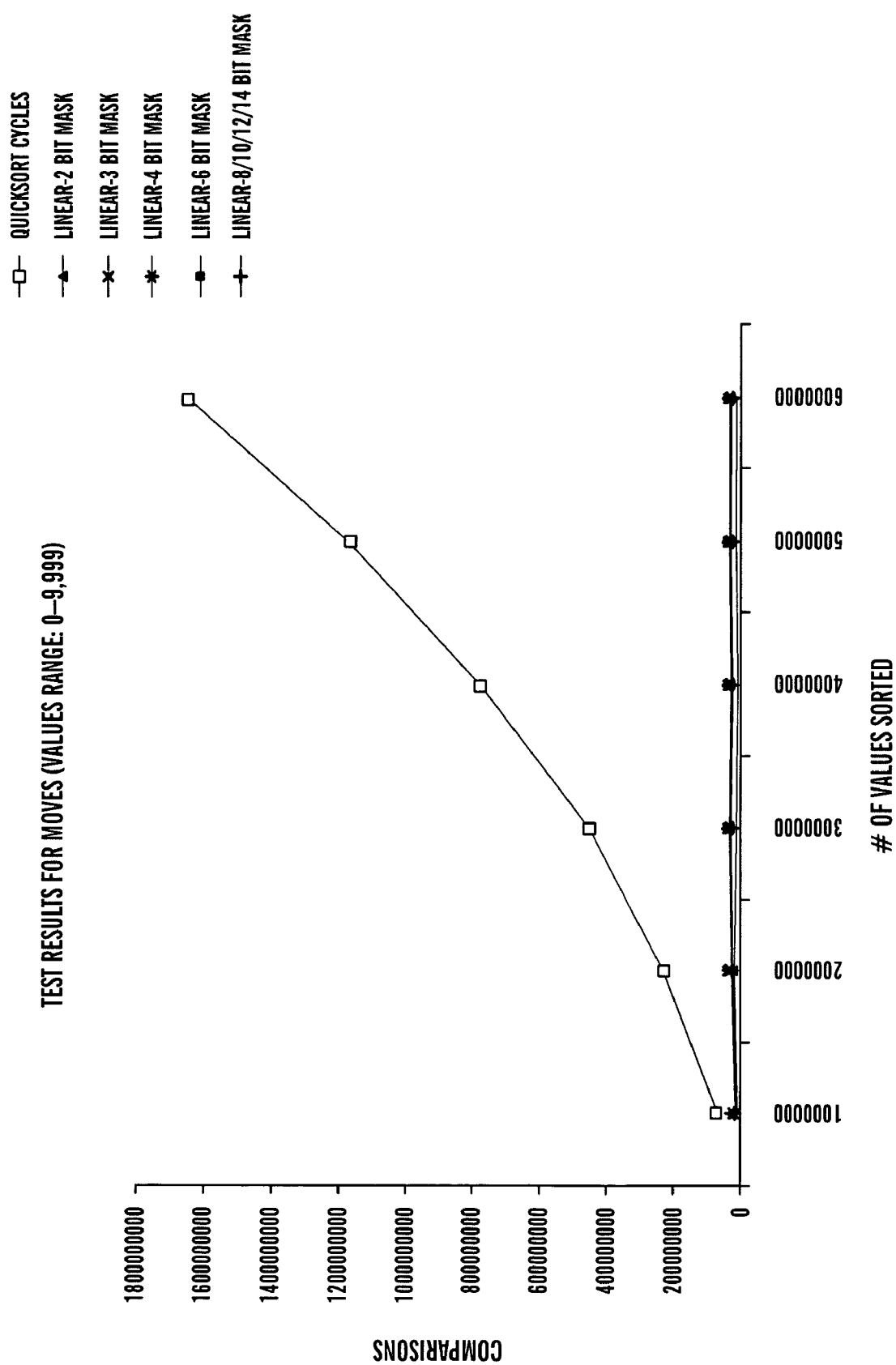
FIG. 13 is a graph depicting the number of compares used in sorting integers for a values range of 0-9,999, using Quicksort and also using the linear sort of the present invention.

FIG. 13 is a graph depicting the number of compares versus number of values sorted using a linear sort in contrast with Quicksort for sorting integers for a values range of 0-9,999. The linear sort was in accordance with embodiments of the present invention using the recursive sort of FIG. 5 as described supra. For counting the compares, a counter was placed in the linear algorithm and in Quicksort at each point where a number is compared. Noting that 9,999 requires 14 bits to be stored, the linear sort was performed using mask widths W=2, 3, 4, 6, 8, 10, 12, 14 with a corresponding number of levels L=7, 5, 4, 3, 2, 2, 2, and 1, respectively. For cases in which 14 is not an integral multiple of W, the mask width is truncated in the rightmost field corresponding to level L (i.e., in the cases of W=3, 4, 6, 8, 10, 12). FIG. 13 shows that, with respect to compares for a values range of 0-9,999, the linear algorithm is more efficient than Quicksort for all values of W tested. Of particular note is the difference in efficiency between the linear sort and Quicksort when the dataset contains a large number of duplicates (which occurs when the range of numbers is 0-9,999 since the number of values sorted is much greater than 9,999). Because of the exponential growth of the number of comparisons required by the Quicksort, the test for sorting with multiple duplicates of values (range 0-9,999), the test had to be stopped at 6,000,000 numbers sorted.

Figure 14:
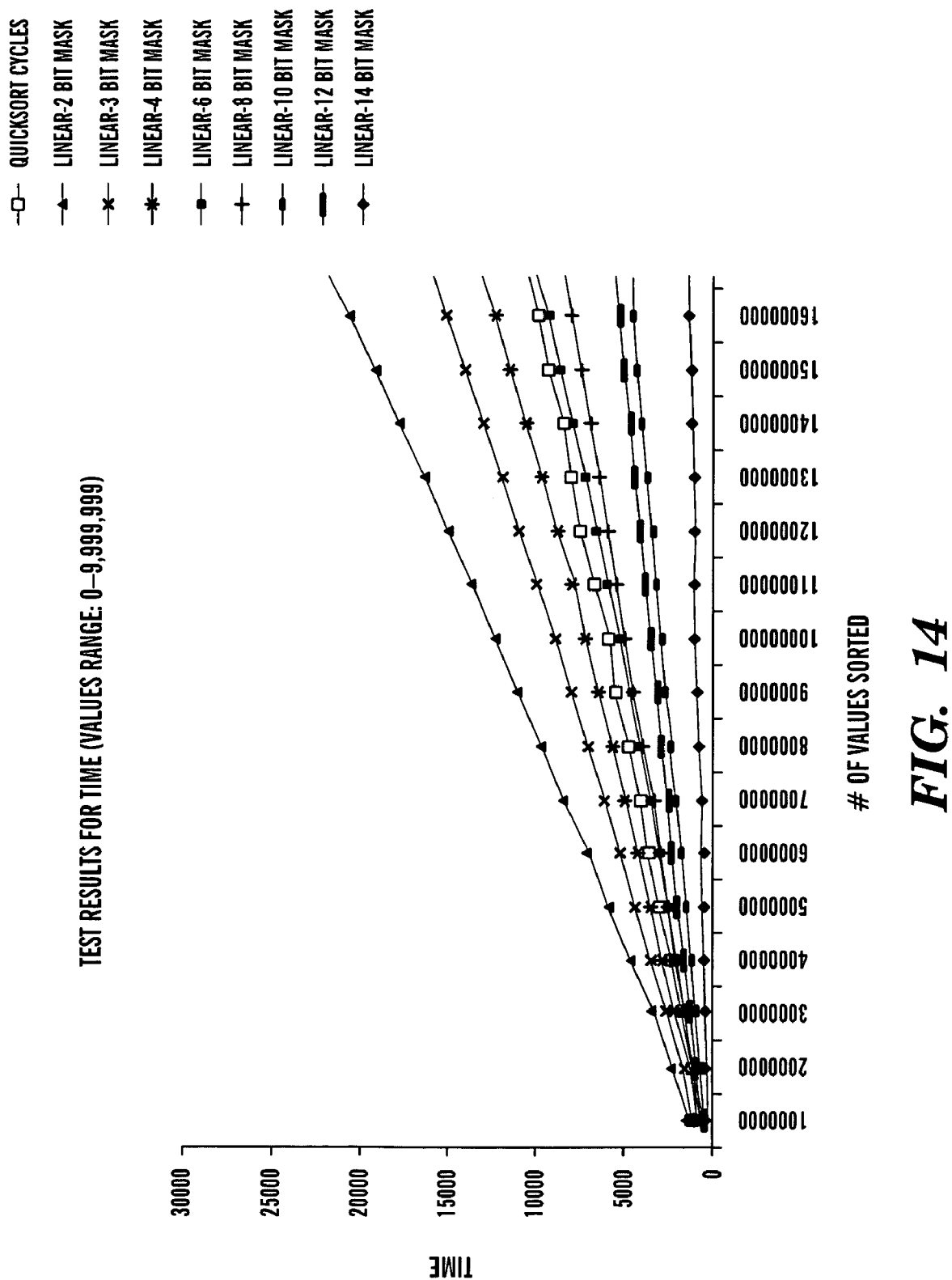
FIG. 14 is a graph depicting sort time used in sorting integers for a values range of 0-9,999,999, using Quicksort and also using the linear sort of the present invention.

FIG. 14 is a graph depicting the sort time in CPU cycles versus number of values sorted using a linear sort in contrast with Quicksort for sorting integers for a values range of 0-9,999,999. The linear sort was in accordance with embodiments of the present invention using the recursive sort of FIG. 5 as described supra. Noting that 9,999,999 requires 24 bits to be stored, the linear sort was performed using mask widths W=2, 3, 4, 6, 8, 10, 12, and 14 with a corresponding number of levels L=12, 8, 6, 4, 3, 3, 2, and 2, respectively. For cases in which 24 is not an integral multiple of W, the mask width was truncated in the rightmost field corresponding to level L (i.e., at the level furthest from the root). For example at W=10, the mask widths at levels 1, 2, and 3 were 10, 10, and 4, respectively, for a total of 24 bits. As another example at W=14, the mask widths at levels 1 and 2 were 14 and 10, respectively, for a total of 24 bits. FIG. 14 shows that, with respect to sort time for a values range of 0-9,999,999, Quicksort is more efficient than the linear algorithm for W=2, 3, and 4, whereas the linear algorithm is more efficient than Quicksort for W=6, 8, 10, 12, and 14.

Figure 15:
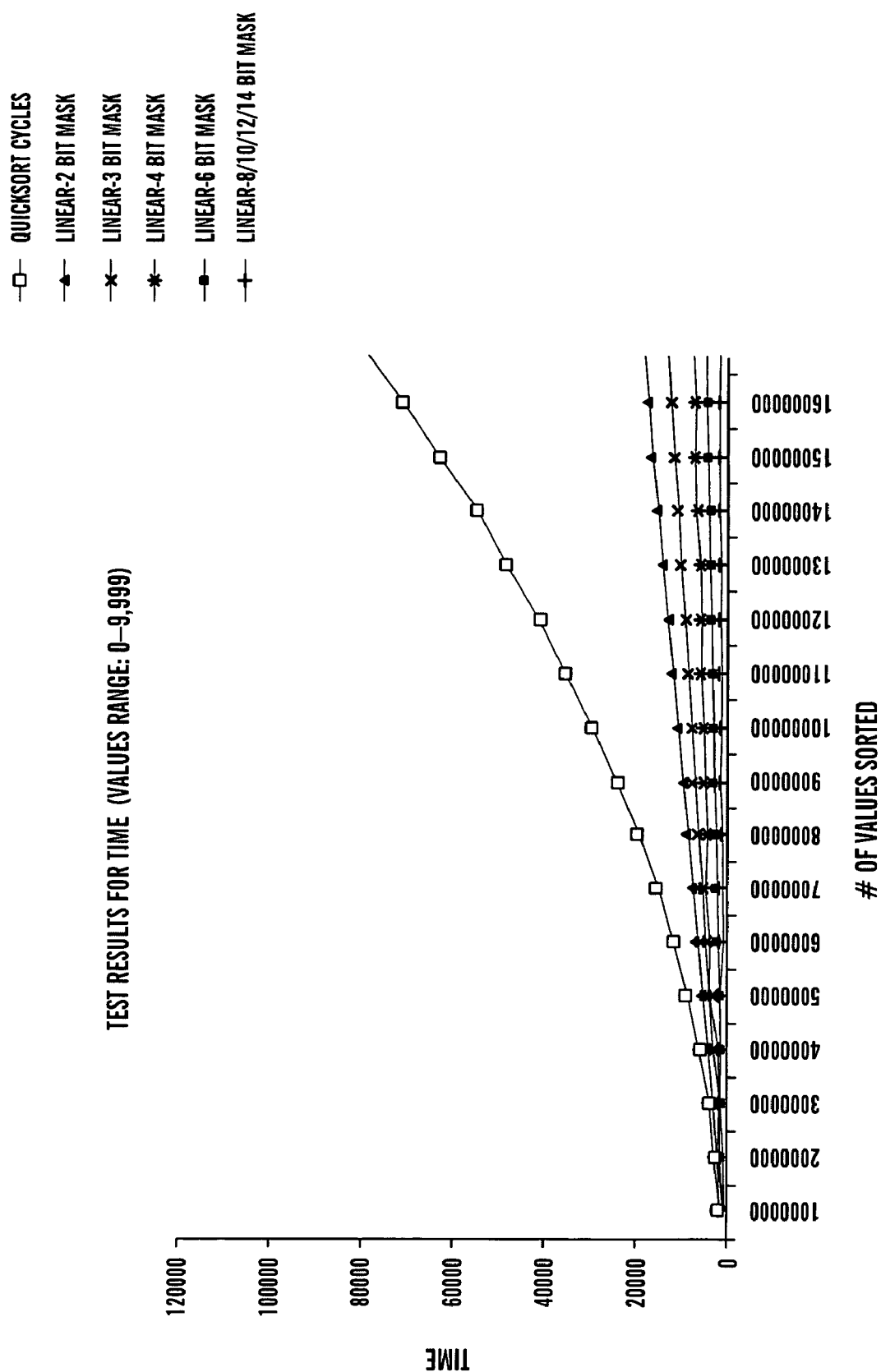
FIG. 15 is a graph depicting sort time used in sorting integers for a values range of 0-9,999, using Quicksort and also using the linear sort of the present invention.

FIG. 15 is a graph depicting the sort time in CPU cycles versus number of values sorted using a linear sort in contrast with Quicksort for sorting integers for a values range of 0-9,999. The linear sort was in accordance with embodiments of the present invention using the recursive sort of FIG. 5 as described supra. Noting that 9,999 requires 14 bits to be stored, the linear sort was performed using mask widths W=2, 3, 4, 6, 8, 10, 12, and 14 with a corresponding number of levels L=7, 5, 4, 3, 2, 2, 2, and 1, respectively. For cases in which 24 is not an integral multiple of W, the mask width was truncated in the rightmost field corresponding to level L (i.e., in the cases of W=3, 4, 6, 8, 10, 12. FIG. 15 shows that, with respect to sort time for a values range of 0-9,999, the linear algorithm is more efficient than Quicksort for all values of W tested, which reflects the large number of compares for data having many duplicate values as discussed supra in conjunction with FIG. 13.

Figure 16:
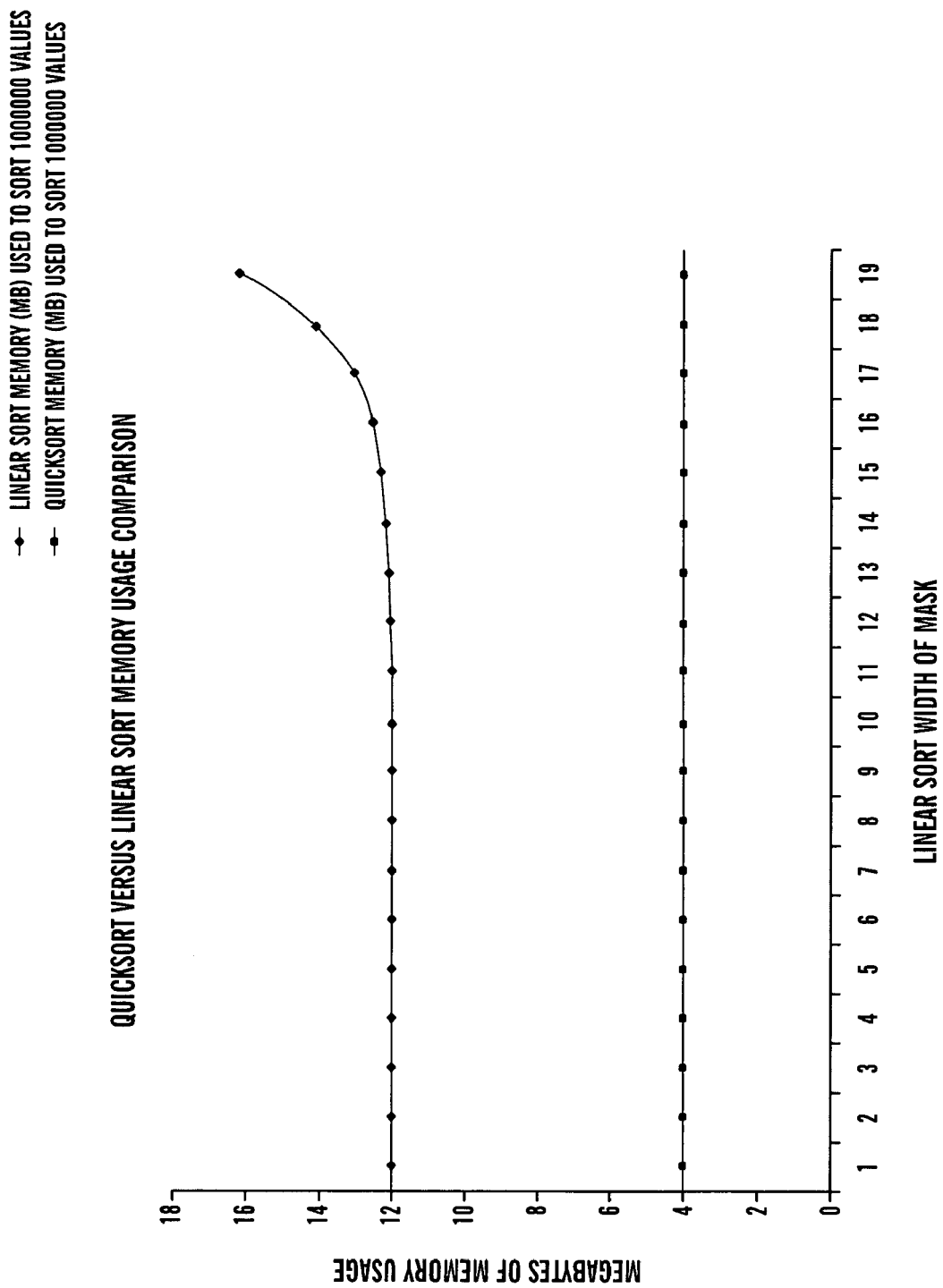
FIG. 16 is a graph depicting memory usage for sorting fixed-length bit sequences representing integers, using Quicksort and also using the linear sort of the present invention.

FIG. 16 is a graph depicting memory usage using a linear sort in contrast with Quicksort for sorting 1,000,000 fixed-length sequences of bits representing integers, in accordance with embodiments of the present invention using the recursive sort of FIG. 5 as described supra. Quicksort is an in-place sort and therefore uses less memory than does the linear sort. The linear sort uses memory according to the following general formula, noting that this formula focuses only on the main memory drivers of the algorithm:

$$MEM = S*M_V + (M_C * 2^{W-1} * L)$$

wherein MEM is the number of bytes required by the linear sort, S is the number of sequences to be sorted, Mv is the size of the data structure (e.g., 12) required to hold each sequence being sorted, Mc is the size of the data structure (e.g., 8) required to hold a child sequence or pointer in the recursive linked execution structure, W is the width of the mask ($\geq$1), and L is the number of levels of recursion. For some embodiments, L=ceiling($M_V$/W) as explained supra.

In FIG. 16, $M_V$=12 and $M_C$=8. The Quicksort curve in FIG. 16 is based on Quicksort using 4 bytes of memory per value to be sorted. The graphs stops at a mask width of 19 because the amount of memory consumed with the linear sort approaches unrealistic levels beyond that point. Thus, memory constraints serve as upper limit on the width of the mask that can be used for the linear sort.

Figure 17:
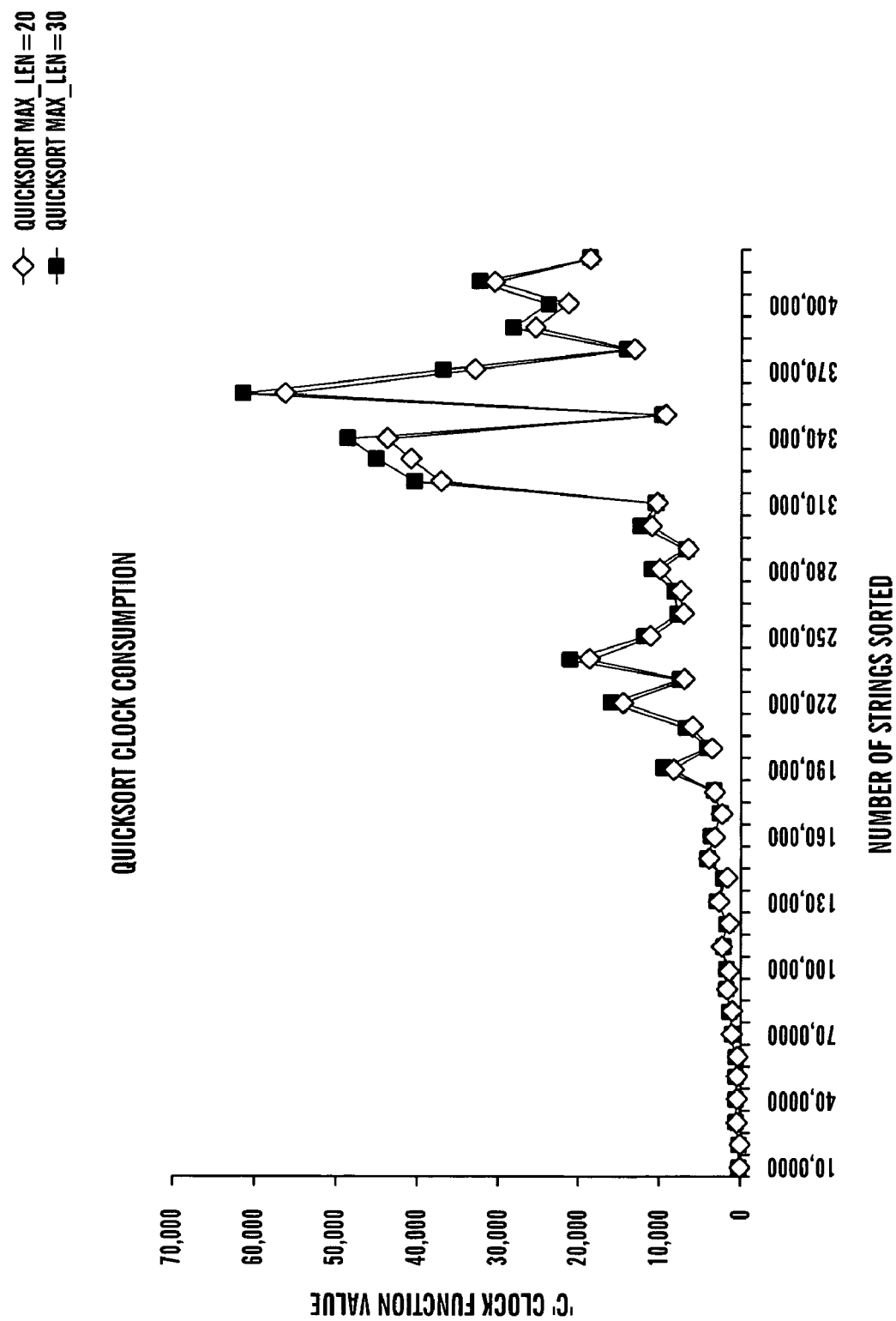
FIG. 17 is a graph depicting sort time using Quicksort for sorting strings, in accordance with embodiments of the present invention.
Figure 18:
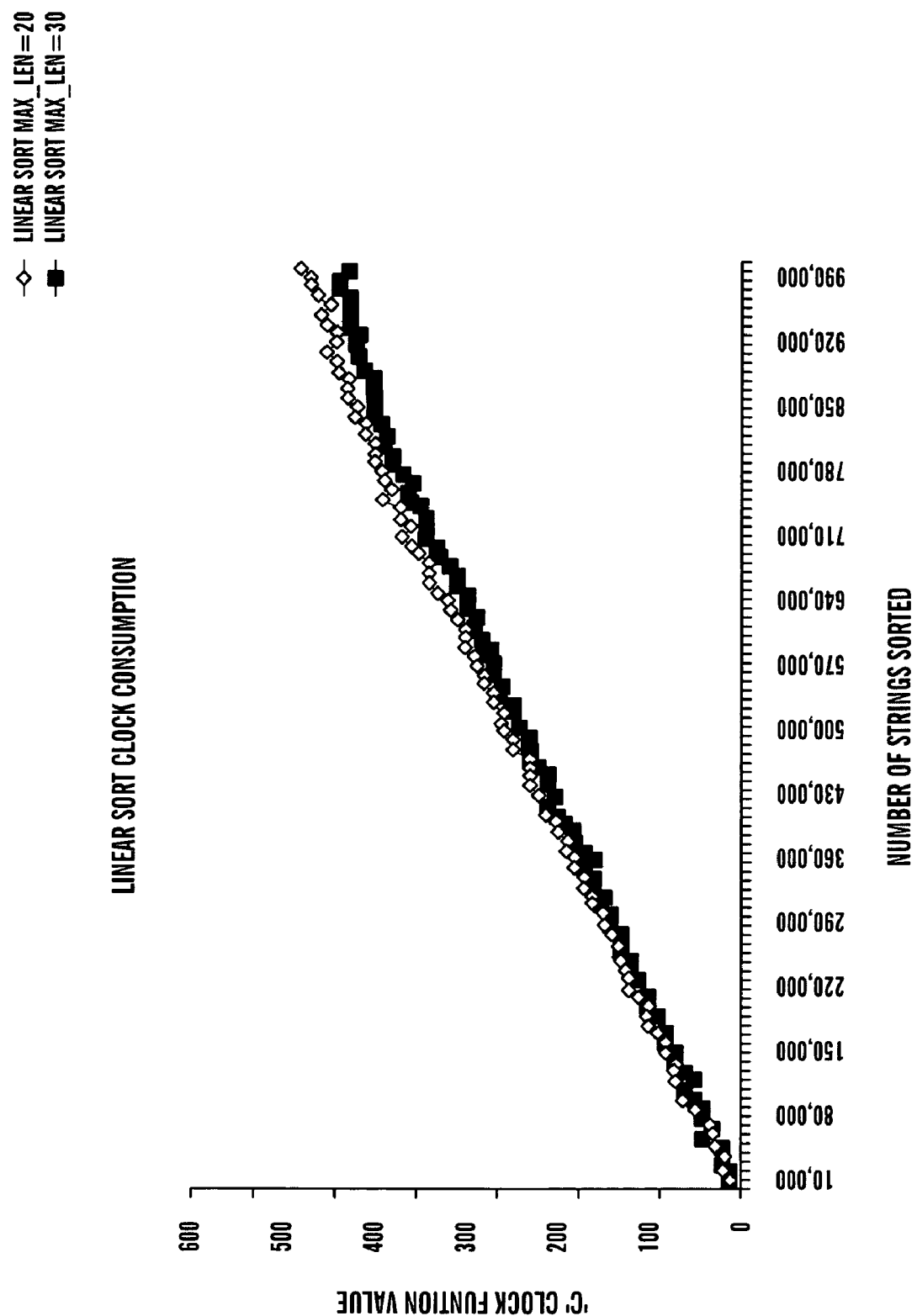
FIG. 18 is a graph depicting sort time using a linear sort for sorting strings, in accordance with embodiments of the present invention.

FIGS. 17 and 18 graphically depict the sort time in CPU cycles versus number of strings sorted for the linear sort and Quicksort, respectively. The linear sort was in accordance with embodiments of the present invention using the recursive sort of FIG. 5 as described supra. The tests were conducted with simple strings. A file of over 1,000,000 strings was created by extracting text-only strings from such sources as public articles, the Bible, and various other sources. Each set of tests was run against strings ranging up to 20 characters in length (max len=20) and then again against strings ranging up to 30 characters in length (max_len=30). A set of tests is defined as sorting a collection of 10,000 strings and repeating the sort with increasing numbers of strings in increments of 10,000. No sorting test was performed on more than 1,000,000 strings.

Quicksort is subject to chance regarding the value at the "pivot" points in the list of strings to be sorted. When unlucky, Quicksort is forced into much deeper levels of recursion (>200 levels). Unfortunately, this caused stack overflows and the tests abnormally terminated at 430,000 strings sorted by Quicksort. By reordering the list of strings, Quicksort could be made to complete additional selections, but the number of tests completed were sufficient to demonstrate the comparison of the linear sort versus the quicksort. FIGS. 17 and 18 shows that, with respect to sort time, the linear algorithm is more efficient than Quicksort by a factor in a range of about 30 to 200 if the number of strings sorted is at least about 100,000.

Another distinction between the linear sort and Quicksort is that in Quicksort the string comparisons define extra loops, which adds a multiplier A, resulting in the Quicksort execution time having a dependence of A*S*log S such that A is the average length of the string. The average length A of the string is accounted for in the linear sort algorithm as the number of levels L.

FIGS. 17 and 18 demonstrate that the linear sort far outperforms Quicksort for both max len=20 and max_len=30, and at all values of the number of strings sorted. A primary reason for the difference between the linear sort and Quicksort is that Quicksort suffers from a "levels of similarity" problem as the strings it is sorting become increasingly more similar. For example, to differentiate between "barnacle" and "break", the string compare in the linear sort examines only the first 2 bytes. However, as Quicksort recurses and the strings become increasingly more similar (as with "barnacle" and "barney"), increasing numbers of bytes must be examined with each comparison. Combining the superlinear growth of comparisons in Quicksort with the increasing costs of each comparison produces an exponential growth effect for Quicksort. Evidence of the effect of increasingly more costly comparisons in Quicksort can be understood by noting that the number of compares and moves made by the Quicksort are the same even though the maximum length of strings increases from 20 to 30. However, the number of clock cycles required to perform the same number of moves and comparisons in Quicksort increases (see FIG. 17) as the maximum length of strings increases from 20 to 30, because the depth of the comparisons increases. FIG. 18 shows that the increase from 20 to 30 characters in the maximum length of strings affects the number of clock cycles for the linear sort, because the complexity of the linear sort is based on the size of the data to be sorted. The lack of smoothness in the Quicksort curves of FIG. 17 arises because of the sensitivity of Quicksort to the initial ordering of the data to be sorted, as explained supra.

Figure 19:
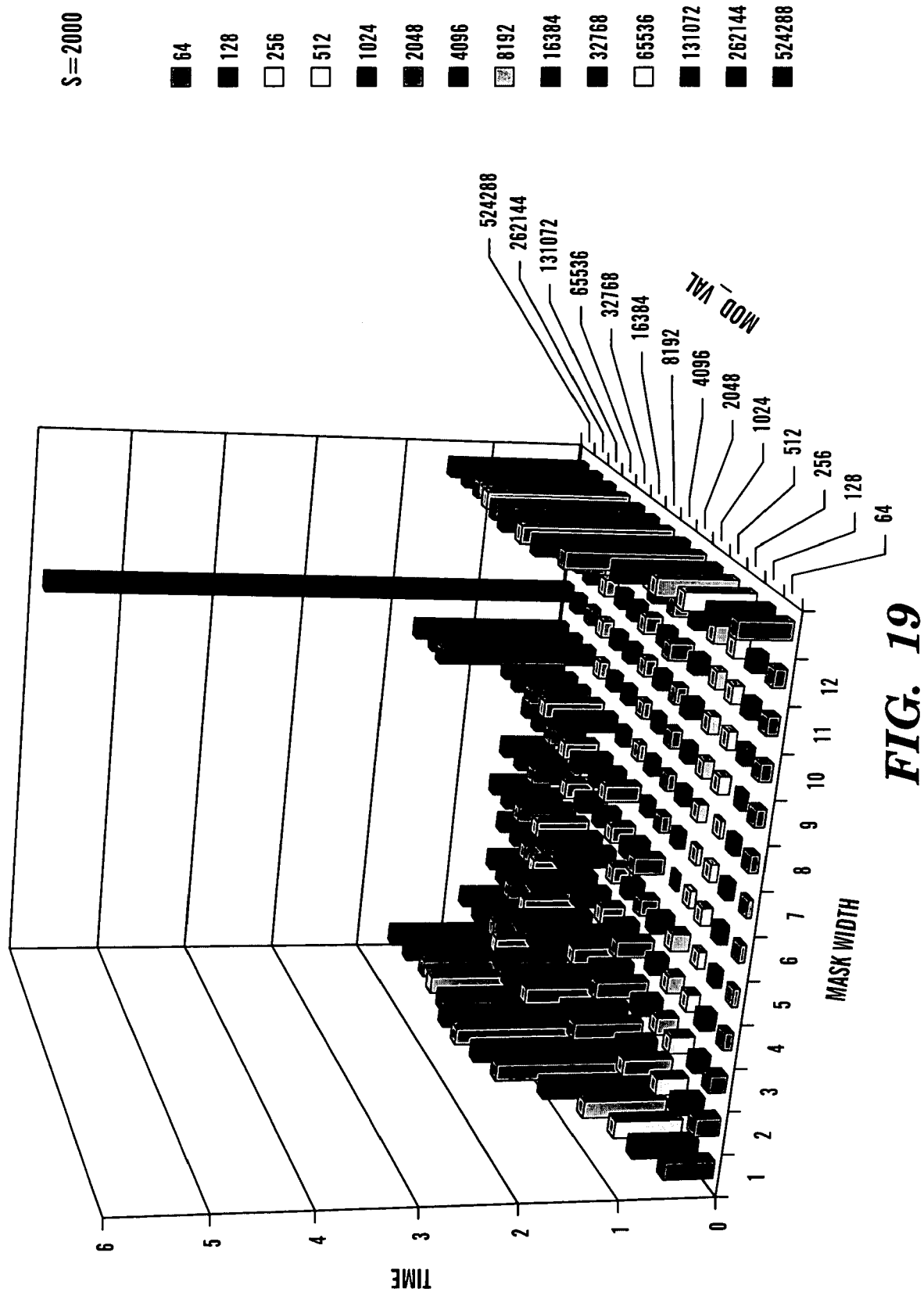
FIGS. 19-24 is a graph depicting sort time used in sorting integers, using Quicksort and also using the linear sort of the present invention, wherein the sort time is depicted as a function of mask width and maximum value that can be sorted.
Figure 20:
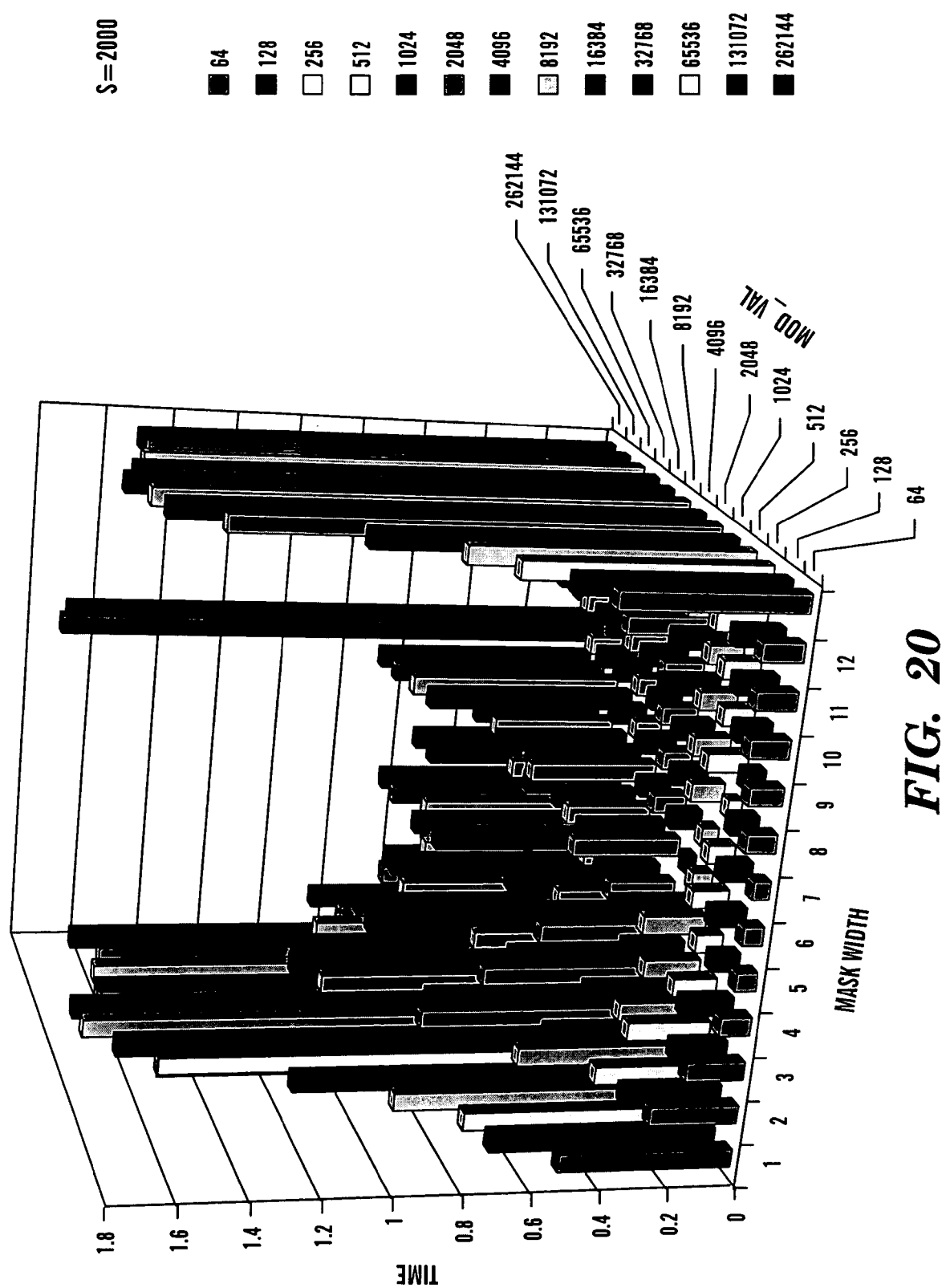
Figure 21:
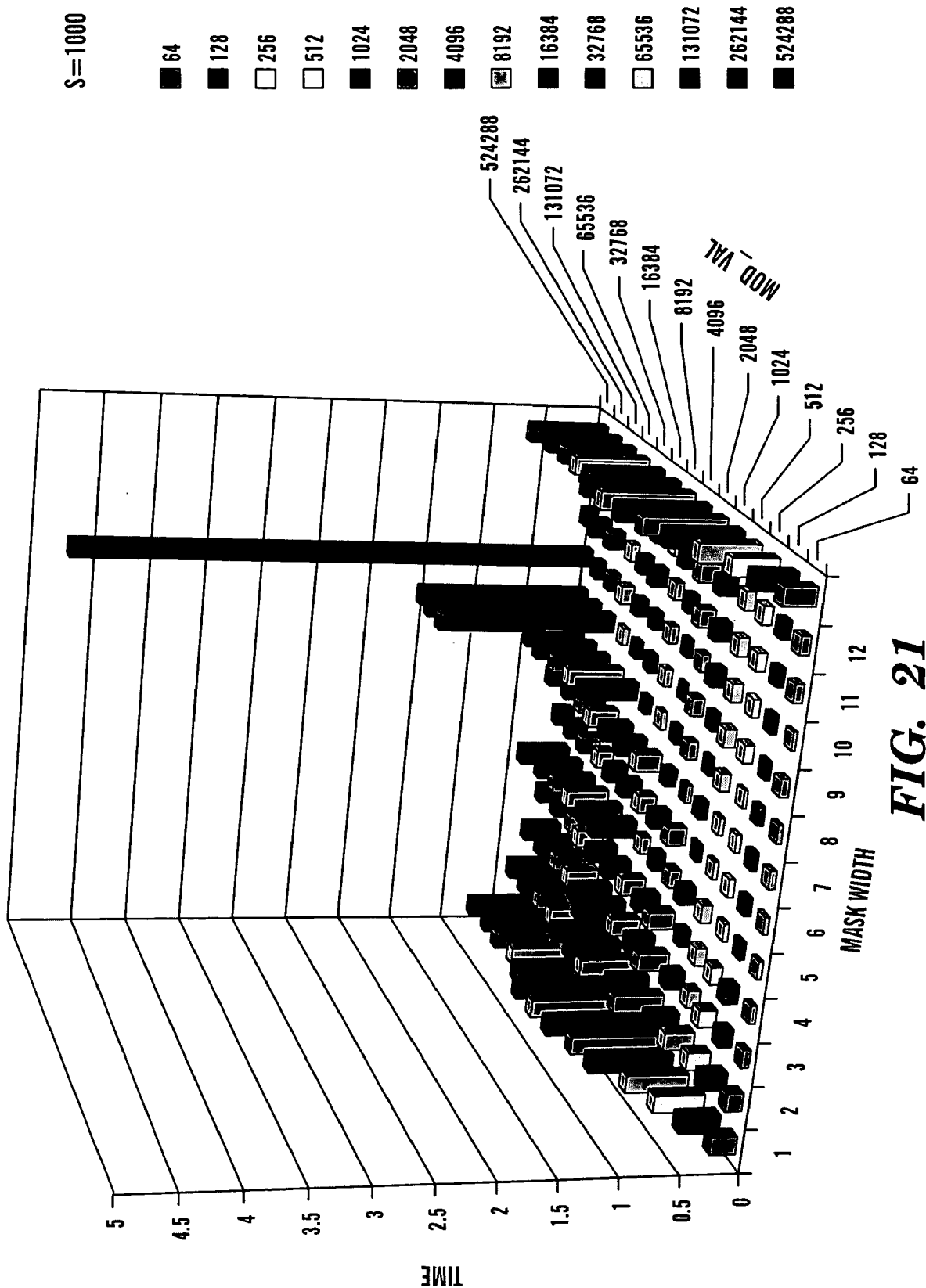
Figure 22:
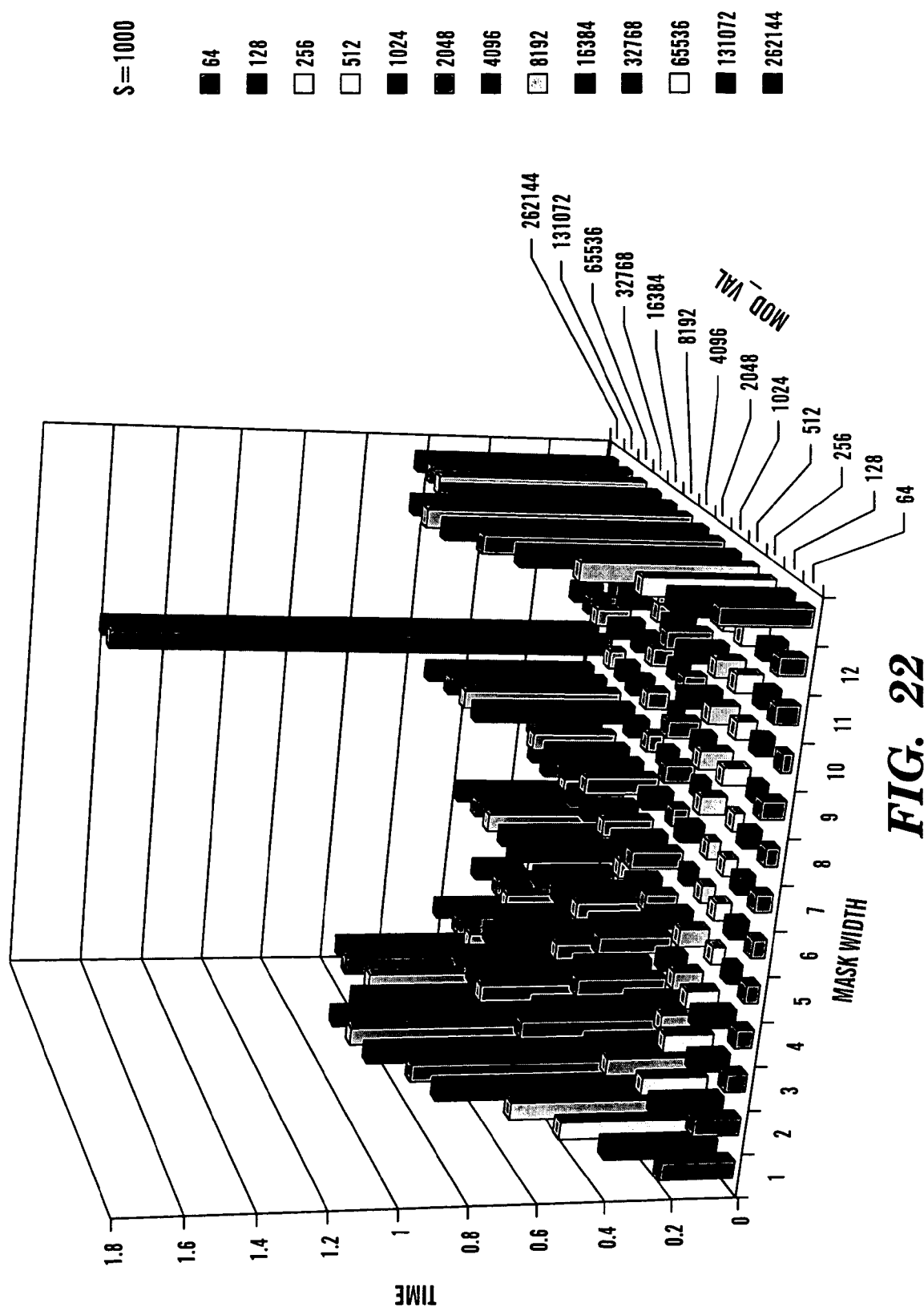
Figure 23:
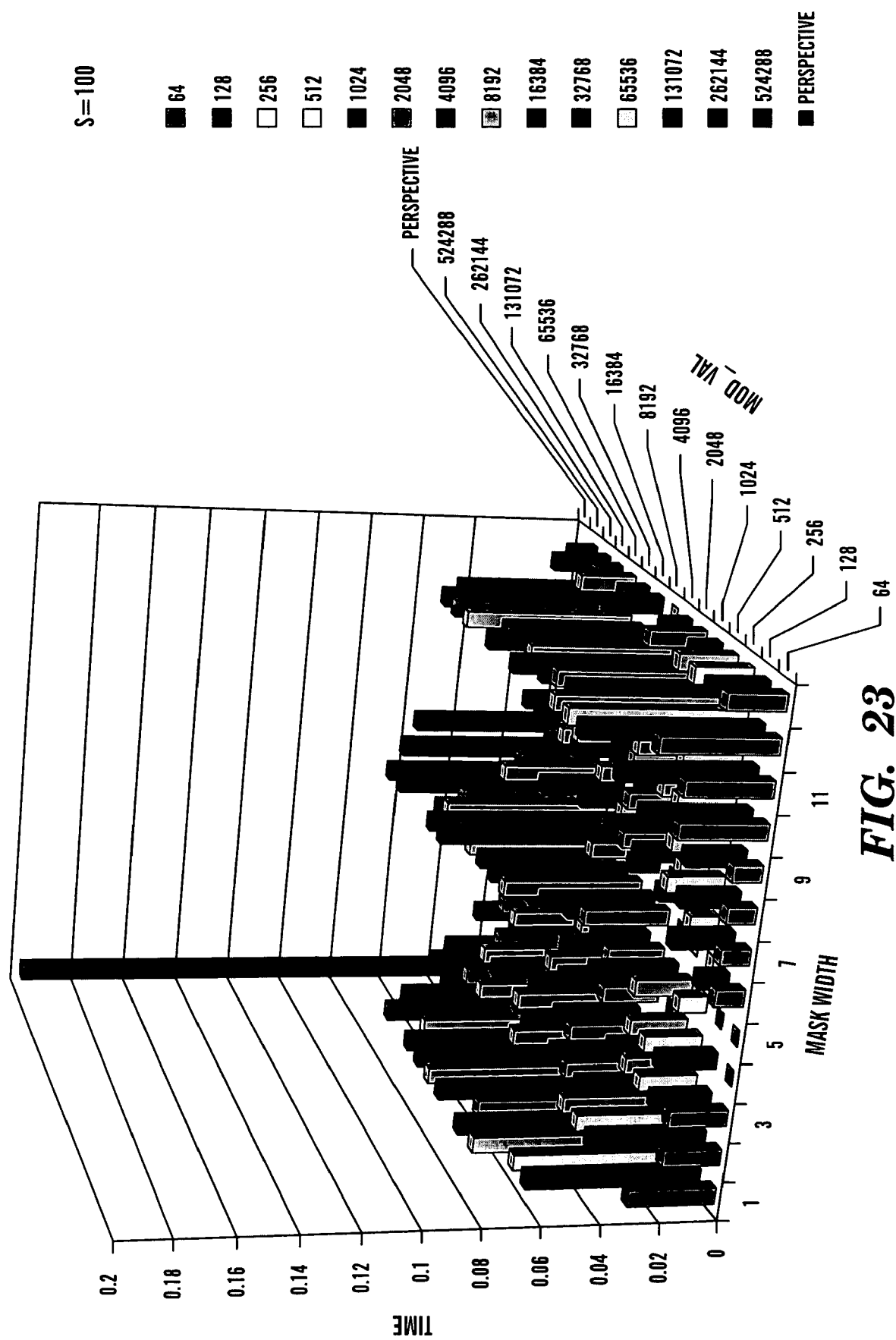
Figure 24:
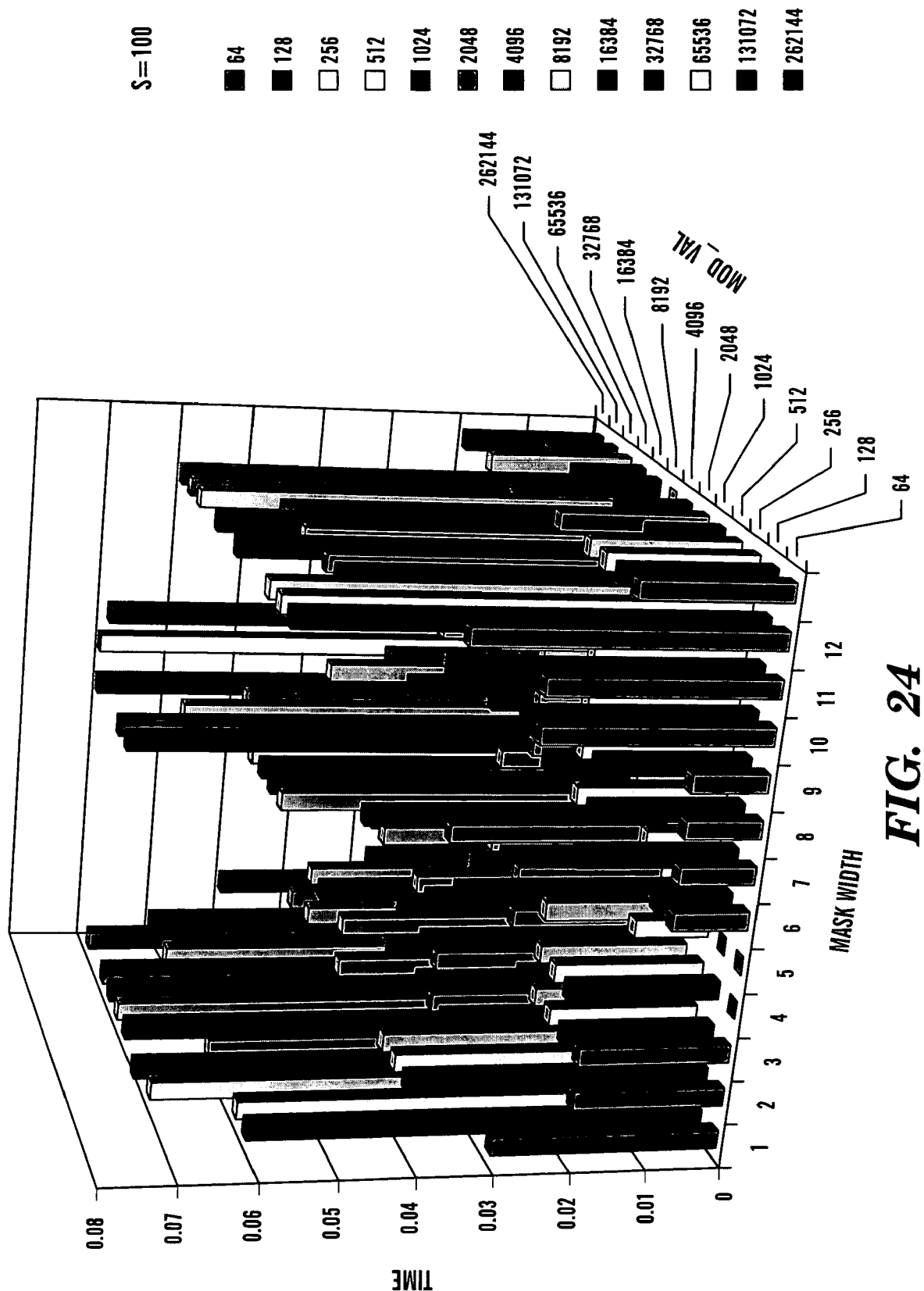

FIGS. 19-24 is a graph depicting sort time using a linear sort, in contrast with Quicksort, for sorting integers as a function of mask width and maximum value that can be sorted, in accordance with embodiments of the present invention. The values of S in FIGS. 19-24 are significantly smaller than the values of S used in FIGS. 10-15 and 17-18. The linear sort was in accordance with embodiments of the present invention using the recursive sort of FIG. 5 as described supra. In each of FIGS. 19-24, Time in units of CPU cycles is plotted versus MAX WIDTH and MOD_VAL, wherein MAX WIDTH (equivalent to W discussed supra) is the width of the mask, and wherein the integer values to be sorted were randomly generated from a uniform distribution between 0 and MOD_VAL-1. Also in each of FIGS. 19-24, MAX WIDTH=13 is the rightmost array representing Quicksort and has nothing to do with a mask width. Letting S denote the number of integer values sorted in each test, S=2000 in FIGS. 19-20, S=1000 in FIGS. 21-22, and S=100 in FIGS. 23-24. FIGS. 19 and 20 represent the same tests and the scale of the Time direction differs in FIGS. 19 and 20. FIGS. 21 and 22 represent the same tests and the scale of the Time direction differs in FIGS. 21 and 22. FIGS. 23 and 24 represent the same tests and the scale of the Time direction differs in FIGS. 23 and 24. A difference between the tests of FIGS. 19-24 and the tests of FIGS. 10-16 is that much fewer values are sorted in FIGS. 19-24 than in FIGS. 10-16.

FIGS. 19-24 show a "saddle" shape effect in the three-dimensional Time shape for the linear sort. The saddle shape is characterized by: 1) for a fixed MOD_VAL the Time is relatively high at low values of MASK WIDTH and at high values of MASK WIDTH but is relatively small at intermediate values of MASK WIDTH; and 2) for a fixed MASK WIDTH, the Time increases as MOD_VAL increases.

Letting W denote MASK WIDTH, the effect of W on Time for a fixed MOD_VAL is as follows. The Time is proportional to the product of the average time per node and the total number of nodes. The average time per node includes additive terms corresponding to the various blocks in FIG. 7B, and block 53 is an especially dominant block with respect to computation time. In particular, block 53 initializes memory in a time proportional to the maximum number of child nodes ($2^W$) per parent node. Let A represent the time effects in the blocks of FIG. 7B which are additive to the time ($\propto 2^W$) consumed by block 53. It is noted that $2^W$ increases monotonically and exponentially as W increases. However, the total number of nodes is proportional to N/W where N is the number of bits in each word to be sorted. It is noted that 1/W decreases monotonically as W increases. Thus the behavior of Time as a function of W depends on the competing effects of ($2^W$+A) and 1/W in the expression ($2^W$+A)/W. This results in the saddle shape noted supra as W varies and MOD_VAL is held constant.

It is noted that the dispersion or standard deviation σ is inverse to the data density as measured by $S/(V_{MAX}-V_{MIN})$, wherein S denotes the number of values to be sorted, and $V_{MAX}$ and $V_{MIN}$ respectively denote the maximum and minimum values to be sorted. For FIGS. 19-24, $V_{MIN} \geq 0$ and $V_{MAX} \leq MOD\_VAL-1$. Thus, for a fixed data density of the S values, the Time is a saddle-shaped function of a width W of the mask. Although, FIGS. 19-24 pertain to the sorting of integers, the execution time of the linear sorting algorithm of the present invention for sorting sequences of bits is essentially independent of whether the sequences of bits are interpreted as integers or floating point numbers, and the execution time is even more efficient for string sorts than for integer sorts as explained supra. Therefore, generally for a fixed data density of S sequences of bits to be sorted, the sorting execution time is a saddle-shaped function of a width W of the mask that is used in he implementation of the sorting algorithm.

At a fixed mask width W and a fixed number of values S to be sorted, increasing MOD VAL increases the dispersion or standard deviation a of the data to be sorted. Increasing a increases the average number of nodes which need to be processed in the sorting procedure. However, the Time increases as the average number of nodes needed to be processed increases. This results in the increase in Time as MOD_VAL increases while W is fixed. As to Quicksort, FIGS. 19-24 show that Time also increases as MOD_VAL increases for Quicksort.

A corollary to the preceding analyses is that for a fixed W, the standard deviation a decreases (or the data density increases) as S increases, so that for a fixed W the sort execution time may vary less that linearly with S (i.e., the sort execution time may vary as $S^Y$ such that Y<1).

FIGS. 19-24 show that for a given number S of values to be sorted, and for a given value of MOD_VAL, there are one or mode values of W for which the linear sort Time is less than the Quicksort execution time. A practical consequence of this result is that for a given set of data to be sorted, said data being characterized by a dispersion or standard deviation, one can choose a mask width that minimizes the Time and there is one or more values of W for which the linear sort Time is less than the Quicksort execution time.

Although FIGS. 19-24 shows timing tests data for sorting integers, the ability to choose a mask resulting in the linear sort of the present invention executing in less time than a sort using Quicksort also applies to the sorting of floating point numbers since the linear sort algorithm is essentially the same for sorting integers and sorting floating point numbers. Additionally, the ability to choose a mask resulting in the linear sort executing in less time than a sort using Quicksort also applies to the sorting of character strings inasmuch as FIGS. 14-15 and 17-18 demonstrate that the sorting speed advantage of the linear sort relative to Quicksort is greater for the sorting of strings than for the sorting of integers. It should be recalled that the mask used for the sorting of character strings has a width equal to a byte representing a character of the string.

4. The In-Place Sorting Implementation

The linear sort algorithm of Section 2 was described generally. The specific implementations of the sort algorithm described in Section 2 assumed that the sequences to be sorted are linked to one another in any logical manner. For example, one method of linking the sequences logically is use linked lists of pointers to sequences to effectuate the sorting. With linked lists, the sequences being pointed to may be physically scattered throughout memory, so that the use of linked lists in computer systems having memory caching may result in frequent loading and flushing of cache memory. Various phenomena may be at play in relation to memory usage. A first phenomenon is the memory caching that is usually part of the CPU itself. A second phenomenon is an operating systems design in which virtual memory systems map virtual addresses onto physical addresses. Virtual pages in 8K or larger chunks are loaded into physical memory. Each time a reference is made to a virtual address, there is a chance that the base pointer, which points to the place in physical memory where a virtual page starts, has to be re-computed. When the virtual address reference resolves to a page not pointed to by the base pointer, the base pointer must be reindexed and recomputed. This is called a page fault. If the needed page has been written to disk and must be re-read, a "page swap"

occurs. The in-place sort of the present invention is more efficient because the probability of using cache goes up, and the probability of page faults and page swaps goes down.

As an alternative to the use of linked lists, this section describes the in-place implementation of the linear sorting algorithm of FIG. 2. The in-place implementation of the sorting algorithm of the present invention, called "Ambersort", utilizes memory more efficiently than does the linked lists implementation of the sorting algorithm of the present invention. During the progression of in-place sorting, the sequences to be sorted which are closer in value become physically more proximate to one another. This phenomena during in-place sorting facilitates more efficient use of memory pages and memory caching, resulting in faster sorting than with linked lists.

The in-place sorting algorithm described herein fits within the linear sorting algorithm of Sections 1-3 described supra, characterized by L levels and a mask of width W to define nodes which are executed recursively (See FIG. 5 and description supra thereof) or under counter-controlled looping (see FIG. 6 and description supra thereof). The in-place sorting feature assumes that the sequences of bits to be sorted are initially stored in a physically contiguous arrangement (e.g., a physical array) and that as the nodes are each executed, the sequences are rearranged within the physically contiguous arrangement, so as to remain more physically proximate to one another than with other logical arrangements of the sequences to be sorted.

An "in-place" sorting algorithm is defined herein as a sorting algorithm that reorders sequences within an array until the sequences are reordered within the array in an ascending or descending order, such that the sequences being sorted are not moved outside of the array during the sorting unless a sequence moved out of the array is subsequently moved back into the array. For example, an indirect sequence movement from a first array position within the array to a second array position within the array is within in-place sorting. With an "indirect move", the sequence is moved from the first array position within the array to at least one location outside of the array, and is subsequently moved from the least one location outside of the array to the second array position within the array. In contrast, a sorting algorithm that does not use in-place sorting builds a new array or other memory structure to store the sorted sequences.

Figure 25:
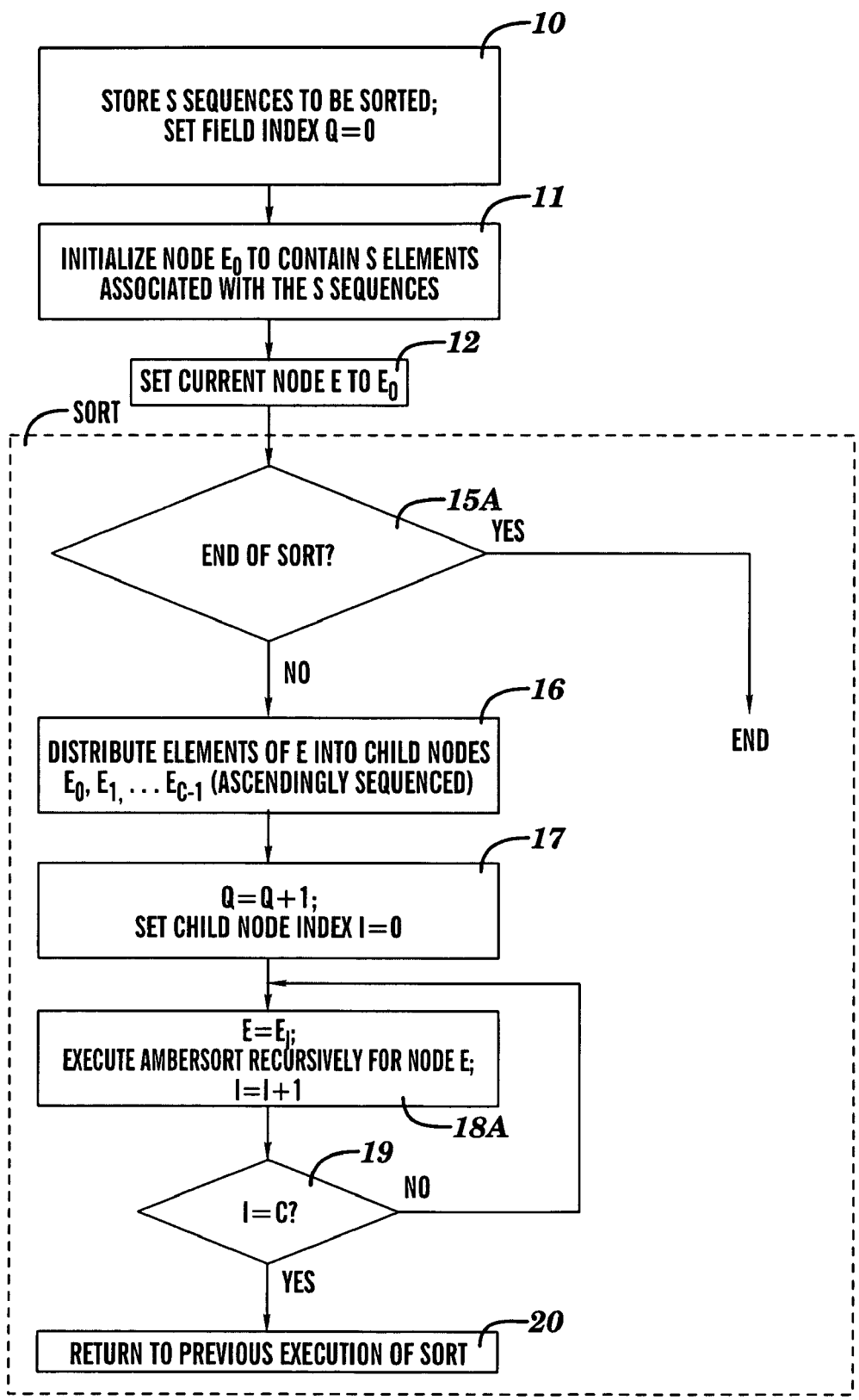
FIG. 25 is a flow chart for in-place linear sorting under recursive execution, in accordance with embodiments of the present invention.
Figure 26:
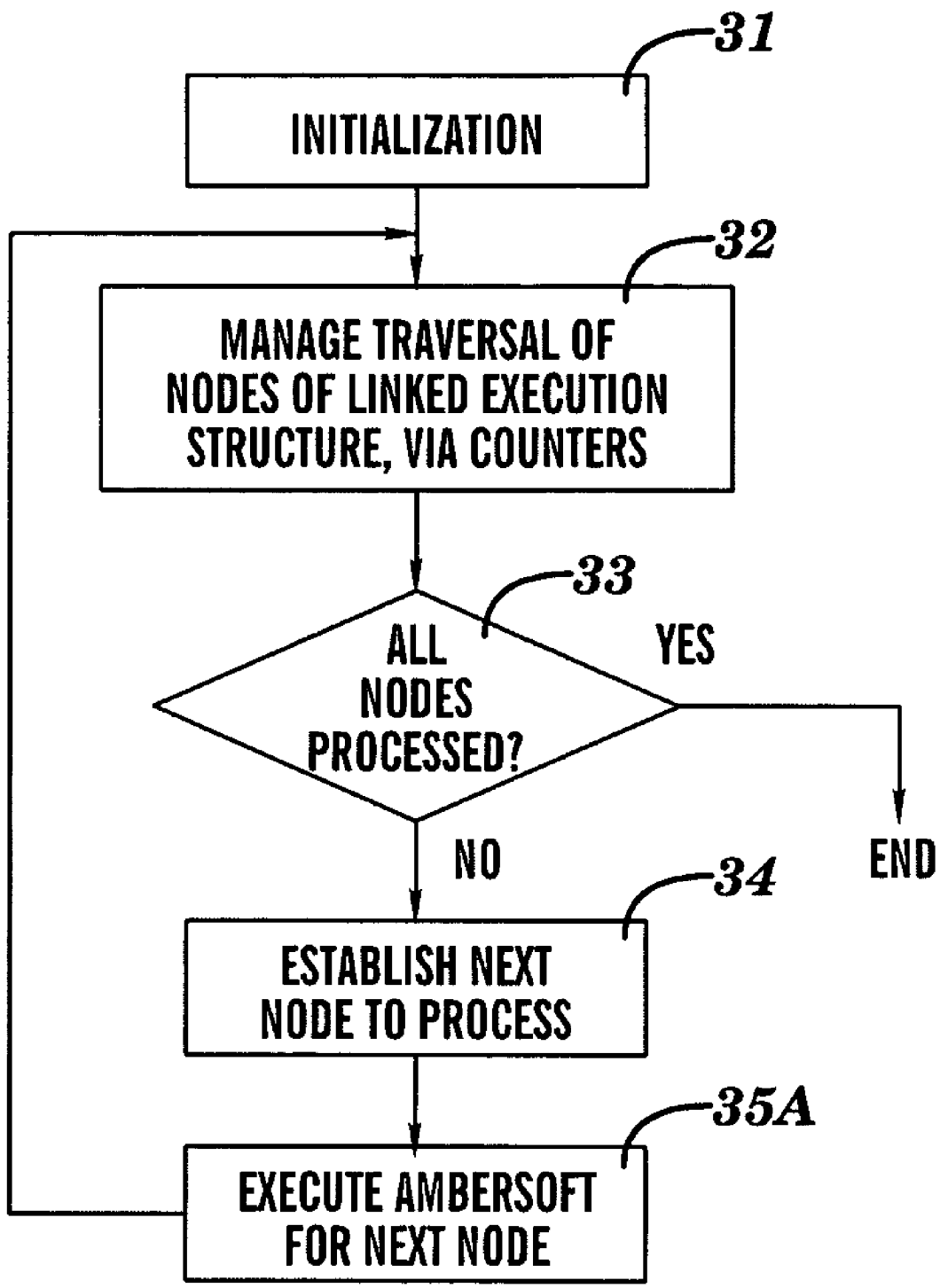
FIG. 26 is a flow chart for in-place linear sorting under counter-controlled looping, in accordance with embodiments of the present invention.

With respect to the recursive execution and in accordance with embodiments of the present invention, FIG. 25 describes the in-place sorting embodiment of the present invention that replaces FIG. 5 such that steps 13, 14, and 16 of FIG. 5 do not appear in FIG. 25, the end-of-sort test step 15 of FIG. 5 is replaced by the end-of-sort test step 15A of FIG. 25, and the in-place equivalent of steps 13, 14, and 16 of FIG. 5 are incorporated directly into the Ambersort of step 18A which replaces step 18 of FIG. 5 for more efficient use of caching as will be described infra. With respect to the counter-controlled looping and in accordance with embodiments of the present invention, FIG. 26 describes the in-place sorting embodiment of the present invention that replaces FIG. 6 such that steps 35-41 of FIG. 6 are replaced by the Ambersort execution step 35A which is algorithmically the same as Ambersort execution step 18A of FIG. 25. The primary difference between FIGS. 25 and 26 is that the Ambersort algorithm is invoked recursively in FIG. 25 and is called iteratively via counter-controlled looping in FIG. 26. With both FIGS. 25 and 26, the complexity of steps 13, 14, and 16 of FIG. 5 and of steps 35-41 of FIG. 6 for effectuating movement of sequences as the sorting is proceeding is replaced by the in-place movement of the sequences within the Ambersort algorithm as will be described infra.

Figure 27:
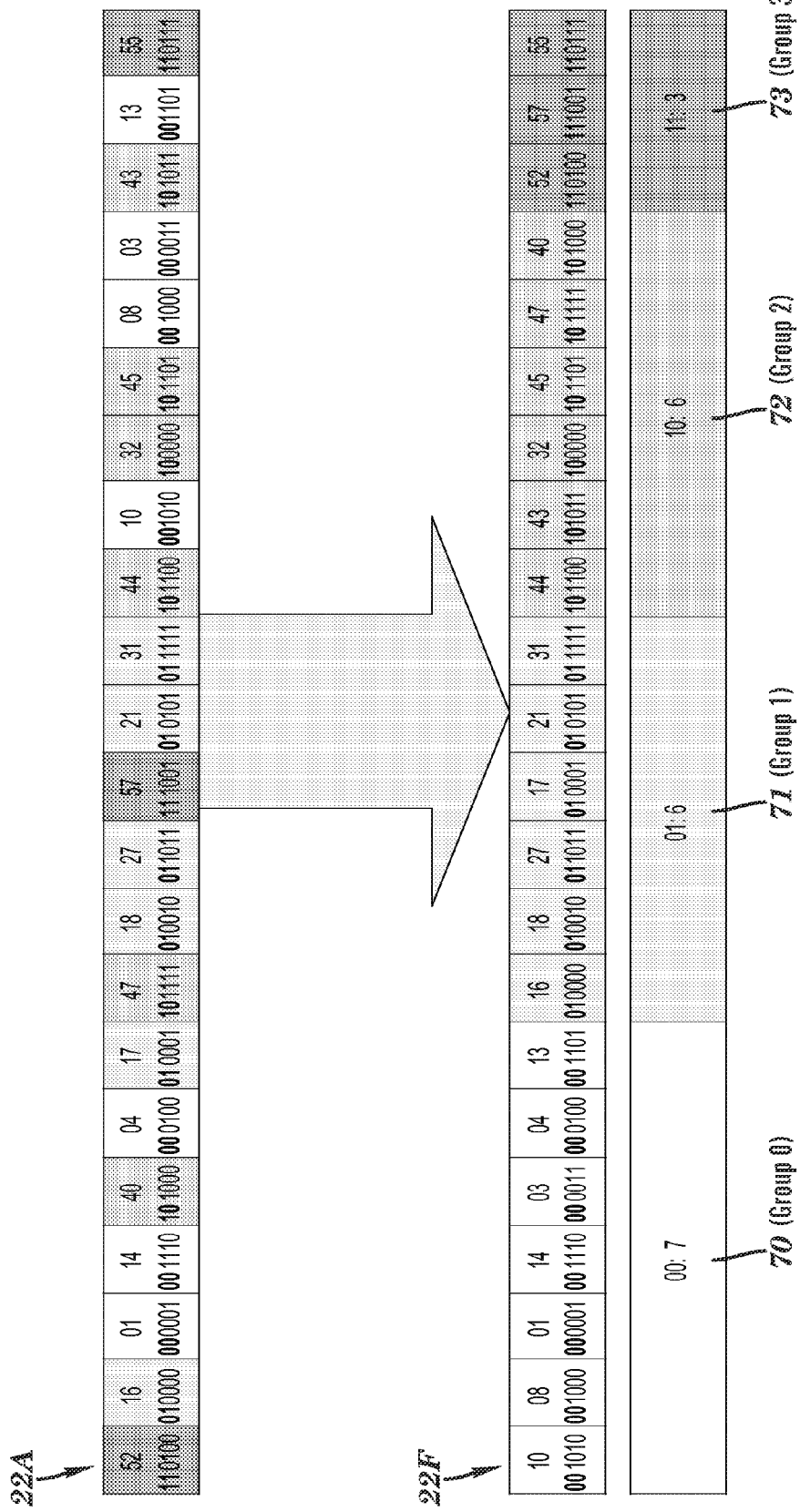
FIGS. 27-29 depict examples of using domino chains to effectuate in-place linear sorting, in accordance with embodiments of the present invention.
Figure 28:
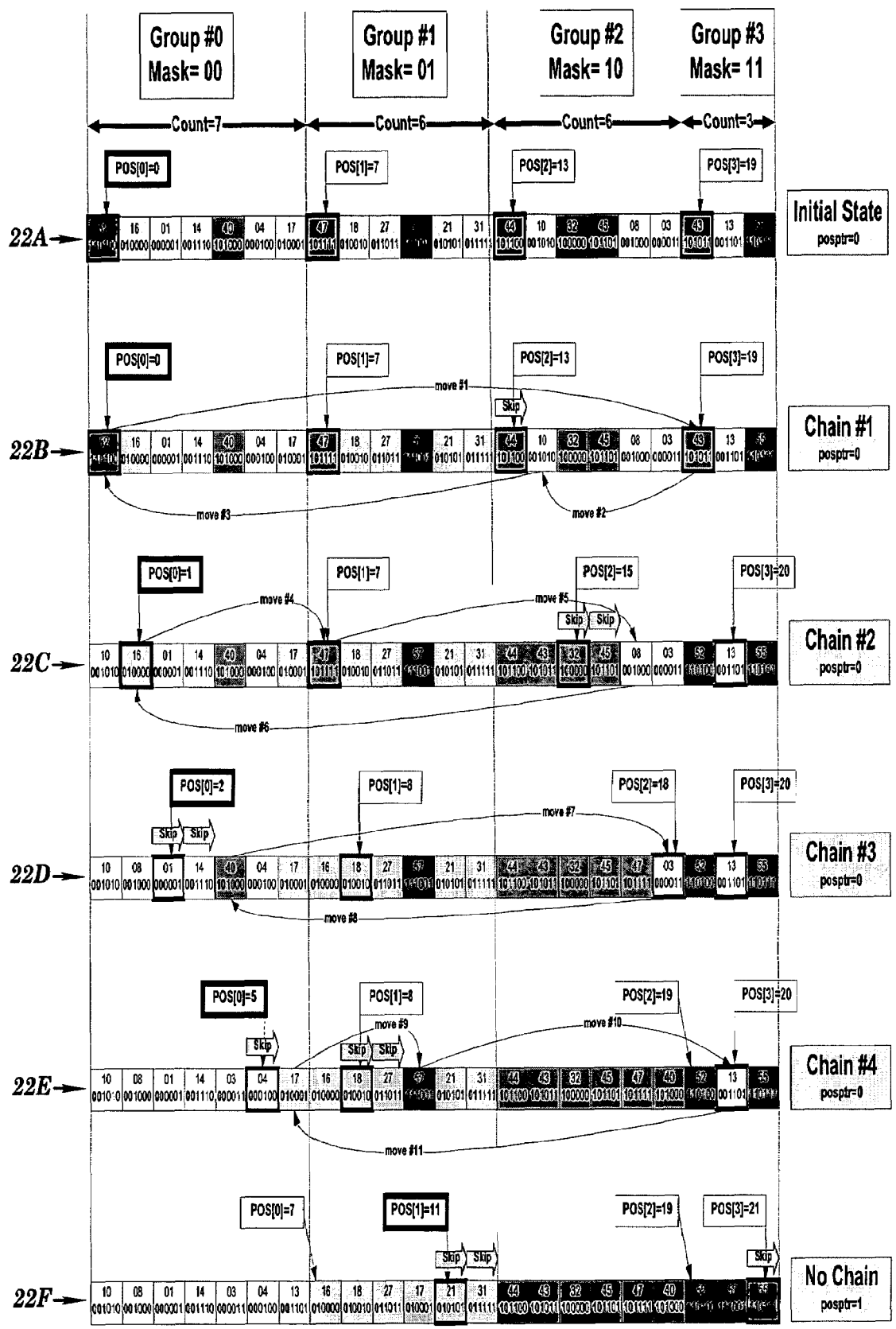
Figure 29:
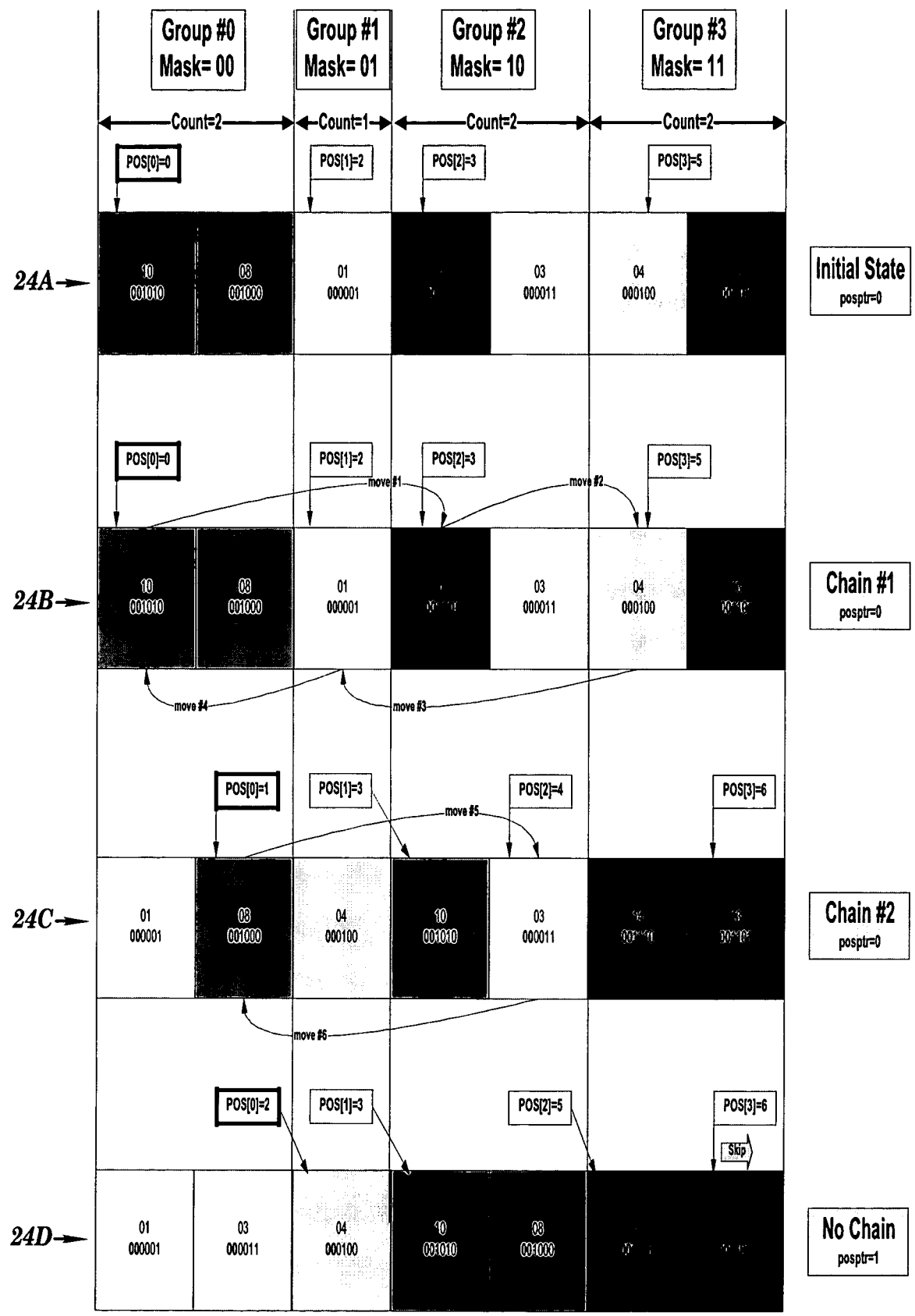
Figure 30:
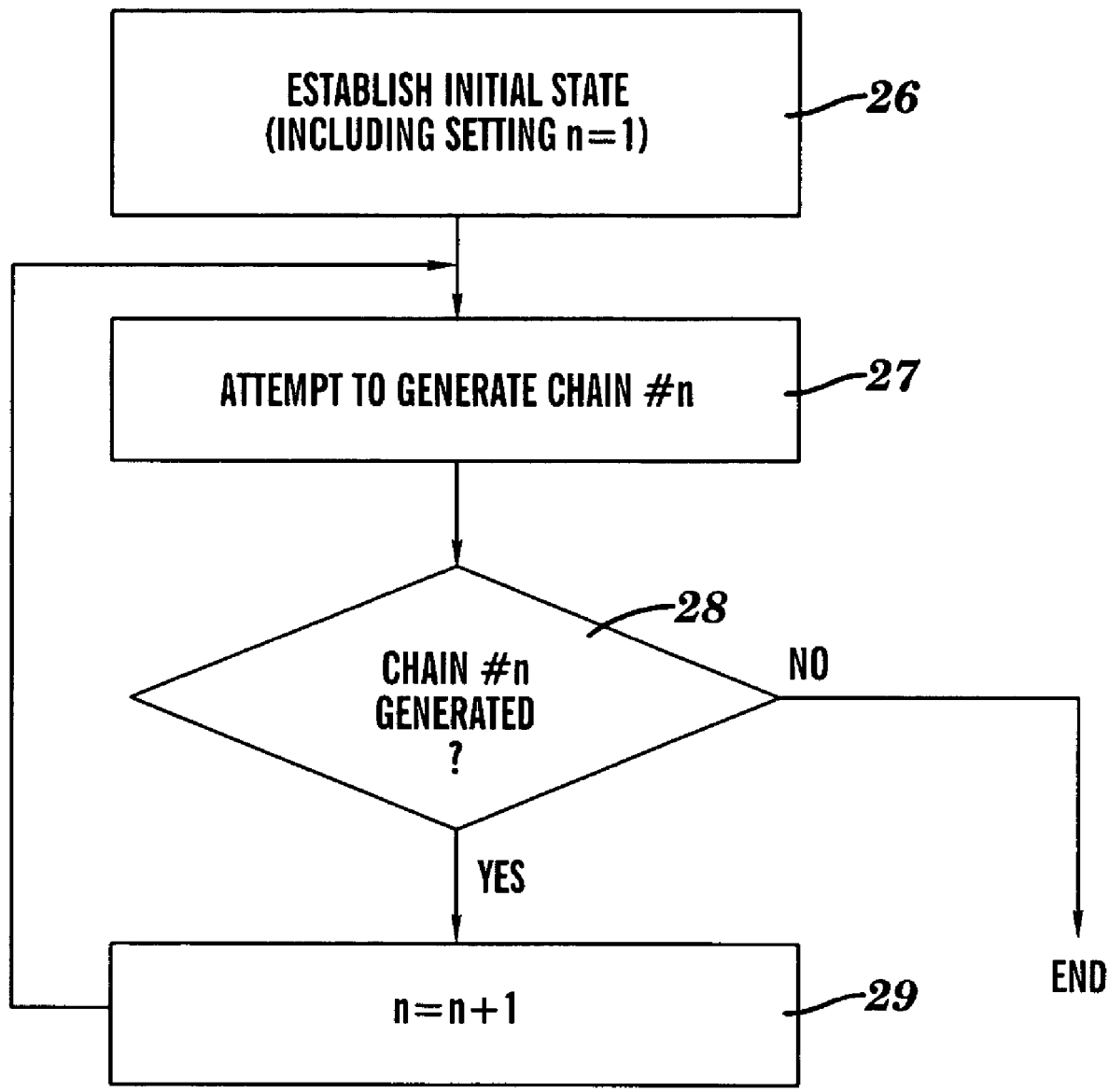
FIGS. 30-31 are high-level flow charts illustrating the domino chains to effectuate in-place linear sorting, in accordance with embodiments of the present invention
Figure 31:
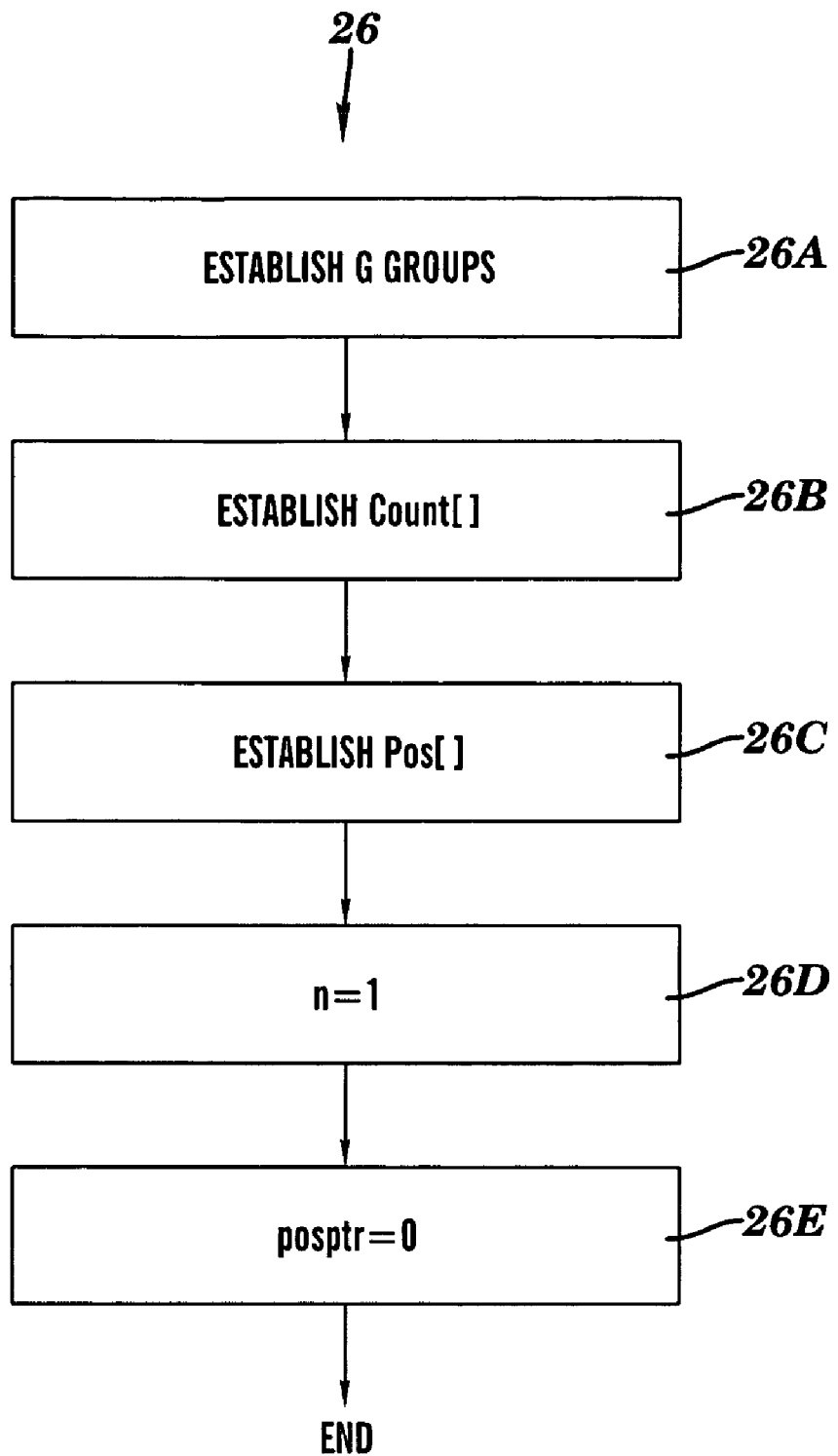

Steps 18A and 35A of FIGS. 25 and 26, respectively, are described infra in detail in the examples of FIGS. 27-29 and the flow charts of FIGS. 30-31. FIGS. 32 and 34A-34B, described infra, comprise pseudo-code and actual code, respectively, for the recursive calling embodiment of the in-place linear sort of the present invention.

In one embodiment (see FIG. 25), the Ambersort may be implemented as a recursive sort. Given an array X of contiguous sequences to be sorted at each level of recursion, a mask of width W divides the X sequences into groups such that each group is characterized by a mask of W bits. The total number of groups G associated with a mask width W is $2^W$, denoted as groups 0, 1, . . . , $2^W-1$. The mask selects the specific bit positions corresponding to the W bits as a basis for redistributing the X sequences within the array, such that the relocated sequences are physically contiguous with all sequences in the array for whom the selected bit positions contain the same bit values, as will be illustrated infra. The selected bit positions for each level of the recursion are non-overlapping but contiguous and immediately to the right of the bit positions in the previous level. The recursion continues until all bits have been masked for a sequence or there is zero or one sequence in a given group. For example, if there are 32 bits in each sequence of an array to be sorted (i.e., N=32) and the mask width W is 7, then there will be 5 levels of recursion. If the bits are numbered 0 (rightmost and least significant bit) to 31 (leftmost and most significant bit), then there are 5 levels of recursion (L=5) such levels 1, 2, 3, 4, 5 are based on sequence groupings relating to bits 31-25, 24-18, 17-11, 10-4, and 3-0, respectively.

The nomenclature is as follows. S is the number of sequences (i.e., words) to be sorted. Each sequence is a sequence of bits and N is the number of bits in each sequence. W is a mask width, G is the number of groups of bit combinations associated with a mask of width W (i.e., G=$2^W$), and L is the number of recursive levels and is a function of N and W.

FIG. 27 provides an example of the grouping of sequences in an array (at a given level of recursion) based on a bit mask, in accordance with embodiments of the present invention. In FIG. 27, an array of 22 contiguous sequences of 52, 16, 01, . . . , 55 (as denoted by reference numeral 22A) are redistributed, by a recursive call to Ambersort within the same array, into the 22 contiguous sequences of 10, 08, 01, . . . , 55 (as denoted by reference numeral 22F). Note that the array 22F is not totally sorted but is more sorted than is array 22A as will be explained infra in conjunction with FIGS. 28-29. Each sequence in the array 22A or 22F has 6 bits denoted as bit position 0, 1, . . . , 5 from right to left. The redistributed array 22F is organized into 4 groups denoted as groups 0, 1, 2, 3 from left to right, each group identified with a specific mask for bit positions 5 and 4 (i.e., the leftmost 2 bit positions) of the 6 bits in each word. For groups 0, 1, 2, 3, the bit positions 5 and 4 for defining the mask have an associated mask 00, 01, 10, 11 and contain 7, 6, 6, 3 words, as denoted by reference numerals 70, 71, 72, and 73, respectively. The redistributed array 22F in FIG. 27 confirms that the redistributed sequences in each group have the same bit values in the mask bit positions 5 and 4. For example, all redistributed words in group 1 of array 22F have 0 and 1 in the mask bit positions 5 and 4, respectively. Since the initial and redistributed arrays 22A and 22F, respectively, is the same physical array in memory, the redistribution of sequences effectuated by Ambersort relates to an "in-place" sort. Ambersort recursively calls itself for each of the groups 0 to 3 in array 22F so that the sequences can be further organized according to the next 2 bits to the right (i.e., bit positions 3 and 2), as illustrated in the example of FIG. 29 described infra. The details of how array 22A of FIG. 27 is reorganized into array 22F is explained infra in conjunction with FIG. 28.

FIG. 28 depicts execution (i.e., processing) of a first node of the node execution sequence by executing successive domino chains #1, #2, #3, and #4 to effectuate the grouping of sequences in the array 22A to generate the array 22F of FIG. 27, in accordance with embodiments of the present invention. Array 22A represents the initially ordered state of the sequences 52, 16, 01, . . . , 55 to be sorted. The arrays 22A, 22B, . . . , 22F each represent the sequences in a more sorted configuration in the progression from array 22A to array 22F. Thus, the sequences in array 22B are sorted to a greater extent than are the sequences in array 22A, the sequences in array 22C are sorted to a greater extent than are the sequences in array 22B, . . . , and the sequences in array 22F are sorted to a greater extent than are the sequences in array 22E.

A "domino chain" applied to an array in FIG. 28 is an ordered movement of N sequences (i.e., a first sequence, a second sequence, . . . , a $N^{th}$ sequence) within the array such that: the first sequence is moved into the array position occupied by the second sequence, the second sequence is moved into the array position occupied by the third sequence, . . . , the $(N-1)^{th}$ sequence is moved into the array position occupied by the $N^{th}$ sequence, the $N^{th}$ sequence is moved into the array position previously occupied by the first sequence. In FIG. 28, each such sequence move is denoted by the label "move #".

Arrays 22A, 22B, . . . , 22F are the same physical array comprising the same sequences therein such that the sequences in each array are in a different sequential ordering. However, the sequences in arrays 22A and 22B have the same sequential ordering. Application of domino chain #1 to array 22B results in array 22C. Application of domino chain #2 to array 22C results in array 22D. Application of domino chain #3 to array 22D results in array 22E. Application of domino chain #4 to array 22E results in array 22F. No domino chain is developed for array 22F which ends the execution of the first node of the node execution sequence described in FIG. 28.

In FIG. 28, the 22 sequences each have 6 bits (i.e., N=6) and are grouped based on a 2-bit mask (i.e., W=2) comprising the leftmost 2 bits of the 6-bit sequences. Since W=2, the number of groups G is 4 (i.e., $2^W=2^2=4$) which are denoted as groups 0, 1, 2, 3 having the mask 00, 01, 10, 11, respectively.

The bit positions of a sequence corresponding to the mask constitute the "mask field" of the sequence, said mask field having "mask bits" therein. The combination of the mask bits in the mask field is the "mask value" of the mask field. Thus in FIG. 28, the leftmost 2 bits of the 6-bit sequences is a mask field, said mask field containing the leftmost 2 bits of the sequence as its mask bits. For example, the mask bits in the mask field for the leftmost 2 bits of the number 44 (101100) in group 2 of array 22A are 1 and 0 (or 10 for brevity) having the mask value 10. In other words, the mask value is the combination of the mask bits in the mask field.

FIG. 28 is described with the aid of a "POS[ ]" array and a "posptr" variable. The POS[ ] array is characterized by POS[g]=p, wherein p is a pointer to an array position within the total array (i.e., 22A, 22B, . . . , or 22F), and wherein g is a group number (0, 1, 2, 3) identifying the group containing the array position pointed to by the pointer p. For the pointer p, the 22 array positions within each array are sequentially denoted as array positions 0, 1, 2, . . . , 21 from left to right. For example, POS[1]=8 identified in FIG. 28 for array 22D points to an array position in group 1 that is characterized as array position 8 (of the array position sequence 0, 1, 2, 3, 4, 5, 6, 7, 8, 9, . . . , 21) within the array 22D.

The groups 0, 1, 2, 3 are initially formed by counting the number of sequences in the array 22A that belong to each of the groups 0, 1, 2, 3 defined by the 4 possible combinations (00, 01, 10, 11) of the 2 bits in the mask for the leftmost 2 bits of the sequence. Thus group 0 has 7 sequences whose mask bits are 00, group 1 has 6 sequences whose mask bits are 01, group 2 has 6 sequences whose mask bits are 10, and group 3 has 3 sequences whose mask bits are 11. The four groups 0, 1, 2, 3 are separated by vertical lines in FIG. 28 and the variable "Count" indicates the number of sequences in each group (i.e., Count=7, 6, 6, 3 for groups 0, 1, 2, 3, respectively). Letting G denote the total number of groups and denoting Count for group g as Count[g], the initial value of POS[g] for each group g is computed by POS[0]=0 and POS[g] POS[g−1]+Count[g−1] for g=1, 2, . . . , G−1 (i.e., POS for a group is the summation of the Counts of the preceding groups). Accordingly, POS[0]=0, POS[1]=0+7=7, POS[2]=7+6=13, and POS[3]=13+6=19.

The groups are processed in the order 0, 1, 2, 3 (i.e., from left to right) and the variable "posptr" identifies or points to the group being processed. Ambersort attempts to find start a domino chain in the group characterized by posptr. The variable posptr is initially set to zero, since group 0 is the first group to be processed and Ambersort initially attempts to find a domino chain in group 0. A domino chain is started in an array at a sequence that is not located in its proper group. A sequence is located in the proper group if the sequence mask bits are equal to the mask bits for the group. As stated supra, groups 0, 1, 2, and 3 have masks 00, 01, 10, and 11, respectively. Since the mask in FIGS. 27-28 pertains to bit positions 5 and 4 (i.e., the leftmost 2 bits), the mask bits of the sequences are the bits in bit positions 5 and 4. For example, the first sequence 52 (110100) in array 22B is not in its proper group, because the first sequence (52) is in group 0 having a mask of 00 whereas the mask bits of the first sequence is 11.

In FIG. 28, domino chain #1 is formed and applied to array 22B as follows. Generally, the group identified by posptr is processed. Since posptr=0, group 0 is thus processed. The first sequence processed within the array is pointed to by POS[posptr]. Since POS[0]=0 in array 22B, the first sequence processed for array 22B is in position 0 of array 22B, namely the sequence 52 (110100). The sequence 52(110100) is selected as the first sequence to be moved in domino chain #1 because the sequence 52 (110100) is not in its proper group. The sequence of 52 (110100) has mask bits of 11 and therefore belongs in group 3. The sequence 52 (110100) is moved (move #1) to the first array position in group 3 where the existing value in group 3 is not properly located in group 3. Note that since the number of values has already been counted for each group via Count[g] as described supra, it is guaranteed that there will be at least one value that is improperly located in group 3 and that move #1 therefore will have a destination in group 3. In the example, the value in position 19 is in the wrong group. The displaced sequence at POS[3]=19, namely 43 (101011) has mask bits 10 and therefore belongs in group 2. There fore, POS[3]=19 and POS[3] is incremented by 1 to become POS[3]=20. Generally POS[ ] is incremented by 1 when a sequence moves into POS[ ] or when the data value in POS[ ] is skipped over. A "skipped over" sequence corresponds to a value that is already in its proper group and should not be moved. Thus the sequence 43 (101011) pointed to by POS[3]=19 belongs in group 2 due to its mask bits 10 and is potentially moved (move #2) to the array position at POS[2]=13. However, the sequence at POS[2]=13, namely 44 (101100), belongs in group 2, so the sequence 44 (101100) is skipped over by incrementing POS[2] by 1 to become POS[2]=14. Accordingly, the sequence 43 (101011) is moved into array position 14 in array 22B, representing an adjustment in move #2's destination, and POS[2] is incremented by 1 to become POS[2]=15. The displaced sequence at POS[2]=14, namely 10 (001010), has mask bits 00 and is thus moved (move #3) to the sequence at POS[0] in group 0 which is empty since domino chain #1 started in group 0. POS[0] is then incremented by 1 to become POS[0]=1. Domino chain #1 is thus completed. Generally, a domino chain is completed when a sequence is moved into an empty array position in the array. Domino chain #1 thus represents the ordered sequence of movements of sequences 52 (110100), 43 (101011), and 10 (001010) within the array 22B to form array 22C, In FIG. 28, domino chain #2 is formed and applied to array 22C as follows. Since posptr=0, group 0 is being processed. Since POS[0]=1 in array 22C, the first sequence processed for array 22C is in array position 1 of array 22C, namely the sequence 16 (010000). The sequence 16 (010000) is selected as the first sequence to be moved in domino chain #2 because the sequence 16 (010000) is not in its proper group. The sequence of 16 (010000) has mask bits of 01 and therefore belongs in group 1. The sequence 16 (010000) is moved (move #4) into the first available array position in group 1 as indicated by POS[1]=7 and POS[1] is incremented by 1 to become POS[1]=8. The displaced sequence at POS[1]=7, namely 47 (101111) has mask bits 10 and therefore belongs in group 2. Thus the sequence 47(101111) is potentially moved (move #5) to the array position at POS[2]=15. However, the sequence at POS[2]=15, namely 32 (100000), belongs in group 2, so the sequence 32 (100000) is skipped over by incrementing POS[2] by 1 to become POS[2]=16. However, the sequence at POS[2]=16, namely 45(101101), belongs in group 2, so the sequence 45 (101101) is skipped over by incrementing POS[2] by 1 to become POS[2]=17. Accordingly, the sequence 47 (101111) is moved into array position 17 in array 22C and POS[2] is incremented by 1 to become POS[2]=18. The displaced sequence at POS[2]=17, namely 08 (001000), is moved into array position 1 (move #6) in array 22C which is empty since domino chain #1 started in group 0. POS[0] is then incremented by 1 to become POS[0]=2. Domino chain #2 is thus completed. Domino chain #2 thus represents the ordered sequence of movements of sequences 16 (010000), 47 (101111), and 08 (001000) within the array 22C to form array 22D.

In FIG. 28, domino chain #3 is formed and applied to array 22D as follows. Since posptr=0, group 0 is being processed. Since POS[0]=2 in array 22D, the first sequence processed for array 22D is in array position 2 of array 22D, namely the sequence 01 (000001). However, the sequence 01 (000001) belongs in group 0, so the sequence 01 (000001) is skipped over by incrementing POS[0] by 1 to become POS[0]=3. However, the sequence at POS[0]=3, namely 14 (001110 ), belongs in group 0, so the sequence 14 (001110 ) is skipped over by incrementing POS[0] by 1 to become POS[0]=4. The sequence 40 (101000) at POS[0]=4 is selected as the first sequence to be moved in domino chain #3 because the sequence 40 (101000) is not in its proper group. The sequence of 40 (101000) has mask bits of 10 and therefore belongs in group 2. The sequence 40 (101000) is moved (move #7) to the first available array position in group 2 as indicated by POS[2]=18. POS[2] is then incremented by 1 to become POS[2]=19. The displaced sequence at POS[2]=18, namely 03 (000011 ) has mask bits 00 and therefore belongs in group 0. Thus the displaced sequence at POS[2]=18, namely 03 (000011 ), is moved into array position 5 (move #8) in array 22D which is empty since domino chain #1 started in group 0. POS[0] is then incremented by 1 to become POS[0]=5. Domino chain #3 is thus completed. Domino chain #3 thus represents the ordered sequence of movements of sequences 40 (101000) and 03 (000011 ) within the array 22D to form array 22E.

In FIG. 28, domino chain #4 is formed and applied to array 22E as follows. Since posptr=0, group 0 is being processed. Since POS[0]=5 in array 22E, the first sequence processed for array 22E is in 04 (000100) belongs in group 0, so the sequence 04 (000100) is skipped over by incrementing POS[0] by 1 to become POS[0]=6. The sequence 17 (010001) is selected as the first sequence to be moved in domino chain #4 because the sequence 17 (010001) is not in its proper group. The sequence of 17 (010001) has mask bits of 01 and therefore belongs in group 1. The sequence 17 (010001) is potentially moved (move #9) to the first available array position in group 1 as indicated by POS[1]=8. The sequence at POS[1]=8, namely 18 (010010), belongs in group 1, so the sequence 18 (010010) is skipped over by incrementing POS[1] by 1 to become POS[1]=9. However, the sequence at POS[1]=9, namely 27 (011011), belongs in group 1, so the sequence 27 (011011) is skipped over by incrementing POS[1] by 1 to become POS[1]=10. Accordingly, the sequence 17 (010001) is moved (move #9) into array position 10 in array 22E and POS[1] is then incremented by 1 to become POS[1]=11. The displaced sequence at POS[1]=10, namely 57 (111001) is moved (move #10) to array position 20 in array 22E and POS[3] is incremented by 1 to become POS[3]=21. The displaced sequence at POS[3]=20, namely 13 (001101), is moved into array position 6 (move #11) in array 22E which is empty since domino chain #1 started in group 0. POS[0] is then incremented by 1 to become POS[0]=7. Since POS[0]=7 points to group 1 instead of to group 0, posptr is incremented by 1 to become posptr=1 indicating that all values that belong in group 0 are in group 0 and subsequent attempts to find chains will begin in group 1. Domino chain #4 is thus completed. Domino chain #4 thus represents the ordered sequence of movements of sequences 17 (010001), 57 (111001), and 13 (001101) within the array 22E to form array 22F.

In FIG. 28, an attempt is made to form the next domino chain (i.e., domino chain #5) for array 22E, starting in group 1 since posptr=1. However, no such domino chain #5 is found because all sequences in array 22F are in their proper group. Since POS[1]=11, the first sequence processed for array 22F is 21 (010101) which belongs in group 1, so the sequence 21 (010101) is skipped over by incrementing POS[1] by 1 to become POS[1]=12. However, the sequence at POS[1]=12, namely 31 (011111), belongs in group 1, so the sequence 31 (011111) is skipped over by incrementing POS[1] by 1 to become POS[1]=13. Since POS[1]=13 points to group 2 instead of to group 1, posptr is incremented by 1 to become posptr=2. Then posptr is incremented to 3, because all sequences in group 2 for mask bits 10 have been properly placed. The one remaining sequence in the group 3 pointed to by POS[3]=21, namely 55 (110111), is skipped because 55 (110111) is properly placed in group 3. Execution of the node has been completed (i.e., no additional domino chain is found). Note that execution of the node has been completed when the number of moves (sequences placed in the correct group) plus the number of skips (sequences already in the correct group) equals the total number of sequences in the array segment being processed during execution of the node. In FIG. 28, no domino chain was found in conjunction with array 22F, because the number of moves (11) plus the number of skips (11) equals the total number of sequences (22) in the array segment being processed during execution of the node.

In accordance with preceding discussion of FIG. 28, the present invention executes each node of the node execution sequence by: dividing the segment of the node into G groups of sequences based on a mask field having a mask width, each group of the G groups having a unique mask value of the mask field; and in-place rearranging the sequences in the segment, said in-place rearranging resulting in each group of the G groups comprising only those sequences having the unique mask value of the group. With "in-place rearranging," a sequence is moved, directly or indirectly, from a first array position within the segment to a second array position within the segment. With a "direct move", the sequence is moved from the first array position within the segment to the second array position within the segment without being moved out of the segment. With an "indirect move", the sequence is moved from the first array position within the segment to at least one location outside of the segment, and is subsequently move from said least one location outside of the segment to the second array position within the segment.

As illustrated in FIG. 28, said in-place rearranging comprises executing at least one domino chain with respect to the sequences moved within the segment. Executing a domino chain with respect to sequences within the segment comprises moving each said sequence (Z) from a first group (G1) of the G groups having a mask value(V1) that differs from the mask value (V) of the sequence to a second group (G1) of the G groups having a mask value (V2) that is equal to the mask value (V) of the sequence.

Upon completion of the node execution of FIG. 28, the in-place sorting performs a next node execution on each of the four groups of array 22F at the next recursive level, namely at the level in which the mask is defined by bit positions 3 and 2. For example, FIG. 29 illustrates the next node execution performed on the 7 sequences in group 0 of the 22F array in FIG. 28, in accordance with embodiments of the present invention. The node execution of FIG. 29 is performed in the same manner as the node execution of FIG. 28, as described next.

FIG. 29 depicts arrays 24A, 24B, 24C, and 24D. Arrays 24A, 24B, 24C, and 24D are the same physical array comprising the same sequences therein such that the sequences in each array are in a different sequential ordering. However, the sequences in arrays 24A and 24B have the same sequential ordering. Application of domino chain #1 to array 24B results in array 24C. Application of domino chain #2 to array 24C results in array 24D.

The 7 sequences in FIG. 29 each have 6 bits (i.e., N=6) and are grouped based on a 2 bit-mask (i.e., W=2) on the middle 2 bits (i.e., bits 3 and 2) of the 6-bit sequences. Since W=2, the number of groups G is 4 which are denoted as groups 0, 1, 2, 3 having the mask 00, 01, 10, 11, respectively. Thus in FIG. 29, the middle 2 bits of the 6-bit sequences are the mask bits of the sequences.

The groups 0, 1, 2, 3 are initially formed by counting the number of sequences in the array 24A that belong to each of the groups 0, 1, 2, 3 defined by the 4 possible combinations (00, 01, 10, 11) of the 2 bits in the mask. Thus group 0 has 2 sequences whose mask bits are 00, group 1 has 1 sequence whose mask bits are 01, group 2 has 2 sequences whose mask bits are 10, and group 3 has 2 sequences whose mask bits are 11. The variable "Count" indicates the number of sequences in each group (i.e., Count=2, 1, 2, 2 for groups 0, 1, 2, 3, respectively). Letting G denote the total number of groups and denoting Count group g as Count[g], the initial value of POS[g] for each group g is computed by POS[0]=0 and POS[g]=POS[g−1]+Count[g−1] for g=1, 2, . . . , G−1 (i.e., POS for a group is the summation of the Counts of the preceding groups). Accordingly, POS[0]=0, POS[1]=0+2=2, POS[2]=2+1=3, and POS[3]=3+2=5.

The groups are processed in the order 0, 1, 2, 3 (i.e., from left to right) and the variable "posptr" identifies or points to the group being processed. Ambersort attempts to find start a domino chain in the group characterized by posptr. The variable posptr is initially set to zero, since group 0 is the first group to be processed, and Ambersort initially attempts to find a domino chain in group 0. A domino chain is started in an array at a sequence that is not located in its proper group. A sequence is located in the proper group if the sequence mask bits are equal to the mask bits for the group. As stated supra, groups 0, 1, 2, and 3 have masks 00, 01, 10, and 11, respectively. Since the mask in FIG. 29 pertains to bit positions 3 and 2 (i.e., the middle 2 bits), the mask bits of the sequences are the bits in bit positions 3 and 2.

In FIG. 29, domino chain #1 is formed and applied to array 24B as follows. Since posptr=0, group 0 is being processed. Since POS[0]=0 in array 24B, the first sequence processed for array 24B is in array position 0 of array 24B, namely the sequence 10 (001010). The sequence 10 (001010) at POS[0]=0 is selected as the first sequence to be moved in domino chain #1 because the sequence 10 (001010) is not in its proper group. The sequence of 10 (001010) has mask bits of 10 and therefore belongs in group 2. The sequence 10 (001010) is moved (move #1) to the first available array position in group 2 as indicated by POS[2]=3 and POS[2] is incremented by 1 to become POS[2]=4. The displaced sequence at POS[2]=3, namely 14 (001110 ) has mask bits 11 and therefore belongs in group 3. Thus 14 (001110 ), is moved into array position 5 (move #2) in array 24B and POS[3] is incremented by 1 to become POS[3]=6. The displaced sequence at POS[3]=5, namely 04 (000100) has mask bits 01 and therefore belongs in group 1. Thus the sequence 04 (000100) is moved (move #3) to the array position at POS[1]=2 and POS[1] is incremented by 1 to become POS[1]=3. The sequence at POS[1]=2, namely 01 (000001), belongs in group 0 and is moved into array position 0 (move #4) in array 24B which is empty since domino chain #1 started in group 0. POS[0] is incremented by 1 to become POS[0]=1. Domino chain #1 is thus completed. Domino chain #1 thus represents the ordered sequence of movements of sequences 10 (001010), 14 (001110 ), 04 (000100), and 01 (000001) within the array 24B to form array 22C.

In FIG. 29, domino chain #2 is formed and applied to array 24C as follows. Since posptr 0, group 0 is being processed. Since POS[0]=1 in array 24C, the first sequence processed for array 24C is in array position 1 of array 24C, namely the sequence 08 (001000). The sequence 08 (001000) at POS[0]=1 is selected as the first sequence to be moved in domino chain #2 because the sequence 08 (001000) is not in its proper group. The sequence of 08 (001000) has mask bits of 10 and therefore belongs in group 2. The sequence 08 (001000) is moved (move #5) to the first available array position in group 2 as indicated by POS[2]=4 and POS[2] is incremented by 1 to become POS[2]=5. The displaced sequence at POS[2]=4, namely 03 (000011 ) has mask bits 00 and therefore belongs in group 0. Thus 03 (000011 ) is moved into array position 1 (move #6) in array 24C which is empty since domino chain #1 started in group 0. POS[0] is incremented by 1 to become POS[0]=2. Since POS[0]=2 points to group 1 instead of to group 0, posptr is incremented by 1 to become posptr=1. Domino chain #1 is thus completed. Domino chain #1 thus represents the ordered sequence of movements of sequences 08 (001000) and 03 (000011 ) within the array 24C to form array 24D.

In FIG. 29, an attempt is made to form the next domino chain (i.e., domino chain #3) for array 24D, starting in group 1 since posptr=1. However, no such domino chain #3 is found because all sequences in array 24D are in their proper group. Since POS[1]=3 points to group 2, posptr is incremented by 1 to become posptr=2. Since POS[2]=5 points to group 3, posptr is incremented by 1 to become posptr=3. All sequences in group 3 are in the proper group. Thus the node execution of FIG. 29 has ended. To confirm that the node execution has properly ended, note that the number of moves (6) plus the number of skips (1) equals the total number of sequences (7) in the array segment being processed in the node execution.

In summary, for any segment (i.e., node) of the total array to be sorted (e.g., the segment of 22 sequences in FIG. 28; the segment of 7 sequences in FIG. 29; etc.), each level of the Ambersort recursion determines the size and position within the segment for each group of the segment. The sequences are then each moved zero times (if they are physically in the group they should be in) or one time (displacing a sequence that is improperly placed). The first (leftmost) sequence in the segment that is not in its correct group is selected and its array position is considered "empty". The displaced sequence is then moved into an array position in the group that it belongs to, displacing yet another sequence in the wrong array position. This displaced domino effect continues until a sequence is found that goes into the "empty" array position ending the domino chain. The next sequence that is not in its proper group is selected to start a new domino chain. The node execution is completed (i.e., no additional domino chain is found) when the number of moves (sequences placed in the correct group) plus the number of skips (sequences already in the correct group) equals the total number of sequences in the segment being sorted during the node execution.

Thus, the most efficient movement of sequences occurs when the sequences are arranged such that there is only one domino chain. As has been demonstrated supra, each sequence in the array is moved zero times or one time, which underlies the linearity of the algorithmic complexity of the Ambersort (i.e., order (S) where S is the number of sequences to be sorted).

While the preceding description of Ambersort was expressed in recursive terminology with reference to FIG. 25, the preceding description of Ambersort (with masking, domino chains, etc.) likewise applies to the counter-controlled looping embodiment of FIG. 26. The primary difference is not within the Ambersort algorithm but rather in how the Ambersort algorithm is invoked: recursively in FIG. 25 and with counter-controlled looping in FIG. 26.

The examples of FIGS. 28 and 29 illustrate how the Ambersort algorithm fits within the nodes of a linked execution structure described supra in conjunction with Sections 1 and 2. The segment of 22 sequences (i.e., S=22) in FIG. 28 is an initial array of sequences to be sorted and is therefore a root node. The groups 0, 1, 2, 3 corresponding to the masks 00, 01, 10, 11, respectively, in FIG. 28 (for bits 5 and 4 of the sequences to be sorted) will each become child nodes of the root node in subsequent Ambersort executions such as the Ambersort execution of the 00 node for the 7 sequences of FIG. 29. The groups 0, 1, 2, 3 corresponding to the masks 00, 01, 10, 11, respectively, in FIG. 29 (for bits 3 and 2 of the sequences to be sorted) will each become child nodes of the node executed according to FIG. 29 in subsequent Ambersort executions. In that manner, all nodes of the linked execution structure are each executed via the Ambersort in-place algorithm (recursively as in FIG. 25 or iteratively via counter-controlled looping as in FIG. 26) in the same sequential order of nodal executions as was described supra in Section 2 (as illustrated in the examples of FIGS. 2-4). Thus, each "node execution" of the in-place sorting (i.e., each in-place sorting of a segment of the array of sequences to be sorted, such as the node execution of FIG. 28 or FIG. 29) constitutes an execution (or processing) of the node represented by the segment. Therefore, performing an Ambersort iteration and executing a node of the linked execution structure have the same meaning.

In summary, the linked execution structure with respect to the in-place sorting embodiments of the present invention includes nodes which are linked together in a manner that dictates a sequential order of execution of program code with respect to the nodes. The linked execution structure of the in-place sorting is a program code execution space, and the nodes of the linked execution structure may be viewed as points in the program code execution space. Moreover, the sequential order of execution of the program code with respect to the nodes is in a hierarchical sequence that is a function of an ordering of masking results derived from a masking of the fields of the sequences to be sorted.

While the node (i.e., segment) of FIG. 28 and the node (i.e., segment) of FIG. 29 were each executed (i.e., partially sorted) in accordance with a same mask width (W) of 2, the in-place sorting algorithm of the present invention includes embodiments in which the mask width W is constant across all nodes, and also includes embodiments in which the mask width W is variable (i.e., node dependent) for optimizing the efficiency of individual sorting attempts. As an example, child nodes C1 and C2 of a parent node P may each be processed with a mask width of W; however, the child nodes of C1 and C2 may be processed with a mask width of W1 and W2, respectively, wherein at least two of mask widths W, W1, and W2 are different.

FIGS. 30-31 are flow charts describing the Ambersort algorithm as applied to a segment to be sorted, in accordance with embodiment of the present invention. The flow charts of FIGS. 30-31 relate to steps 18A and 35A of FIGS. 25 and 26, respectively, described supra.

FIG. 30 is a high-level flow chart comprising steps 26-29. Step 26 establishes an initial state as exemplified by array 22A of FIG. 28 and array 24A of FIG. 29. Step 26 further includes initializing a domino chain number n to 1 (i.e., n=1). Steps 27-29 constitute steps of a loop in which domino chain #n is processed. Step 27 attempts to generate domino chain #n and generates domino chain #n if it is possible to generate domino chain #n. Step 28 ascertains whether domino chain #n was generated in step 27. If step 28 ascertains that domino chain #n was not generated in step 27, then the Ambersort algorithm for the segment is exited. If step 28 ascertains that domino chain #n was generated in step 27, then step 29 increments the domino chain number n by 1 to define the next domino chain number n and the algorithm loops back to step 28 in an attempt to generate the next domino chain #n.

FIG. 31 depicts steps 26A, 26B, 26C, 26D, and 26E which describe aspects of the initialization step 26 of FIG. 30 in more detail. Using a mask width of W, step 26A establishes G groups via $G=2^W$, wherein the G groups are denoted as groups 0, 1, ..., G-1. Step 26B establishes the Count for each group (i.e., Count[0], Count[1], ..., Count[G-1]), by determining the number of sequences in each group having the same mask bit values. Step 26C computes the initial value of POS[g] for each group g via: POS[0]=0 and POS[g]=POS[g-1]+Count[g-1] for g=1, 2, ..., G-1. Step 26D sets domino chain number n to 1. Step 26E sets the group pointer (posptr) equal to zero.

FIG. 32 depicts pseudo-code for the Ambersort algorithm called recursively to execute all segments at all levels to perform a complete sort, starting the recursion initially with the total array of sequences to be sorted (i.e., the root node). FIG. 32 comprises blocks 43-45 of pseudo-code.

Block 43 is a definition section which defines variables START, COUNT, LEFTMOST, and max_children. For the initial call of Ambersort, START and COUNT define the total array of sequences to be sorted (corresponding to the root node) and MASK is the initial mask used for the root node. For subsequent recursive calls to Ambersort (from block 45), START and COUNT define the current segment of sequences to be sorted and MASK is the current mask used for the current segment. The variable max_children denotes the number of groups G in the segment (i.e., $2^W$).

Block 44 corresponds to the initialization step 26 of FIG. 30 (or as described in FIG. 31). In block 44, pos[ ] is the POS[ ] array described supra.

Block 45 corresponds to steps 27-29 of the loop in FIG. 30 for generating the domino chains.

Block 46 calls Ambersort recursively from each group after no more domino chains can be formed in the segment currently being executed by Ambersort (e.g., when no domino chains are found for array 22F in FIG. 28 or for array 24D for FIG. 29, or upon a determination of "NO" in step 28 of FIG. 30).

FIGS. 34A and 34B (collectively, "FIG. 34") is actual Ambersort source code (written in the C programming language) corresponding to the Ambersort pseudo-code of FIG. 32.

It is to be understood that all aspects of the linear sorting method of the present invention described in Sections 1-2 (and applicable aspects of Section 3) apply likewise to the Ambersort in-place sorting feature described herein, except for the in-sorting feature relating to the chained movement of sequences of the S sequences within each child set of sequences to be sorted. For example as described in Section 2, the Ambersort in-sort technique of the present invention may perform sorting: from left to right or right to left; in ascending or descending sorting order; for bit sequences having various representations (e.g., integers, floating point numbers, character strings, etc.); for integers or floating point numbers having all positive values or having all negative values or having both positive and negative values; etc.

5. Analysis of In-Place Sorting Algorithmic Complexity

This section analyzes algorithmic complexity of Ambersort based on: 1) the number of moves; and 2) the iterations of loops within Ambersort. The Ambersort source code listed in FIG. 34 aids in explaining the algorithmic complexity.

Every node execution of the Ambersort handles only a segment of the array to be sorted with the first node execution handling all S sequences of bits to be sorted for the first segment, wherein S denotes the total number of sequences to be sorted. At each node execution, each sequence of bits in the segment is handled exactly one time and is either moved one time or skipped. Each node execution creates G physically contiguous groups of sequences, wherein G is between 1 and $2^W$ (W' 2 mask width). Ambersort then recursively calls itself for each group of the segment ("group segment") being processed during the current node execution, wherein each group segment below the S sequences is a child. The child call addresses only its group segment and uses the mask again on the next W bits immediately adjacent to and lower in magnitude than the current mask. Groups of size one or zero are not further sorted because there can be no change in their position. In this way, Ambersort results in up to L=ceiling(N/W) levels of recursion with N denoting the number of bits in a sequence and with each level of the L levels handling a maximum of S sequences across all node executions at that level giving an algorithmic complexity of L*S. Because L does not change as S changes (i.e., L is independent of S), L is considered a constant and the true order of complexity for Ambersort is of order (S).

Figure 33:
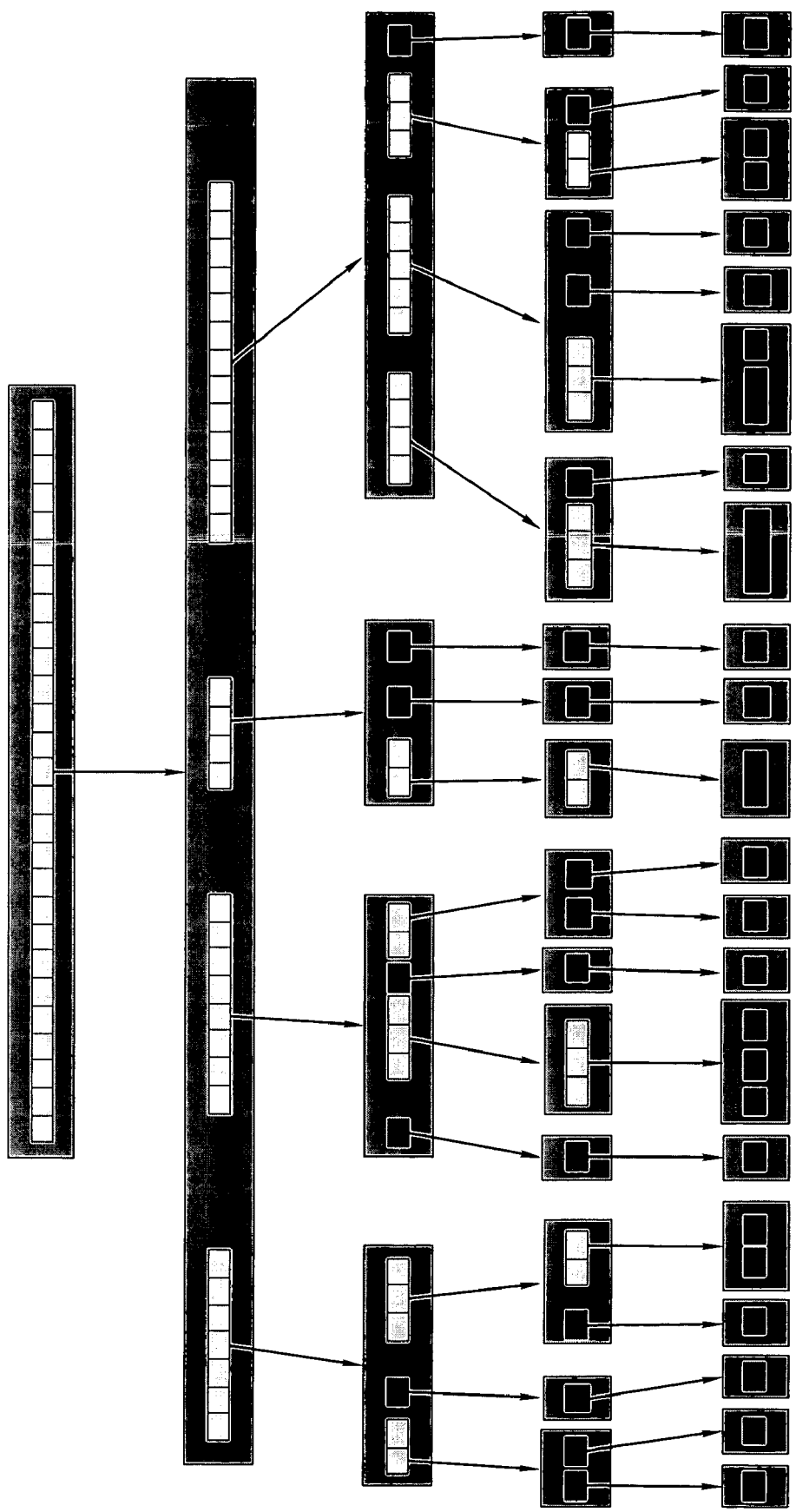

FIG. 33 shows an example in which 27 sequences, each sequence having 8 bits (i.e., N=8), are broken into groups and arranged into contiguous segments based on a 2-bit mask (i.e., W=2). In FIG. 33, the sequences are shown but the bits in each sequence are not shown. In the example of FIG. 33, groups of size one and sequences at the bottom of the call structure are shown in solid black, because the sequences at the bottom of the call structure are not moved any further and therefore are leaf nodes. Calls from such terminal (i.e., leaf node) sequences are also not made, but the positional integrity of the sequences is maintained for illustration. Three observations explained supra about Ambersort's algorithmic complexity can be seen in FIG. 34. First, there are at most N/W levels (e.g., 8/2=4 levels in this example). Second, in each level of recursion, the number of moves experienced by each element is exactly zero (if the element is in the correct grouping) or one (if the element is not in the correct grouping), because each recursive call deals with only a segment of the array and segments do not overlap across a level. Third, once a group size reaches zero or one, there are no further recursive calls needed for that segment.

An algorithmic complexity analysis pertaining to the number of moves is next presented and the Ambersort source code in FIG. 34 may be referred to as an additional aid to comprehension. The mask width W represents the number of bits to be examined for a given node execution. If each of the S sequences being sorted are 32-bits in size, then the maximum number of levels of recursion $L_{MAX}$ is computed as $L_{MAX}$=ceiling(32/W). Each sequence is moved exactly zero (it is already in its group) or one times (if it is part of a domino chain) for each level of recursion across the call tree. There are also cases where the call tree will not make it all the way to the $L_{MAX}$ call level because there may be exactly zero or one sequence assigned to one or more of the groups at any given level of recursion. The probability of any given call branch not reaching the $L_{MAX}$ level is reduced as the number (S) of sequences to be sorted increases and therefore the number of moves experienced by an individual sequence asymptotically approaches $L_{MAX}$ as the number of sequences increases. It is possible to modify the algorithm such that every sequence experience exactly one move per level of recursion; it is only the optimizations of the Ambersort algorithm preventing that from being the case when it is not necessary. Therefore, for any given S, the number of moves could be defined as $L_{MAX}$*S and $L_{MAX}$ is a constant which implies that the number of moves is in fact of order (S).

Looping Iterations Within the in-Place Sorting Algorithm

The looping iterations within the Ambersort source code of FIG. 34 are analyzed next. There are 6 outer looping structures within the Ambersort routine, denoted as: outer loop #1, outer loop #2, outer loop #3, outer loop #4, outer loop #5, and outer loop #6. Outer loop #5 contains 2 inner looping structures, namely inner loop #5.1 and inner loop #5.2. This section evaluates each of the looping structures for its effect on computational complexity within the Ambersort algorithm. The variable WIDTH represents the mask width (W). The variable MAX_DEPTH represents the number of levels (L). The variable and MAX_CHILDREN represents the maximum number of groups in a segment and is equal to $2^{WIDTH}$. Outer loop #1 is a "memset" that initializes the array that counts how many of the sequences in the array segment belong to each of the bit-mask driven groups. The order of magnitude for outer loop #1 is MAX_CHILDREN. The total complexity of outer loop #1 for all recursive calls for an entire sort can be computed as:

$$C_1 = \sum_{l=1}^{ceiling(32/WIDTH)} 2^{(WIDTH*l)}$$

Given that both WIDTH and MAX_DEPTH are constants and the above summation is actually the maximum number of iterations of outer loop #1 due to tree pruning, outer loop #1 will be considered to be complexity $C_1$ where $C_1$ is the constant value computed supra. This analysis for outer loops #1 also applies to outer loops #3, #4, and #6, since outer loops #3, #4, and #6 are all bounded by MAX_CHILDREN.

Outer loop #2 applies a mask to all sequences between the start and finish positions and uses the result to count how many sequences belong in each bit-mask group. Since start and finish apply to only the contiguous array segment belonging to a group from the previous level, the summation across all group segments for any depth in the recursive tree is equal to the number of sequences (S). Therefore, the total complexity of outer loop #2 is S* ceiling(32/WIDTH). Thus, the complexity of outer loop #2 is described as $S*C_2$, wherein $C_2$=ceiling(32/WIDTH). $C_2$ is a constant, since WIDTH is a constant, Outer loop #5 includes inner loops #5.1 and #5.2. The bounds on inner loop #5.1 are start and finish, the impact of which was discussed supra in conjunction with outer loop #2. Inner loop #5.2 increments the counter between start and finish and is therefore a means of advancing through the sequences for examination and placement. Inner loop #5.1 can have one of three outcomes for any given node execution. The first outcome is the proper placement of a sequence and increment of the counter from start to finish. The second outcome is identification of the beginning of a domino chain and is the first part of placing a sequence into its group. This can happen up to (start-finish+1)/2 times and is part of the outer loop's complexity structure. The third outcome occurs when a group has all of its sequences in it and is no longer a candidate for the beginning of a domino chain. The variable "posptr" is the counter for this looping mechanism and postpr is not reset with each iteration of the loop. In its worst case, this looping mechanism's complexity for a single call to Ambersort is based on MAX_CHILDREN also expressed supra as $C_1$. Therefore the complexity of outer loop #5 for all recursive node executions can be computed as $S*C_2+C_{1x}$. Looking at the complexity of all node executions (in the worst case) for all loops within all recursive calls of Ambersort, the complexity can be expressed using the following terms:

$$C_1+S*C_2+C_1+C_1+(S*C_2+C_1)+C_1$$

Since both $C_1$ and $C_2$ are constants, the order of complexity of the algorithm can again be expressed as order (S).

Ambersort Versus Quicksort for CPU Usage

There are three fundamental behaviors of the Ambersort algorithm that are key to understanding its performance results (see Section 6 described infra) and how the performance results relate to Quicksort. The first fundamental behavior of Ambersort is that Ambersort actually benefits from large numbers of duplicates. Duplicates represent a natural "pruning" of the recursive tree and cause the constant overhead of initializing counters etc to be reduced. The corollary to this behavior is that uniformly distributed values across all possible values tend to push Ambersort toward its worst case. This is in very stark contrast to Quicksort which suffers substantially from duplicates.

The second fundamental behavior of Ambersort is that high concentration of values with a common magnitude (even if all are unique) benefits Ambersort. This is because at the early levels of recursion, fewer groups are used again resulting in a tendency to prune the recursive tree. To illustrate, see the examples of FIGS. 28 and 29, discussed supra, in which the "no chain" situation was arrived at arrays 22F and 24D, respectively, upon filling the "empty position" in group 0 to end the domino chain. The corollary to this statement is that Ambersort is less efficient for sorting the more uniform distribution there is across all values at the most significant bits. Quicksort appears to be unaffected by the magnitude of values.

The third fundamental behavior of Ambersort is that the optimal selection of the proper mask width depends on a variety of sequences. Using a single width for possible S will physically work, but may display a stair step characteristic depending the magnitude and distribution of sequences to be sorted. For example, 5 million sequences that are uniformly distributed in value across all possible magnitudes may only require 2 levels of recursion for some mask widths. However, 6 million values of the same magnitude distribution may cause significant calls to a third level of recursion. This stair stepping as S is increased continues until the possible recursion tree becomes largely used at which case the stair step actually begins to seem sub-linear. (i.e., the fixed cost of initialization and other overhead is spread across more values). However, linearity is approached because of probabilities.

6. Performance Test Results for the In-Place Sort Algorithm

FIGS. 35-41 depicts performance test results pertaining to the in-place sort algorithm (Ambersort) of the present invention in comparison with Quicksort. In FIGS. 35-40, the Ambersort timing results in clock cycles are a function the number of sequences (S) to be sorted and of the mask width (W). The Quicksort timing results are shown in FIGS. 35-40 as a function of S. The Ambersort timing results in FIG. 35-40 are represented with background shading (light shading, medium shading, dark shading) as denoted to distinguish three cases: 1) cases in which the mask width W selection gives the optimal Ambersort result (medium shading); 2) cases in which Ambersort outperformed Quicksort but were not the optimal Ambersort result (light shading); and 3) cases in which Ambersort failed to outperform Quicksort (dark shading). The Quicksort results are represented with no shading background.

FIGS. 35, 36, 37, and 38 depict timing test results for the 32-bit sequences to be sorted whose magnitudes are randomly selected as being uniformly distributed over ranges of 8 bits (magnitude between 0 and 0000000FF hexadecimal), 16 bits (magnitude between 0 and 0000FFFF hexadecimal), 24 bits (magnitude between 0 and 00FFFFFF hexadecimal), and 32 bits (magnitude between 0 and FFFFFFFF hexadecimal), respectively. The "0x" prefix in the title of FIGS. 35-38 denotes that the expressed value is in hexadecimal. The smaller the number of bits in the range that numbers are generated, the higher the number of duplicates in the sample to be sorted. FIGS. 35-38 show Ambersort performance (in CPU clock cycles on a IBM T40 1.5 GHz Intel Pentium M with 1G of RAM) for multiple number of values (S) over each of the mask widths W from 1 to 12. FIGS. 35-38 also show Quicksort performance.

In FIGS. 35-38, the Ambersort timing performance relative to the Quicksort timing performance progressively improves as the maximum possible sequence magnitude (in terms of bits) decreases from 32 bits to 24 bits to 16 bits to 8 bits (from FIG. 38 to FIG. 37 to FIG. 36 to FIG. 35), respectively, because as the sequence magnitude decreases, the number of duplicates increases for a given number of sequences S. However, for each value of S (i.e., number of sequences sorted) in FIGS. 35-38, there are mask width(s) W at which Ambersort timing outperforms Quicksort timing.

FIG. 39 depicts timing results in clock cycles for sorting zip codes represented as 9-digit integer values that use approximately 30 of 32 possible bits. The randomly generated sequences to be sorted were unique and uniformly distributed across all possible values within their permissible range. The timing comparison results between Ambersort and Quicksort for FIG. 39 bears a resemblance to the timing comparison results for FIG. 38, and for each value of S in both FIGS. 38 and 39, there is at least one mask width W at which Ambersort timing outperforms Quicksort timing.

Figure 40:
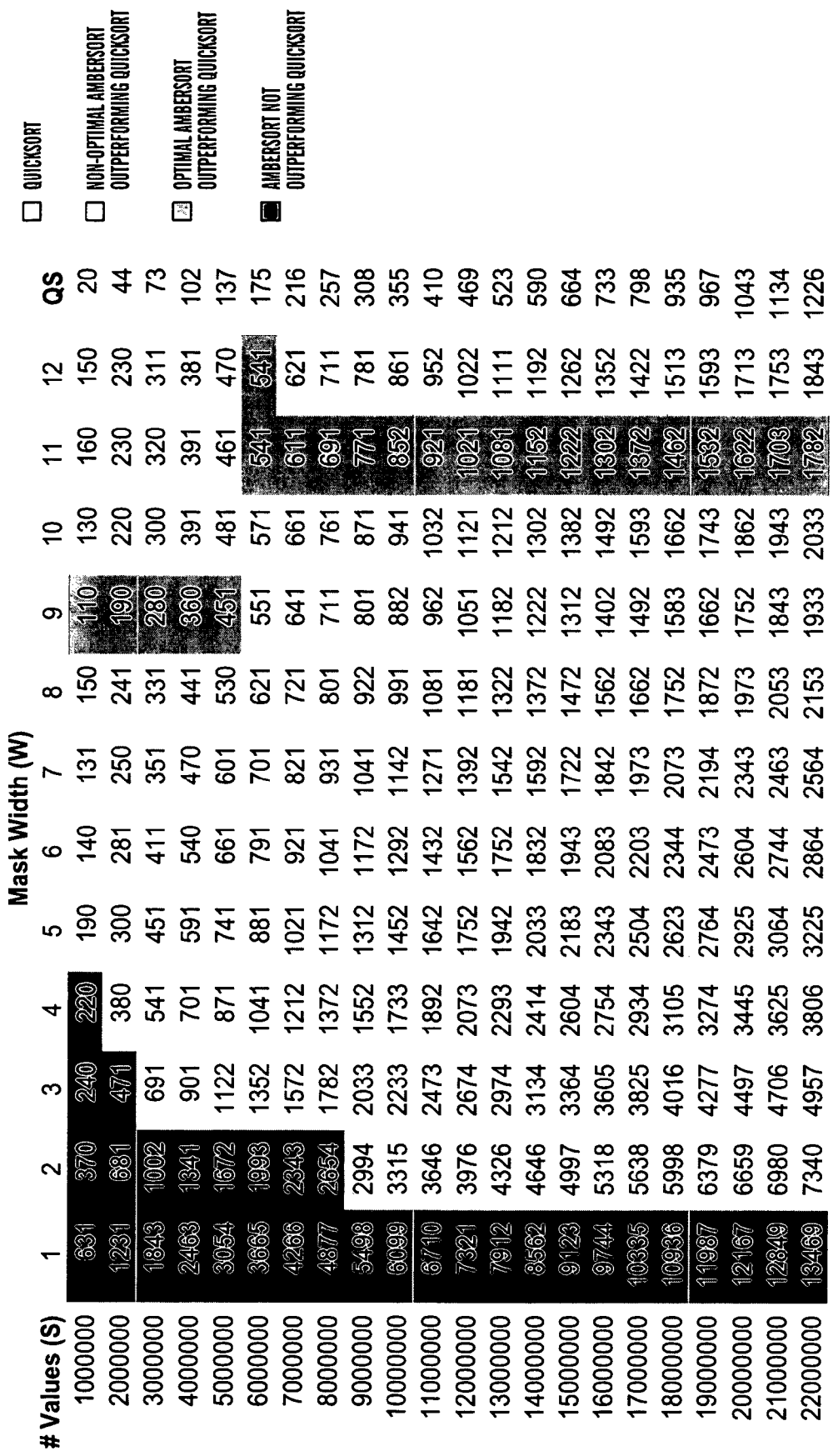

FIG. 40 depicts timing results in clock cycles for sorting 10-digit telephone numbers in which the area code is limited by having only 32 bit integers. However, unlike FIG. 39, there are only about 58,000 unique numbers randomly generated from a uniform distribution, resulting in much better Ambersort versus Quicksort timing performance due to the presence of duplicates in FIG. 40 but not in FIG. 39.

Figure 41:
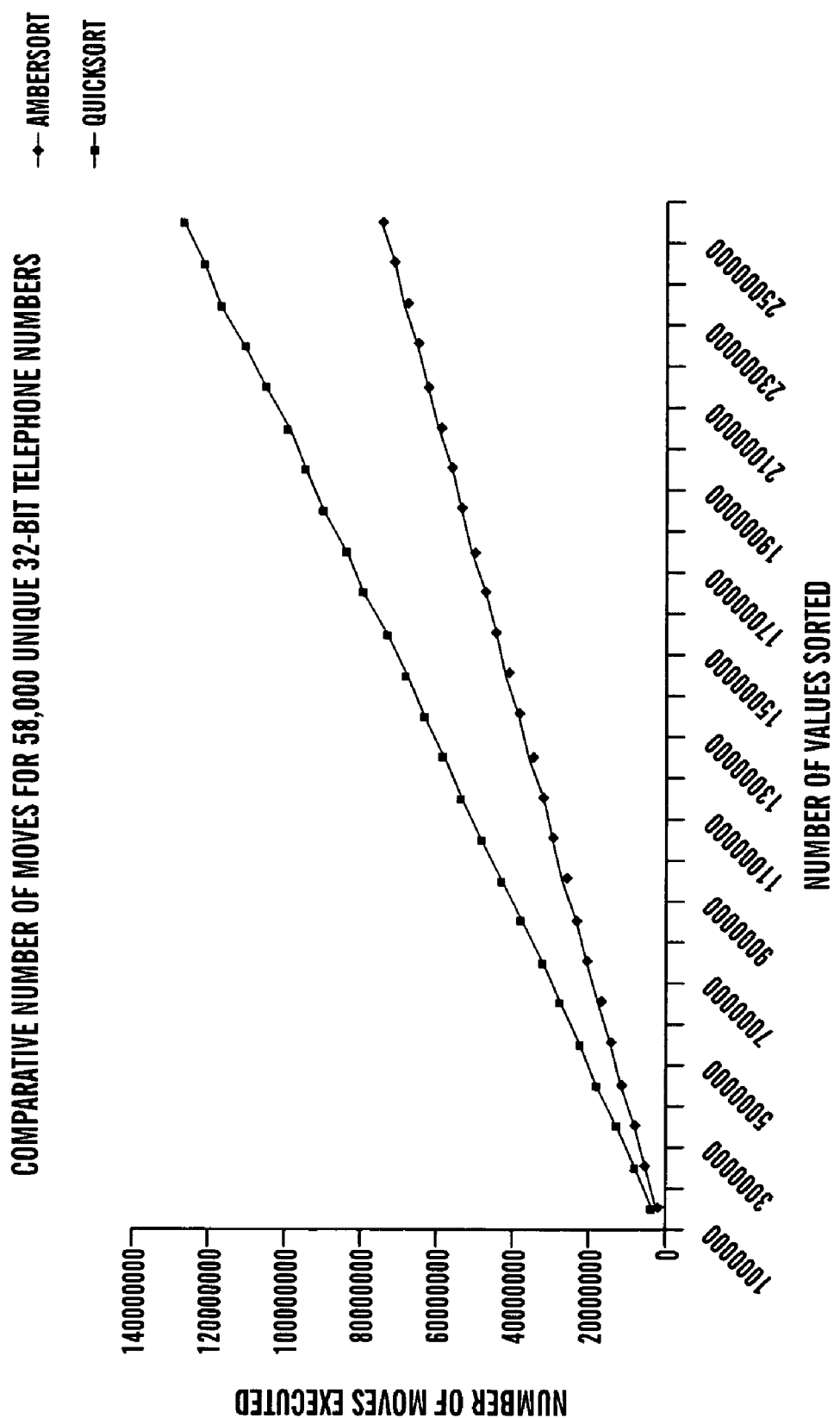

FIG. 41 shows the number of moves executed by Ambersort and Quicksort for sorting representing 58,000 unique 32-bit telephone numbers whose magnitude ranges from 0 to FFFFFFFF (hexadecimal). The Ambersort mask width is 9 bits. As expected, the Ambersort appears linear. The Quicksort also appears nearly linear to the eye, but its actual shape cannot be ascertained from FIG. 41 due to the coarseness in the scale of the "Number of Moves Expected". Since Quicksort performs comparisons and moves, whereas Ambersort performs moves but no comparison, the better performance by Ambersort relative to Quicksort is underestimated in FIG. 41.

The preceding studies summarized in FIGS. 35-40 indicate that the efficiency of the Ambersort algorithm is a function of the mask width W, which suggests that the Ambersort algorithm may be more efficient utilizing an intelligently selected value of W. For example, studies analogous to those summarized in FIGS. 35-40 may be conducted and used to choose W to improve the efficiency of the sorting. Further improvement in sorting efficiency may be obtained utilizing a node-dependent mask width as described supra.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising executing an algorithm by a processor of a computer system, said executing said algorithm comprising in-place sorting at least two sequences of binary bits in ascending or descending order of a value associated with each sequence and in a time period denoted as a sorting execution time, said sequences being stored contiguously in an array within a memory device of the computer system prior to said sorting, each sequence comprising contiguous fields of bits, said in-place sorting comprising executing program code at each node of a linked execution structure, each node comprising a segment of the array, said executing program code being performed in a hierarchical sequence with respect to said nodes, said executing program code at each node including:

dividing the segment of the node into groups of sequences based on a mask field having a mask width, each group having a unique mask value of the mask field; and in-place rearranging a group of sequences in the segment, said rearranging resulting in each group comprising only those sequences having the unique mask value of the group, wherein said in-place rearranging comprises executing at least one domino chain with respect to sequences within the segment, wherein said executing at least one domino chain comprises performing for each domino chain an ordered movement of N sequences within the segment such that N is at least 2, and wherein said performing the ordered movement of the N sequences comprises:

moving a first sequence of the N sequences from an initial position of the first sequence into a position of the segment occupied by a second sequence of the N sequences, resulting in the initial position being empty;

moving the second sequence into a position of the segment occupied by a third sequence of the N sequences;

moving an (N−1)th sequence is into a position of the segment occupied by an Nth sequence of the N sequences; and moving the Nth sequence into the empty initial position of the segment.

2. The method of claim 1, wherein said executing at least one domino chain with respect to sequences within the segment comprises moving each said sequence from a first group of the groups having a mask value that differs from the mask value of the sequence to a second group of the groups having the same mask value as the mask value of the sequence.

3. The method of claim 1, wherein the computer system comprises cache memory adapted to store sequences being moved from their respective positions in the array.

4. The method of claim 1, wherein said program code is a modular procedure, and wherein said executing program code further includes recursively calling the modular procedure from within the modular procedure.

5. The method of claim 1, wherein said executing program code further includes counter-controlled looping through the nodes of the linked execution structure.

6. The method of claim 1, wherein said in-place sorting does not include comparing a value of any sequence of the sequences with a value of any other sequence of the sequences.

7. The method of claim 1, wherein the sorting execution time is a linear function of a sequence length comprised by each sequence.

8. The method of claim 1, wherein the sorting execution time is a linear or less than linear function of a total number of said sequences.

9. The method of claim 1, wherein the mask width associated with each node of the linked execution structure is a same mask width.

10. The method of claim 9, wherein the same mask width is such that the sorting execution time is less than a Quicksort execution time for sorting the sequences via execution of a Quicksort sorting algorithm by said processor.

11. The method of claim 1, wherein the mask width associated with a first node of the linked execution structure differs from the mask width associated with a second node of the linked execution structure.

12. The method of claim 1, wherein the sequences consist of fixed-length words such that each of said words represents an integer.

13. The method of claim 1, wherein the sequences consist of fixed-length words such that each of said words represents a floating point number.

14. The method of claim 1, wherein the sequences each represent a character string.

15. The method of claim 1, where said in-place rearranging at a current node of the linked execution structure comprises:
processing successive sequences of the sequences in the array such that each sequence processed is either skipped if said each sequence is in its proper group of the groups or is moved into its proper group of the groups by execution of a next domino chain of the at least one domino chain;
after each sequence processed according to said processing, testing to determine whether a node completion condition is satisfied, said node completion condition being that a sum of a total number of sequences skipped and a total number of domino chains executed is equal to a total number of said sequences;
ascertaining, after processing only a number of sequences of the successive sequences, that the node completion condition is satisfied;
responsive to said ascertaining, terminating said in-place rearranging at the current node.

16. The method of claim 15, wherein the number of sequences consists of fewer sequences than a total number of said sequences.

17. A method for deploying computing infrastructure, said method comprising integrating a computer readable program into a computer system, wherein the computer-readable program in combination with the computing system is adapted to execute an algorithm by a processor of the computer system, said executing said algorithm comprising in-place sorting at least two sequences of binary bits in ascending or descending order of a value associated with each sequence and in a time period denoted as a sorting execution time, said sequences being stored contiguously in an array within a memory device of the computer system prior to said sorting, each sequence comprising contiguous fields of bits, said in-place sorting comprising executing program code at each node of a linked execution structure, each node comprising a segment of the array, said executing program code being performed in a hierarchical sequence with respect to said nodes, said executing program code at each node including:
dividing the segment of the node into groups of sequences based on a mask field having a mask width, each group having a unique mask value of the mask field; and
in-place rearranging a group of sequences in the segment, said rearranging resulting in each group comprising only those sequences having the unique mask value of the group, wherein said in-place rearranging comprises executing at least one domino chain with respect to sequences within the segment, wherein said executing at least one domino chain comprises performing for each domino chain an ordered movement of N sequences within the segment such that N is at least 2, and wherein said performing the ordered movement of the N sequences comprises:
moving a first sequence of the N sequences from an initial position of the first sequence into a position of the segment occupied by a second sequence of the N sequences, resulting in the initial position being empty;
moving the second sequence into a position of the segment occupied by a third sequence of the N sequences;
moving an (N−1)th sequence is into a position of the segment occupied by an Nth sequence of the N sequences; and
moving the Nth sequence into the empty initial position of the segment.

18. The method of claim 17, wherein said executing at least one domino chain with respect to sequences within the segment comprises moving each said sequence from a first group of the groups having a mask value that differs from the mask value of the sequence to a second group of the groups having the same mask value as the mask value of the sequence.

19. The method of claim 17, wherein the computer system comprises cache memory adapted to store sequences being moved from their respective positions in the array.

20. The method of claim 17, wherein said program code is a modular procedure, and wherein said executing program code further includes recursively calling the modular procedure from within the modular procedure.

21. The method of claim 17, wherein said executing program code further includes counter-controlled looping through the nodes of the linked execution structure.

22. The method of claim 17, wherein said in-place sorting does not include comparing a value of any sequence of the sequences with a value of any other sequence of the sequences.

23. The method of claim 17, wherein the sorting execution time is a linear function of a sequence length comprised by each sequence.

24. The method of claim 17, wherein the sorting execution time is a linear or less than linear function of a total number of said sequences.

25. The method of claim 17, wherein the mask width associated with each node of the linked execution structure is a same mask width.

26. The method of claim 25, wherein the same mask width is such that the sorting execution time is less than a Quicksort execution time for sorting the sequences via execution of a Quicksort sorting algorithm by said processor.

27. The method of claim 17, wherein the mask width associated with a first node of the linked execution structure differs from the mask width associated with a second node of the linked execution structure.

28. The method of claim 17, wherein the sequences consist of fixed-length words such that each of said words represents an integer.

29. The method of claim 17, wherein the sequences consist of fixed-length words such that each of said words represents a floating point number.

30. The method of claim 17, wherein the sequences each represent a character string.

31. The method of claim 17, where said in-place rearranging at a current node of the linked execution structure comprises:
processing successive sequences of the sequences in the array such that each sequence processed is either skipped if said each sequence is in its proper group of the groups or is moved into its proper group of the groups by execution of a next domino chain of the at least one domino chain;
after each sequence processed according to said processing, testing to determine whether a node completion condition is satisfied, said node completion condition being that a sum of a total number of sequences skipped and a total number of domino chains executed is equal to S;

ascertaining, after processing only a number of sequences of the successive sequences, that the node completion condition is satisfied;

responsive to said ascertaining, terminating said in-place rearranging at the current node.

32. The method of claim 31, wherein the number of sequences consists of fewer sequences than a total number of said sequences.

* * * * *

UNITED STATES PATENT AND TRADEMARK OFFICE
CERTIFICATE OF CORRECTION

| | |
|---|---|
| PATENT NO. | : 7,467,138 B2 |
| APPLICATION NO. | : 11/011930 |
| DATED | : December 16, 2008 |
| INVENTOR(S) | : Dennis Carroll |

It is certified that error appears in the above-identified patent and that said Letters Patent is hereby corrected as shown below:

Column 42
Line 22, delete "moving the second sequence into a position of the segment occupied by a third sequence of the N sequences, ...;" and insert --after said moving the first sequence, if N exceeds 2 then performing a loop from I=2 to I=N-1 for iteration I of the loop, wherein iteration I comprises moving the Ith sequence into a position of the segment occupied by a (I+1)th sequence of the N sequences;--
Line 25, insert at beginning of line --after said--
Line 25, delete "an" and insert --the--
Line 25, delete "is"
Line 25, delete "a" and insert --the--
Line 26, delete "an" and insert --the--
Line 26, delete "of the N sequences; and, moving" and insert --, then moving--

Column 44
Line 1, delete "moving the second sequence into a position of the segment occupied by a third sequence of the N sequences, ...;"and insert --after said moving the first sequence, if N exceeds 2 then performing a loop from I=2 to I=N-1 for iteration I of the loop, wherein iteration I comprises moving the Ith sequence into a position of the segment occupied by a (I+1)th sequence of the N sequences;--
Line 4, insert at beginning of line --after said--
Line 4, delete "an" and insert --the--
Line 4, delete "is"
Line 4, delete "a" and insert --the--
Line 5, delete "an" and insert --the--
Line 5, delete "of the N sequences;"

UNITED STATES PATENT AND TRADEMARK OFFICE
CERTIFICATE OF CORRECTION

PATENT NO. : 7,467,138 B2
APPLICATION NO. : 11/011930
DATED : December 16, 2008
INVENTOR(S) : Dennis Carroll It is certified that error appears in the above-identified patent and that said Letters Patent is hereby corrected as shown below:

Line 5, delete "an" and insert --the--
Line 5, delete "of the N sequences; and, moving" and insert --, then moving--

Signed and Sealed this

Thirty-first Day of March, 2009

JOHN DOLL
*Acting Director of the United States Patent and Trademark Office*